(12) United States Patent
Tanabe et al.

(10) Patent No.: US 7,826,110 B2
(45) Date of Patent: Nov. 2, 2010

(54) LIGHT SCANNING APPARATUS, LIGHT SCANNING METHOD, IMAGE FORMING APPARATUS, AND COLOR IMAGE FORMING APPARATUS

(75) Inventors: Jun Tanabe, Kanagawa (JP); Masaaki Ishida, Kanagawa (JP); Yasuhiro Nihei, Kanagawa (JP); Atsufumi Omori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 810 days.

(21) Appl. No.: 11/763,062

(22) Filed: Jun. 14, 2007

(65) Prior Publication Data

US 2008/0218813 A1     Sep. 11, 2008

(30) Foreign Application Priority Data

Jun. 19, 2006  (JP)  .............................. 2006-169012
Jul. 19, 2006  (JP)  .............................. 2006-196440
Oct. 30, 2006  (JP)  .............................. 2006-293751

(51) Int. Cl.
  *H04N 1/04* (2006.01)
(52) U.S. Cl. ...................... 358/509; 358/475; 358/474; 358/481
(58) Field of Classification Search ................ 358/509, 358/475, 474, 481, 296
See application file for complete search history.

(56) References Cited

FOREIGN PATENT DOCUMENTS

| JP | 07-276704 | 10/1995 |
|----|-----------|---------|
| JP | 10-235928 | 9/1998 |
| JP | 3198909 | 6/2001 |
| JP | 2001-272615 | * 10/2001 |
| JP | 2001-350111 | * 12/2001 |
| JP | 2003-072135 | * 3/2003 |
| JP | 2003-72135 | 3/2003 |
| JP | 2003-186278 | 7/2003 |
| JP | 2005-37575 | 2/2005 |

OTHER PUBLICATIONS

U.S. Appl. No. 11/913,558, filed Nov. 5, 2007, Tanabe, et al.

* cited by examiner

*Primary Examiner*—Houshang Safaipour
(74) *Attorney, Agent, or Firm*—Oblon, Spivak, McClelland, Maier & Neustadt, L.L.P.

(57) ABSTRACT

A light scanning apparatus is provided that has plural light sources which scan plural light beams in a main scanning direction. The light scanning apparatus comprises a light source control unit that controls the plural light sources. Where an array of N (N≧2) light sources aligned in a sub scanning direction and capable of scanning different positions in the sub scanning direction is called a virtual light source array, and where L (L≧2) virtual light source arrays aligned in the sub scanning direction are formed, the light source control unit causes M ((N−1)≧M≧1) light sources out of the N light sources of each of the L virtual light source arrays to emit light to form a pixel and thereby to form a total of L pixels aligned in the sub scanning direction by giving the same data to the M light sources of each of the L virtual light source arrays.

20 Claims, 50 Drawing Sheets

FIG.37

|  | LIGHT SOURCE A | LIGHT SOURCE B |
|---|---|---|
| PATTERN 1 | 0 | 8 |
| PATTERN 2 | 2 | 6 |
| PATTERN 3 | 3 | 5 |
| PATTERN 4 | 4 | 4 |
| PATTERN 5 | 5 | 3 |
| PATTERN 6 | 6 | 2 |
| PATTERN 7 | 8 | 0 |

FIG.52

| IMAGE QUALITY | 1200dpi | 2400dpi |
|---|---|---|
| GRANULARITY | ○ | ○ |
| GRADATION | ○ | ○ |
| SHARPNESS | ○ | ◎ |
| JAGGY | ○ | ◎ |

LIGHT SCANNING APPARATUS, LIGHT SCANNING METHOD, IMAGE FORMING APPARATUS, AND COLOR IMAGE FORMING APPARATUS

BACKGROUND OF THE INVENTION

1. Field of the Invention

The present invention relates to a light scanning apparatus, a light scanning method, an image forming apparatus, and a color image forming apparatus.

2. Description of the Related Art

FIG. 23 is a block diagram illustrating an exemplary configuration of an electrophotographic image forming apparatus such as a laser printer or a digital copier. Referring to FIG. 23, a laser beam emitted from a semiconductor laser unit 1001 used as a light source unit is deflected and scanned by a rotating polygon mirror 1002, passes through a scanning lens (fθ lens) 1003, and forms a light spot on a photoreceptor 1004. The photoreceptor 1004 is exposed to light, so that an electrostatic latent image is formed. A phase-locked loop 1009 synchronizes the phase of a modulation signal generated by a clock generation circuit 1008 with the phase of an output signal from a photodetector 1005 that detects the laser beam deflected by the polygon mirror 1002. More specifically, the phase-locked loop 1009 generates, for each line, an image clock (pixel clock) phase-synchronized with the output signal from the photodetector 1005 and supplies the image clock to an image processing unit 1006 and a laser driving circuit 1007. The laser driving circuit 1007 controls the laser emission time of the semiconductor laser unit 1001 according to image data generated by the image processing unit 1006 and the phase-synchronized image clock generated by the phase-locked loop 1009 for each line, thereby controlling the formation of an electrostatic latent image on the photoreceptor (to-be-scanned medium) 1004.

In recent years, increasing demands for higher printing speed (image forming speed) and better image quality have been satisfied by increasing the rotational speed of a polygon motor used as a deflector and the frequency of a pixel clock used as a reference clock for laser modulation. However, further improvements in printing speed and image quality would be difficult with such conventional methods.

For the above reason, multibeam technologies using plural light sources have been developed to achieve higher printing speed and better image quality. A light scanning method using a multibeam technology increases the number of light beams that can be deflected and scanned by a deflector at a time. Such a light scanning method enables lowering the rotational speed of a polygon motor used as a deflector and the frequency of a pixel clock, thereby making it possible to provide faster and more stable light scanning and image forming.

As a semiconductor laser unit or light sources for providing plural light beams in a multibeam technology, a combination of single-beam laser chips or an LD (laser diode) array having plural light-emitting elements on a single laser chip is being used.

Such a semiconductor laser unit, for example, an LD array, for providing plural light beams is very compact, can perform direct modulation at a very high speed using a driving current, and therefore has been widely used as light sources for a laser printer or the like in recent years. However, since the light output of a semiconductor laser at a driving current varies depending on the temperature, it is difficult to maintain the light intensity of a semiconductor laser at a specific level. Especially, in a surface emitting laser array having plural light sources on a single chip, since the distances between the light sources are short, temperature variation due to light emission and extinction and temperature cross-talk is likely to cause fluctuation of the amount of light emitted from the light sources.

Patent document 1 discloses a light scanning apparatus having a two-dimensional array of plural light sources that scans a photoreceptor by deflecting plural light beams with a deflector. According to an embodiment in patent document 1, the density of light emitting points can be maximized without causing temperature cross-talk between the light emitting points.

Patent document 2 discloses an image forming apparatus using surface emitting lasers. An embodiment in patent document 2 makes it possible to change light intensity of each laser chip pixel-by-pixel and to control the light emission time of each laser chip pixel-by-pixel, thereby allowing to control formation of an electrostatic latent image of pixels.

Patent document 3 discloses a light scanning apparatus using surface emitting lasers. An embodiment in patent document 3 obviates the problem of heat cross-talk using a specific arrangement of light sources and thereby makes it possible to form a high-density image.

<Patent Document 1> Japanese Patent Laid-Open Publication No. 2001-272615

<Patent Document 2> Japanese Patent Laid-Open Publication No. 2003-72135

<Patent Document 3> Japanese Patent Laid-Open Publication No. 2001-350111

However, in a conventional light scanning apparatus having plural light sources, since one pixel is normally formed with one light source, it is difficult to correct the position of a pixel with an accuracy higher than the size of the pixel.

In order to overcome such a problem, the applicant of the present invention has developed a method that causes M ($(N-1) \geq M \geq 1$) light sources out of N ($N \geq -2$) light sources, which can scan different positions in the sub scanning direction in a pixel formed on a photoreceptor, to emit light and scan, and thereby corrects the position of a pixel in the sub-scanning direction with an accuracy higher than the pixel density in the sub scanning direction. This method, however, is disadvantageous in that, in the case of providing M light sources with different data pieces, costs of drive units of the M light sources are high.

FIG. 50 is a block diagram illustrating an exemplary configuration of an electrophotographic image forming apparatus such as a laser printer or a digital copier. Referring to FIG. 50, a laser beam emitted from a semiconductor laser unit 31001 used as a light source unit is deflected and scanned by a rotating polygon mirror 31002, passes through a scanning lens (fθ lens) 31003, and forms a light spot on a photoreceptor 31004. The photoreceptor 31004 is exposed to light, so that an electrostatic latent image is formed. A phase-locked loop 31009 synchronizes the phase of a modulation signal generated by a clock generation circuit 31008 with the phase of an output signal from a photodetector 31005 that detects the laser beam deflected by the polygon mirror 31002. More specifically, the phase-locked loop 31009 generates, for each line, an image clock (pixel clock) phase-synchronized with the output signal from the photodetector 31005 and supplies the image clock to an image processing unit 31006 and a laser driving circuit 31007. The laser driving circuit 31007 controls the laser emission time of the semiconductor laser unit 31001 according to image data generated by the image processing unit 31006 and the phase-synchronized image clock generated by the phase-locked loop 31009 for each line, thereby controlling the formation of an electrostatic latent image on the photoreceptor (to-be-scanned medium) 31004.

As mentioned above, in recent years, increasing demands for higher printing speed (image forming speed) and better image quality have been satisfied by increasing the rotational speed of a polygon motor used as a deflector and the frequency of a pixel clock used as a reference clock for laser modulation. However, further improvements in printing speed and image quality would be difficult with such conventional methods.

For the above reason, multibeam technologies using plural light sources have been developed to achieve higher printing speed and better image quality. A light scanning method using a multibeam technology increases the number of light beams that can be deflected and scanned by a deflector at a time. Such a light scanning method enables lowering the rotational speed of a polygon motor used as a deflector and the frequency of a pixel clock, thereby making it possible to provide faster and more stable light scanning and image forming.

As a semiconductor laser unit or light sources for providing plural light beams in a multibeam technology, a combination of single-beam laser chips or an LD (laser diode) array having plural light-emitting elements on a single laser chip is being used.

<Patent Document 4> Japanese Patent Laid-Open Publication No. 7-276704

<Patent Document 5> Japanese Patent Laid-Open Publication No. 9-200431

In a typical system of light scanning apparatuses using a multibeam technology, one light source forms a one pixel, and hence a variation in light emitting level between the light sources directly leads to a variation in image density.

For forming one pixel by using one light source, since the light source needs to have light intensity high enough to generate a latent image, a high current is applied to a semiconductor laser. However, applying a high current to a semiconductor laser reduces the service life of the semiconductor laser.

To solve these problems, plural light sources each requiring less current and providing less amount of light may be used to form one pixel. The light sources are disposed at regular intervals at a density less than a pixel intensity at which one light source forms one pixel.

FIG. 24 is a diagram showing an example of forming one pixel by using plural light sources each of which requires less current and provides less amount of light. More specifically, N light sources (in FIG. 24, eight light sources) A through H are aligned in a sub scanning direction, and each light source group (in FIG. 24, each group of four light sources) forms one pixel. The term "light source group" as used herein indicates M light sources (in FIG. 24, four light sources) out of the N light sources, scanning positions of which M light sources are adjacent to each other in the sub scanning direction. That is, in the example shown in FIG. 24, among the eight light sources, a first light source group (the light sources A, B, C, and D) is used to form one pixel; and a second light source group (the light sources E, F, G, and H) is used to form one pixel.

In the example shown in FIG. 24, the N light sources are disposed at regular intervals (of distance X1). In other words, the interval between light sources in each light source group (each interval between the light sources A and B, between the light source B and the light source C, between the light source C and the light source D, between the light source E and the light source F, between the light source F and the light source G, and between the light source G and the light source H) is a distance X1, and the interval between the light source groups (the interval between the light source D and the light source E) is also the distance X1. With this configuration, as shown in FIG. 24, a spread of a light beam of each light source group of four light sources (spreading of light beams emitted from the light sources A, B, C, and D, and spreading of light beams emitted from the light sources E, F, G, and H) adversely affects a line (pixel) adjacent in the sub scanning direction.

SUMMARY OF THE INVENTION

The present invention aims to provide a light scanning apparatus, a light scanning method, an image forming apparatus, and a color image forming apparatus that cause M ($(N-1) \geq M \geq 1$) light sources out of N ($N \geq 2$) light sources, which can scan different positions in the sub scanning direction in a pixel formed on a photoreceptor, to emit light, and thereby correct the position of a pixel in the sub-scanning direction with an accuracy higher than the pixel density in the sub scanning direction while reducing costs for driving parts of the M light sources.

According to an aspect of the present invention, there is provided a light source control unit that controls the plural light sources. Where an array of N ($N \geq 2$) light sources aligned in a sub scanning direction and capable of scanning different positions in the sub scanning direction is called a virtual light source array, and where L ($L \geq 2$) virtual light source arrays aligned in the sub scanning direction are formed, the light source control unit causes M ($(N-1) \geq M \geq 1$) light sources out of the N light sources of each of the L virtual light source arrays to emit light to form a pixel and thereby to form a total of L pixels aligned in the sub scanning direction by giving the same data to the M light sources of each of the L virtual light source arrays (i.e., the light source control unit causes M ($(N-1) \geq M \geq 1$) light sources out of the N ($N \geq 2$) light sources capable of scanning different positions in the sub scanning direction to emit light by giving the same data to the M light sources). According to this aspect of the present invention, it is possible to share a common driving circuit, and therefor possible to provide a light scanning apparatus, at low cost, capable of correcting the position of a pixel in the sub scanning direction with an accuracy higher than the size of the pixel.

In one embodiment of the present invention, the light source control unit has a function of selecting the M light sources out of the N light sources on a per pixel basis. Having a function of selecting the light sources enables to perform positioning at higher accuracy.

In one embodiment of the present invention, the light scanning apparatus can adjust pixel density by performing pulse width modulation on the light sources.

In one embodiment of the present invention, the light scanning apparatus can adjust pixel density by performing power modulation on the light sources.

In one embodiment of the present invention, the light scanning apparatus can adjust pixel density by performing pulse width modulation and power modulation on the light sources at the same time.

In one embodiment of the present invention, the light source control unit adjusts density of the pixel based on a relationship between an area of a photoreceptor with surface potential equal to or less than an image development threshold in a surface potential distribution and a pulse width in a scanning pattern. This makes it possible to improve linearity of density adjustment.

In one embodiment of the present invention, each of the light sources uses a surface emitting laser. Using a surface emitting laser consumes less power than using usual semiconductor lasers and can simplify the configuration of a light source unit due to higher layout flexibility, which allows cost reduction.

According to an aspect of the present invention, there is provided an image forming apparatus comprising a light scanning apparatus of an embodiment of the present invention. This configuration allows the image forming apparatus to have high accuracy.

According to an aspect of the present invention, there is provided a color image forming apparatus comprising a light scanning apparatus of an embodiment of the present invention. This configuration allows the color image forming apparatus to have high accuracy.

The present invention also aims to provide a light scanning apparatus, a light scanning method, an image forming apparatus, and a color image forming apparatus, which are capable of reducing, when forming a pixel using plural light sources, adverse effects on an adjacent line (pixel) in a sub scanning direction regardless of spreading of beams of the light sources.

According to an aspect of the present invention, there is provided a light scanning apparatus comprising: N light sources in different positions at least in a sub scanning direction, wherein M (N≧2M≧4) light sources, of which scanning positions are adjacent to each other in the sub scanning direction, out of the N light sources form a light source group; an L th (L≧1) light source group is adjacent to an (L+1) th light source group in the sub scanning direction; the M light sources of each of the light source groups are spaced apart from each other by a first distance X1 in the sub scanning direction; and one of the light sources of the L th light source group, of which one of the light sources scanning position is adjacent to one of the light sources of the (L+1) th light source group, is spaced apart from said one of the light sources of the (L+1) th light source group by a second distance X2, the second distance X2 being greater than the first distance X1. According to this aspect of the present invention, it is possible to form a pixel using a light source array (plural light sources). That is, it is possible to reduce a current to be applied to each of the light sources, and thereby reduce power consumption. In addition, when forming a pixel using a light source array (plural light sources), it is possible to reduce adverse effects on an adjacent line (adjacent pixel) due to spreading of light beams of a light source array (plural light sources).

Especially, in one embodiment of the present invention, when the first distance X1 is less than 5 µm (e.g. 4.8 µm or 2.4 µm), if 2- power optical magnification (more accurately, lateral magnification of a scanning optical system in the sub scanning direction) or higher (e.g. 2.12) is used, resolution of a pixel is equal to or less than about 10 µm (for example, when the pitch between the light sources in the sub scanning direction is 4.8 µm or 2.4 µm, resolution of a pixel is made as low as 10 µm (2,400 dpi) or 5 µm (4,800 dpi)). For instance, when the distance between light sources in the sub scanning direction corresponding to light beams adjacent to each other in a virtual light source array is 4 µm or less, if 2.5-power optical magnification (more accurately, lateral magnification of a scanning optical system in the sub scanning direction) is used, resolution of a pixel is made as low as 10 µm or less (for example, when the pitch in the sub scanning direction is 4 µm or 2 µm, resolution of a pixel is made as low as 10 µm (2,400 dpi) or 5 µm (4,800 dpi)).

More specifically, in one embodiment of the present invention, a combination of plural light sources wherein the distance X1 is less than 5 µm and a scanning optical system having lateral magnification in the sub scanning direction of |β|>2 makes it possible to provides a high resolution writing optical system having resolution in the sub scanning system of 2,400 dpi or greater. The combination of the plural light sources wherein the distance X1 is less than 5 µm and the scanning optical system having lateral magnification in the sub scanning direction of |β|>2 does not reduce the aperture diameter in the sub scanning direction. Therefore, even if light sources with a small amount of light such as surface emitting lasers (VCSEL) are used, it is possible to provide a light scanning apparatus capable of performing optical writing at high resolution. With the combination of the plural light sources wherein the distance X1 is less than 5 µm and the scanning optical system having lateral magnification in the sub scanning direction of |β|>2, there is no need to dispose a lens for focusing lights onto a to-be-scanned surface close to a photoreceptor. This enables providing, at low cost, a light scanning apparatus capable of performing optical writing with high resolution and allowing easy layout. Further, with the combination of the plural light sources wherein the distance X1 is less than 5 µm and the scanning optical system having lateral magnification in the sub scanning direction of |β|>2, there is no need to dispose a cylinder lens close to a polygon motor. This enables providing a light scanning apparatus capable of performing optical writing with high resolution while reducing fluctuations of the beam sport diameter and the beam pitch due to heat generation.

In one embodiment of the present invention, the light source control unit controls the M (M≧2) light sources to shift a centroid of the pixel in the sub scanning direction. This embodiment enables precise correction of pixel positions in the sub scanning direction. In the case where one pixel is formed with one light source, it is difficult to correct the position of a pixel with an accuracy higher than the size of the pixel. On the other hand, in an embodiment of the present invention, one pixel is formed with plural light sources, thereby enabling precise correction of pixel positions in the sub scanning direction.

According to an aspect of the present invention, there is provided an image forming apparatus comprising a light scanning apparatus of an embodiment of the present invention. According to this aspect of the present invention, it is possible to provide a high-accuracy image forming apparatus capable of forming fine (clear) images.

According to an aspect of the present invention, there is provided a color image forming apparatus comprising a light scanning apparatus of an embodiment of the present invention. According to this aspect of the present invention, it is possible to provide a high-accuracy color image forming apparatus capable of forming fine (clear) images.

BRIEF DESCRIPTION OF THE DRAWINGS

FIG. 37 is a diagram for illustrating an exemplary control action of a light source control unit;

FIG. 52 is a table showing the comparison of quality between images of 1,200 dpi and 2,400 dpi.

DETAILED DESCRIPTION OF THE PREFERRED EMBODIMENT

Preferred embodiments of the present invention are described hereinafter with reference to the accompanying drawings. It is to be noted that, in the present invention, a pixel indicates a simple pixel (e.g. a pixel in a 1,200 dpi image has a size of about 21 μm square), and does not indicate a compound pixel formed of plural pixels (e.g. 4×4 pixels) as in a dither matrix.

Figure 1:
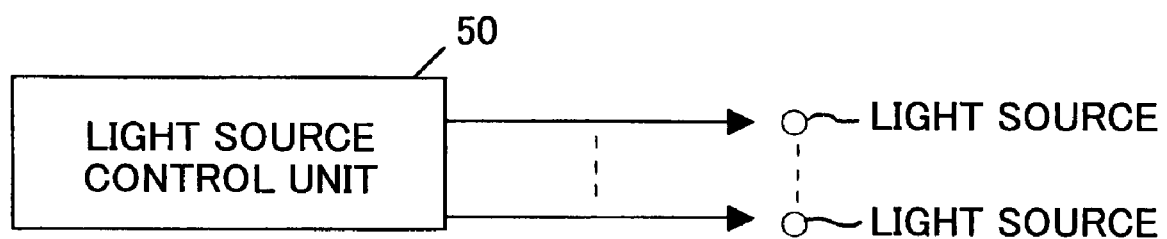
FIG. 1 is a diagram showing an exemplary configuration of a light scanning apparatus according to an embodiment of the present invention.

FIG. 1 is a diagram showing an exemplary configuration of a light scanning apparatus according to an embodiment of the present invention. As shown in FIG. 1, a light scanning apparatus according to an embodiment of the present invention (a light scanning apparatus that scans plural light beams from plural light sources in the main scanning direction) includes a light source control unit 50 that controls plural light sources. When plural light sources (e.g. a two-dimensional array of plural light sources) are used, the arrangement of light emitting points of the light sources may not always correspond to the arrangement of light beams from the light sources. Therefore, in the descriptions below, an array of light beams aligned in a sub scanning direction is called a virtual light source array and each of the light beams is called a virtual light source. A virtual light source array consists of N (N≧2) virtual light sources aligned in the sub scanning direction. The light source control unit 50 controls the light sources to form L (L≧2) virtual light source arrays aligned in the sub scanning direction, causes M ((N−1)≧M≧1) light sources out of N light sources, which can scan different positions in the sub scanning direction, corresponding to N virtual light sources in each of the L virtual light source arrays to emit light to form a pixel and thereby to form a total of L pixels aligned in the sub scanning direction.

A light scanning apparatus according to an embodiment of the present invention is described below in more detail.

Figure 23:
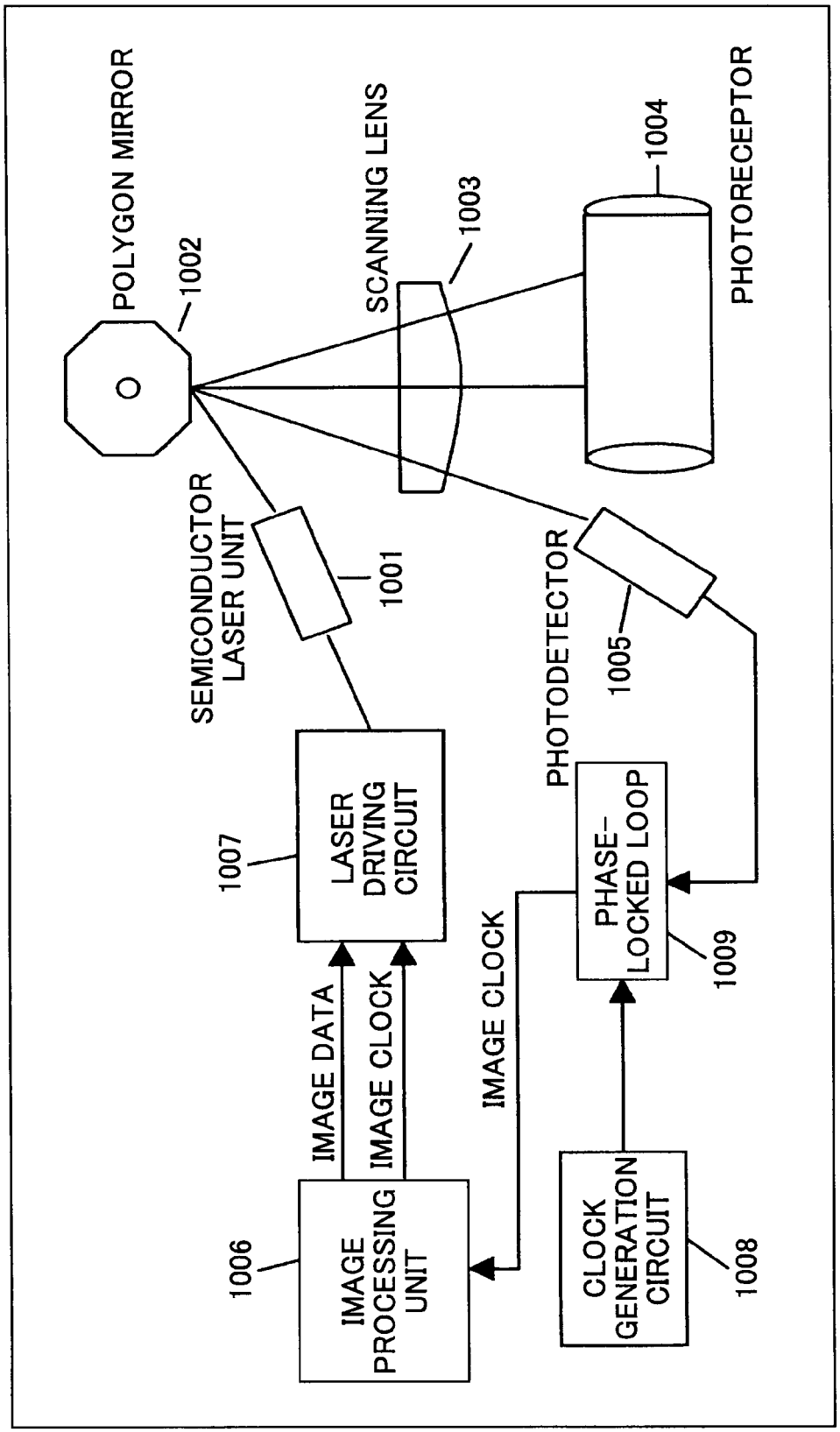
FIG. 23 is a diagram showing an exemplary configuration of a conventional image forming apparatus.

Assume that the semiconductor laser unit 1001 in a conventional image forming apparatus (writing optical system) shown in FIG. 23 is a semiconductor laser array where plural light sources (plural semiconductor lasers) are arranged in a grid or a surface emitting laser array where plural light sources (plural vertical cavity surface emitting lasers (VCSEL)) are arranged on a single chip in a grid. The semiconductor laser unit 1001 is positioned as shown in FIG. 2 so that the array direction of the plural light sources forms an angle θ with the rotation axis of a deflector, for example, the polygon mirror 1002 shown in FIG. 23.

Figure 2:
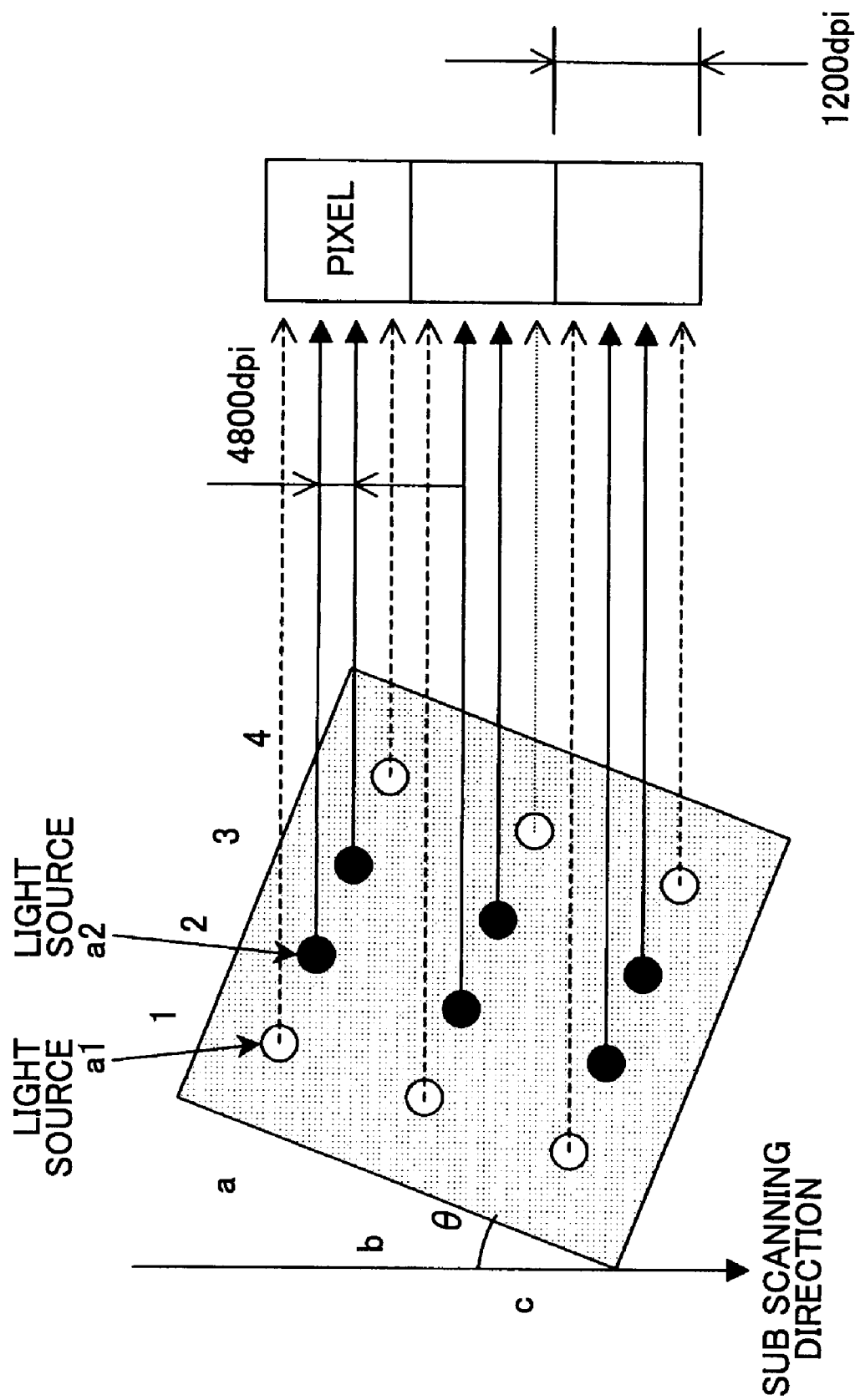
FIG. 2 is a diagram showing an exemplary light source unit.

In FIG. 2, the four light sources in a column a in the laser array are called light sources a1, a2, a3, and a4 from the left. Take, for example, a case where the light source control unit 50 causes the light sources a2 and a3 out of the light sources a1, a2, a3, and a4 to emit light and thereby to form a pixel (i.e. a case where one pixel is formed by one virtual light source array formed by four light sources). When the pixel density to be achieved is 1,200 dpi, the distance between the two light sources corresponds to the distance between two pixels in a 4,800 dpi image. In other words, the density of light sources is four times higher than the pixel density. Such a configuration makes it possible to shift the centroid of a pixel in the sub scanning direction by changing the proportions of the amounts of light from the light sources forming the pixel, thereby making it possible to form a pixel with an accuracy higher than the density of light sources.

In FIG. 2 and subsequent figures, a white circle indicates a light source not emitting light and a black circle indicates a light source emitting light. In an example shown in FIG. 2, the light source control unit 50 causes the light sources a2 and a3 out of the light sources a1, a2, a3, and a4 in the column a to emit light and thereby to form the first pixel; causes the light sources b2 and b3 out of the light sources b1, b2, b3, and b4 in a column b to emit light and thereby to form the second pixel; and causes the light sources c2 and c3 out of the light sources c1, c2, c3, and c4 in a column c to emit light and thereby to form the third pixel.

Figure 3:
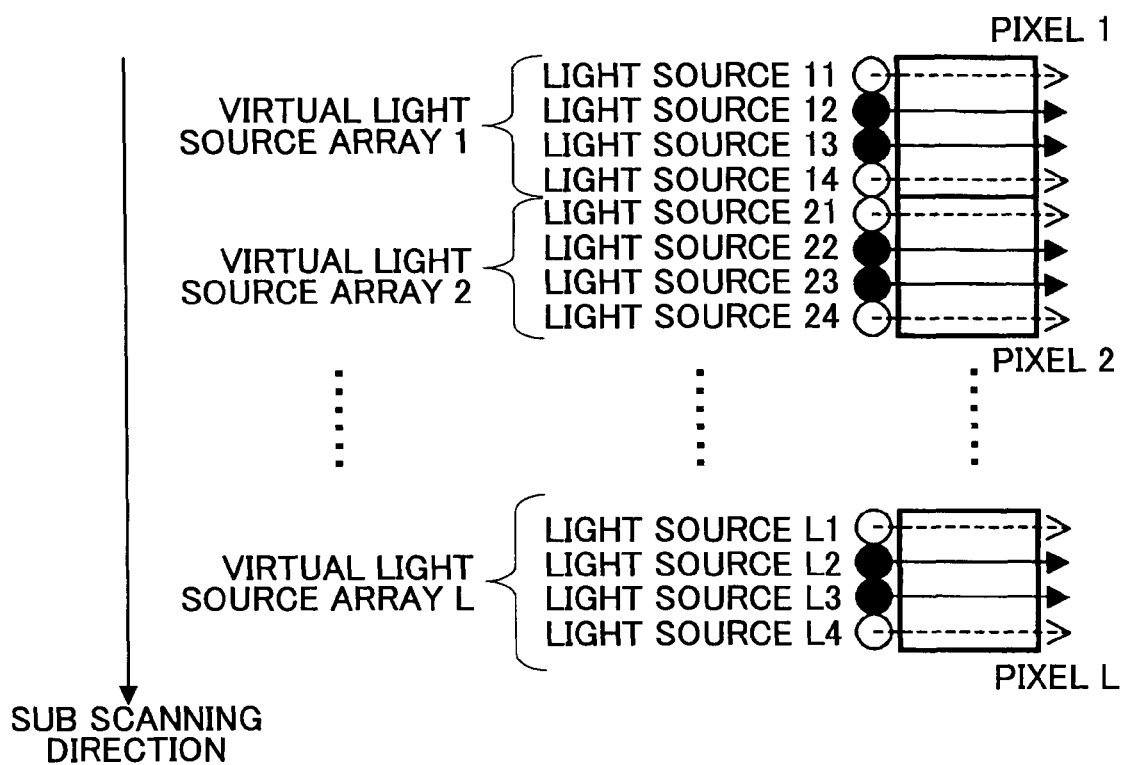
FIG. 3 is a diagram showing virtual light source arrays 1 through L aligned in the sub scanning direction to form L pixels.

In an example shown in FIG. 3, the light source control unit 50 causes two light sources out of four light sources to emit light, the scanning positions (positions that are scanned by the laser beams emitted from light sources) of which two light sources are adjacent to each other in the sub scanning direction (in FIG. 2, two light sources in the middle of each column). The light source control unit 50 forms virtual light source arrays 1 through L aligned in the sub scanning direction, thereby forming L pixels. In the example shown in FIG. 3, the total number of light sources is four times L (4×L).

Forming one pixel with two or more light sources (two light sources in FIGS. 2 and 3) is preferable because of the following reason: when surface emitting lasers are used as light sources, since the output power of a surface emitting laser is lower than a conventional laser, one light source may not be enough to provide a sufficient amount of light to develop a pixel. Therefore, to obtain a sufficient amount of light to develop a pixel, it is preferable to use two or more light sources.

Figure 4:
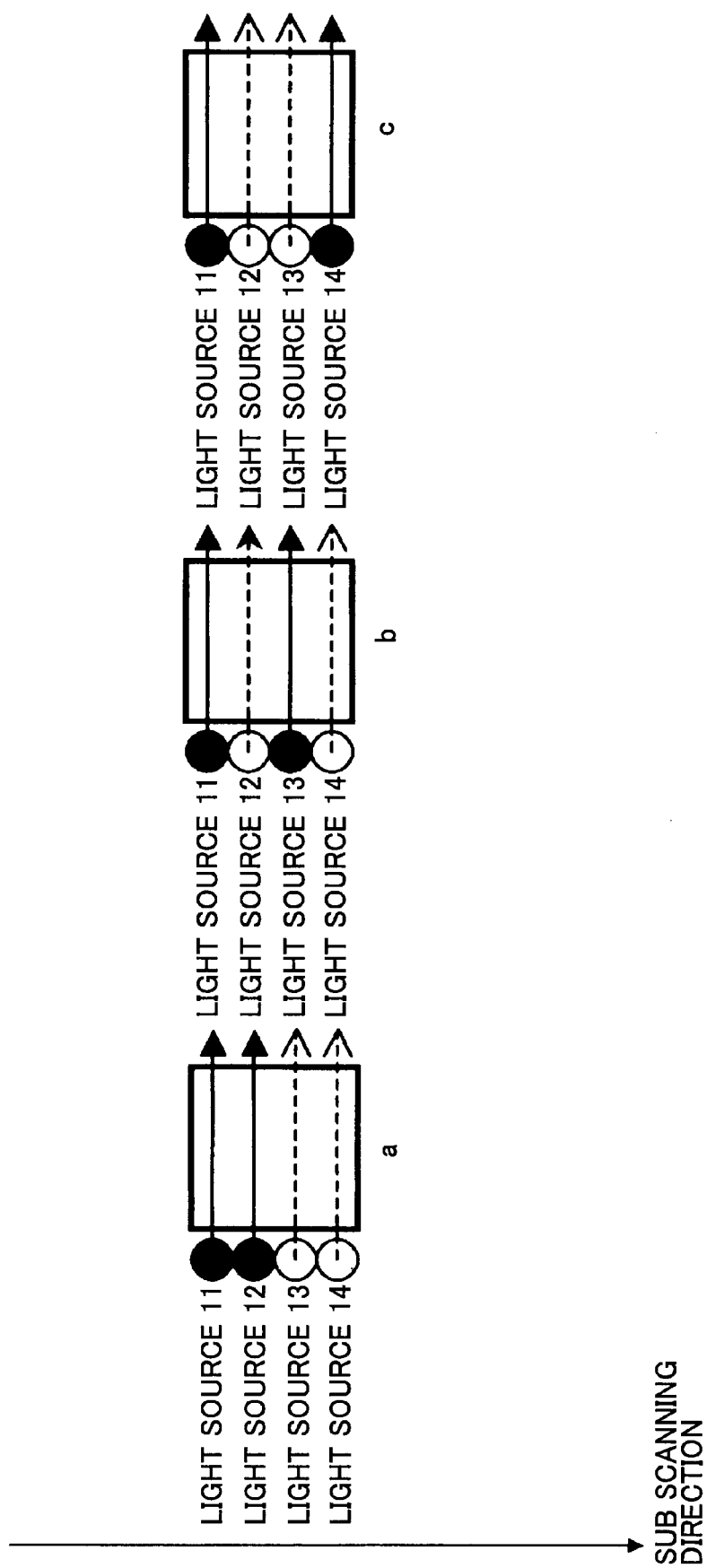
FIG. 4 is a diagram showing three patterns (a), (b), and (c) of selecting two light sources out of four light sources.
Figure 5:
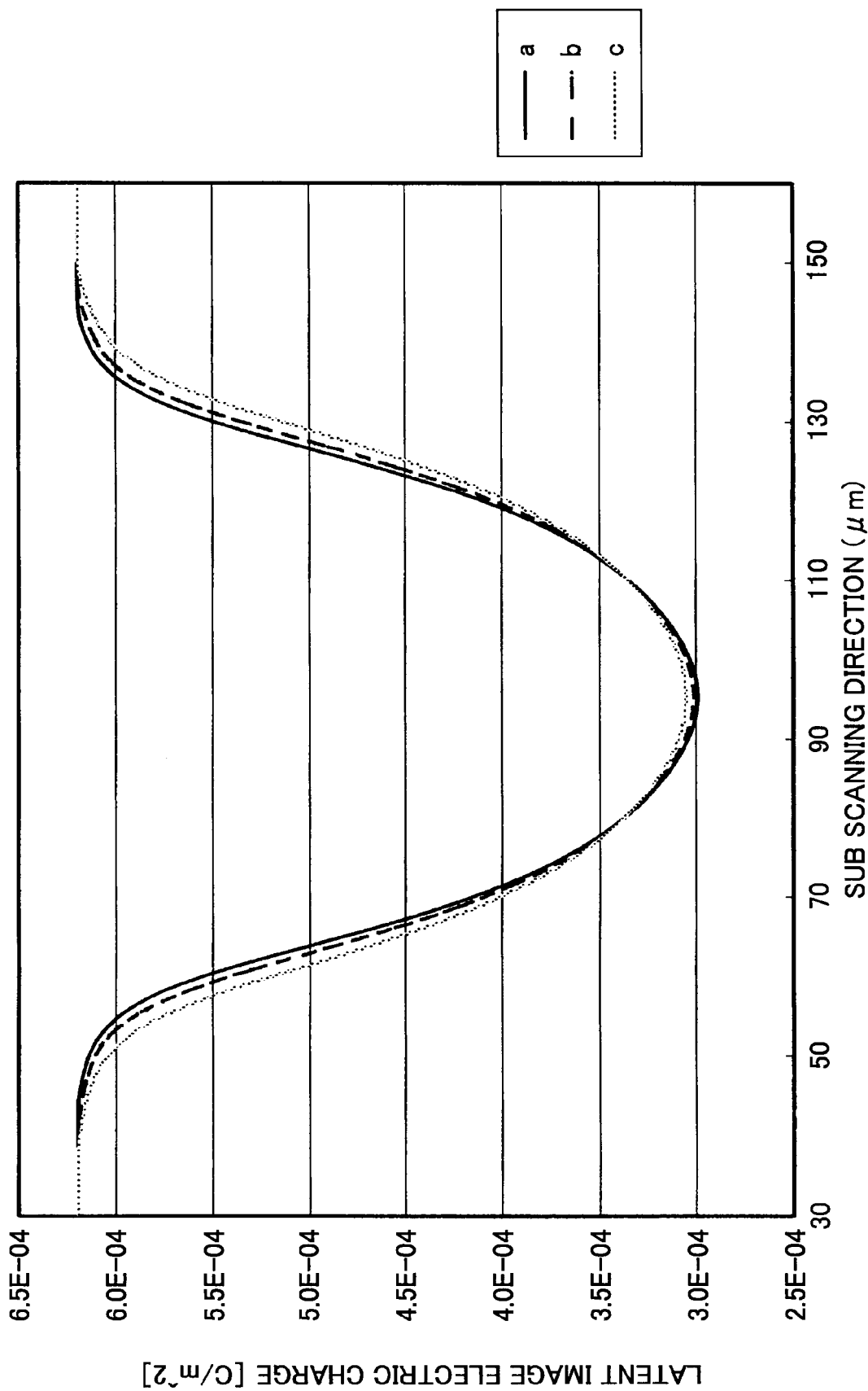
FIG. 5 is a graph showing the results of an electrostatic latent image forming simulation using the patterns (a), (b), and (c) of FIG. 4.

The advantage of causing two light sources with adjacent whose scanning positions are adjacent to each other in the sub scanning direction to emit light is described below. FIG. 4 shows three patterns (a), (b), and (c) of selecting two light sources out of four light sources. FIG. 5 is a graph showing the results of an electrostatic latent image forming simulation using the patterns (a), (b), and (c) of FIG. 4. As shown in FIG. 5, the electrostatic latent image formed using the pattern (a) has the narrowest latent image electric charge distribution. The results shown in FIG. 5 suggest that using adjacent light sources (i.e. using light sources whose scanning positions are adjacent to each other in the sub scanning direction results in higher resolution.

Figure 6:
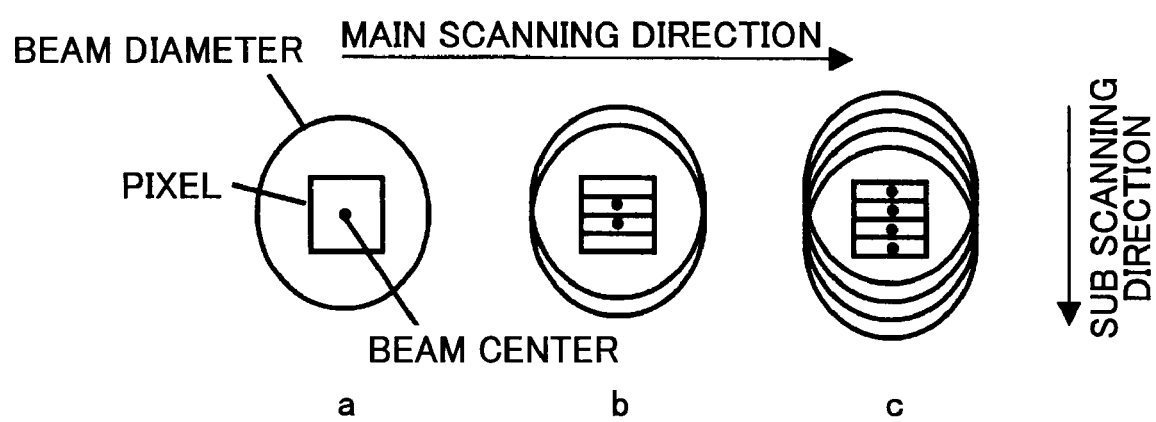
FIG. 6 is a diagram for illustrating advantages of forming a pixel by causing M ((N−1)≧M) light sources whose scanning positions are adjacent to each other in the sub scanning direction to emit light.

Also, when a virtual light source array consists of N (N≧2) light sources that can scan different positions in the sub scanning direction, it is preferable to cause M ((N−1)≧M) light sources whose scanning positions are adjacent to each other in the sub scanning direction to emit light to form a pixel rather than causing all of the N light sources to emit light. This is because of the following advantage. FIG. 6 shows three patterns (a), (b), and (c) of forming a pixel: in pattern (a), one light source is used as in a conventional light scanning apparatus; in pattern (b), two light sources in the middle of four light sources aligned in the sub scanning direction are used; and in pattern (c), all four light sources aligned in the sub scanning direction are used. In FIG. 6, it is assumed that the amount of light (light output of each light source multiplied by the number of light sources) used to form a pixel is the same in all three patterns. Also, the beam diameter (light intensity becomes less than or equal to 1/e2 of the maximum light intensity outside of a circle with this diameter) of a light beam emitted from each light source is greater than the size of a pixel. When plural light sources are used, the light spots of light beams emitted from the light sources are overlapped.

Figure 7:
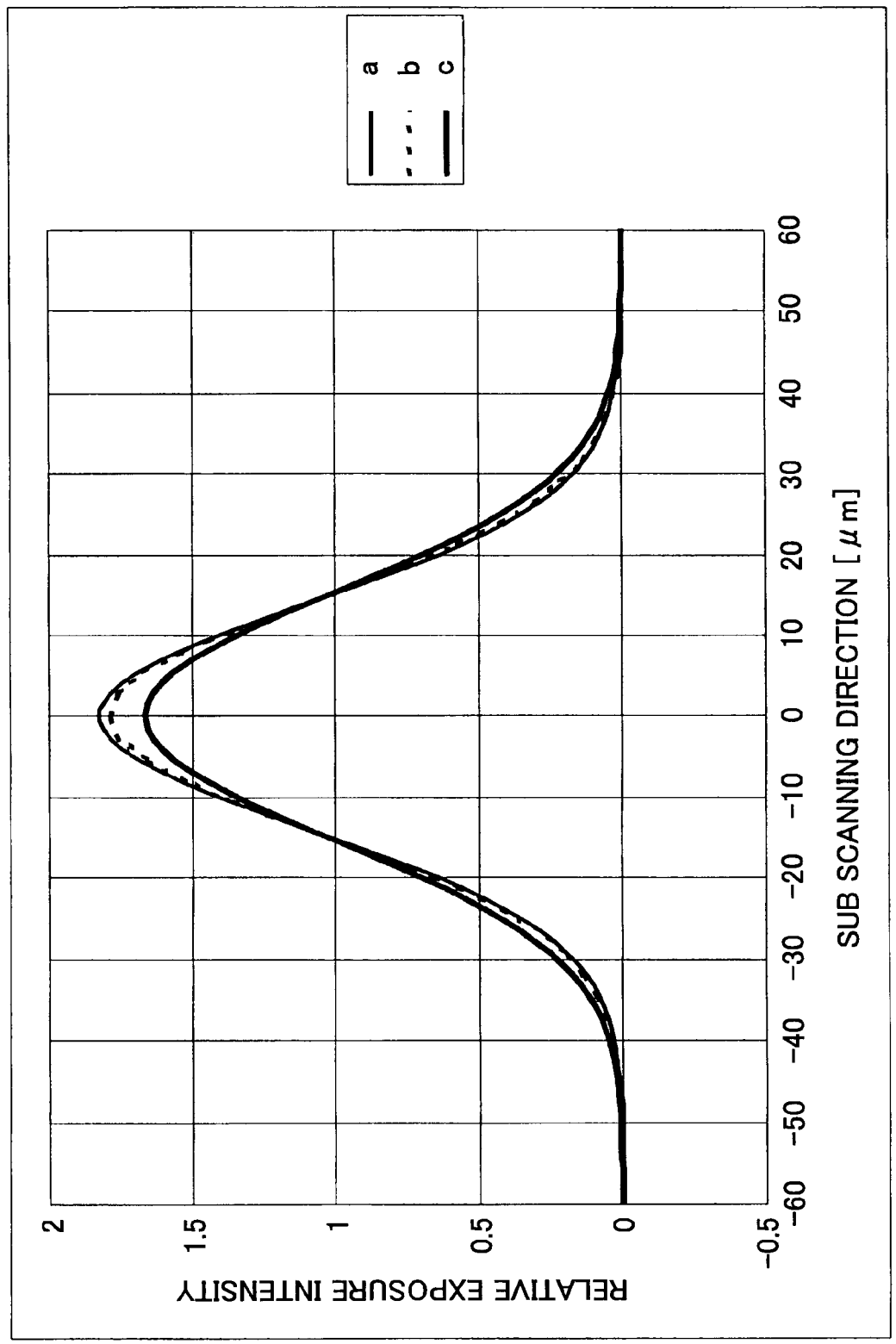
FIG. 7 is a graph showing exposure intensity distributions obtained using the patterns (a), (b), and (c) of FIG. 6.

FIG. 7 is a graph showing exposure intensity distributions obtained using the patterns (a), (b), and (c) of FIG. 6. As shown in FIG. 7, when two light sources in the middle of four light sources arranged in the sub scanning direction are used to form a pixel, the resulting exposure intensity distribution is substantially the same as that obtained by forming a pixel using one light source. On the other hand, when all four light sources arranged in the sub scanning direction are used to form a pixel, the exposure intensity distribution and the electrostatic latent image become wider, and as a result, the pixel accuracy becomes lower.

The above results suggest that providing N (N≧2) light sources in the sub scanning direction for each pixel and selecting M ((N−1)≧M) adjacent light sources out of the N light sources prevent the exposure intensity distribution and the electrostatic latent image from becoming wider in the sub scanning direction and make it possible to correct the position of a pixel in the sub scanning direction with an accuracy higher than the size of the pixel.

According to embodiments of the present invention, two light sources whose scanning positions are adjacent to each other in the sub scanning direction are used as shown in FIG.

Figure 8:
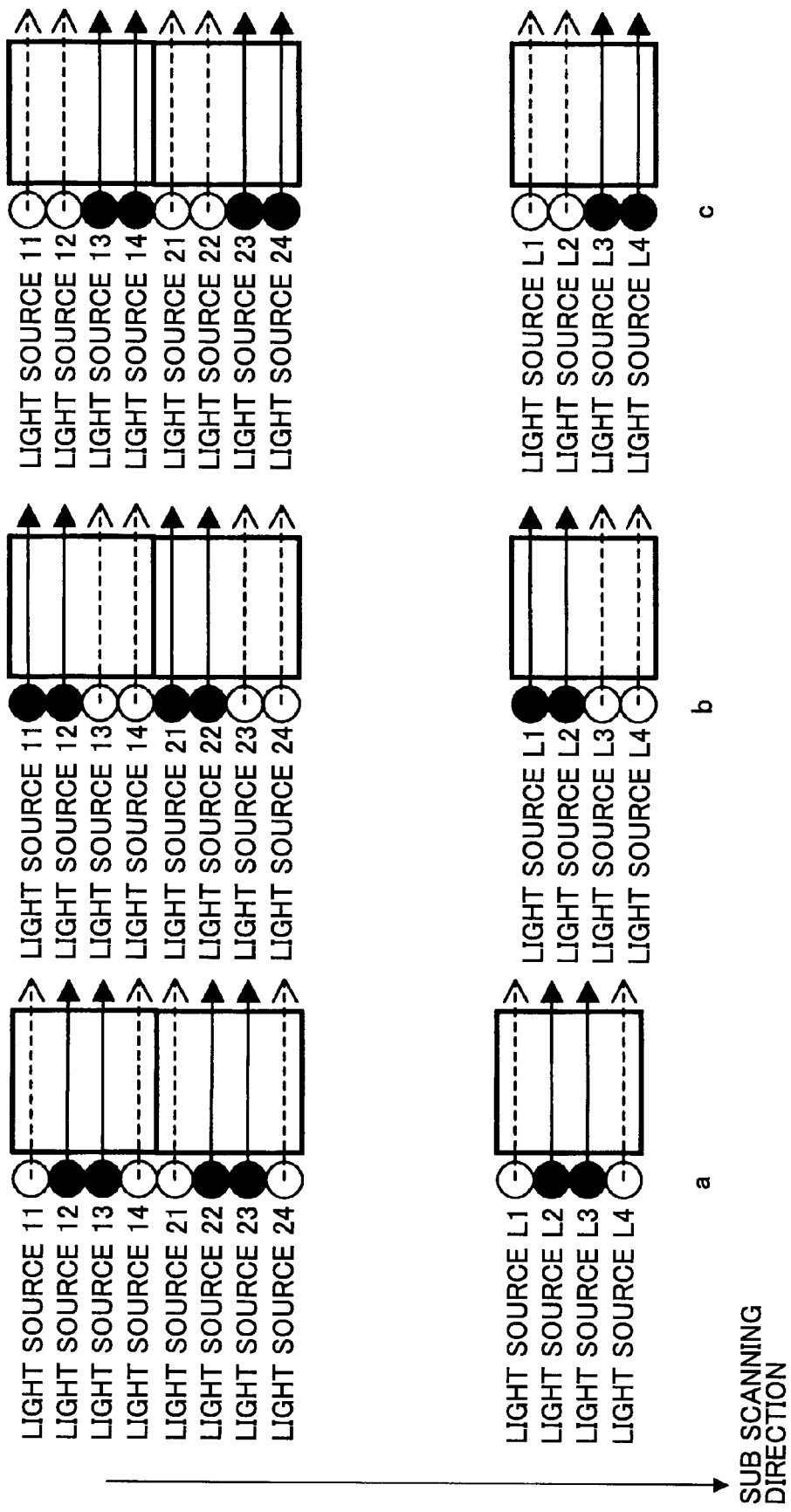
FIG. 8 is a diagram for illustrating an exemplary process of correcting the positions of pixels.

8. When pixels are positioned correctly in the sub scanning direction, two middle light sources (light sources 12 and 13, 22 and 23 . . . and L2 and L3) the scanning positions of which are adjacent to each other in the sub scanning direction are caused to emit light out of each four light sources as shown in FIG. 8 (a). When pixels are misaligned downward, two upper light sources (light sources 11 and 12, 21 and 22, . . . and L1 and L2) with adjacent scanning positions in the sub scanning direction are caused to emit light as shown in FIG. 8 (b) to correct the positions of the pixels. When pixels are misaligned upward, two lower light sources (light sources 13 and 14, 23 and 24, . . . and L3 and L4) with adjacent scanning positions in the sub scanning direction are caused to emit light as shown in FIG. 8 (c) to correct the positions of the pixels.

As described above, in a light scanning apparatus according to an embodiment of the present invention, when $(N-1) \geqq M \div 2$ is true, the scanning positions of the selected M light sources are preferably adjacent to each other in the sub scanning direction.

In one embodiment of the present invention, for example, in the case as shown in FIG. 3 where the light source control unit 50 causes light sources 12 and 13 to emit light to form a pixel 1; light sources 22 and 23 to emit light to form a pixel 2; and light sources L2 and L3 to emit light to form a pixel L, and thereby to form a total of L pixels at a time, the light source control unit 50 provides the light sources in the same virtual light source array 1 (in the example shown in FIG. 3, light sources 12 and 13) with the same data and thereby controls them. In the same manner, the light source control unit 50 controls the light sources in the same virtual light source array 2 (in the example shown in FIG. 3, light sources 22 and 23) by providing them with the same data.

In this way, since the light source control unit 50 controls M light sources in each virtual light source array by providing the M light sources with the same pixel data, it is possible to share a common driving circuit, and therefor possible to provide a light scanning apparatus and therefor possible to correct the position of a pixel in the sub scanning direction with an accuracy higher than the size of the pixel at low cost.

Figure 9:
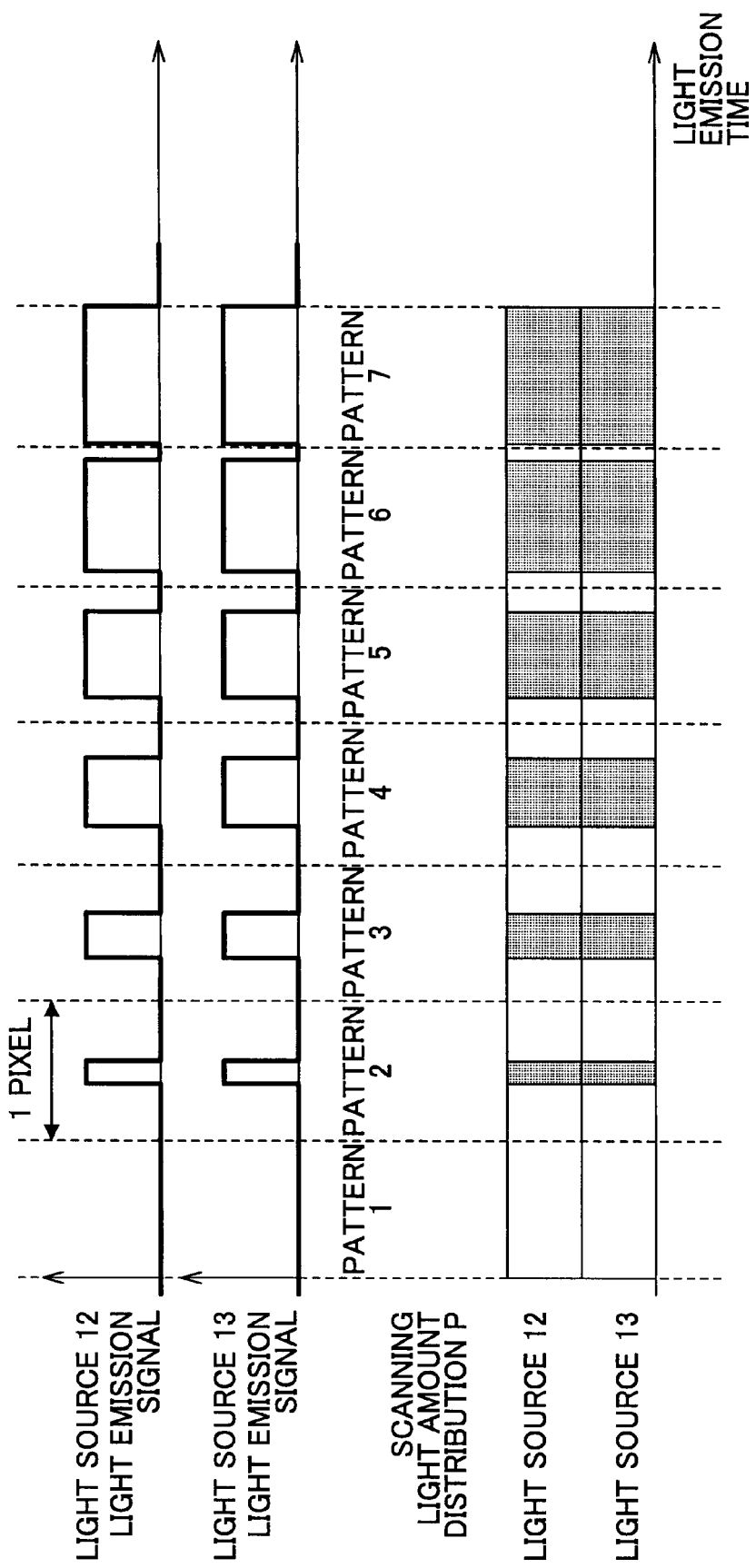
FIG. 9 is a graph showing data input to light sources and the amount of light emitted during light scanning in the case where pulse modulation is performed.

In one embodiment of the present invention, it is possible to adjust pixel density by modulating the pulse width of the M light sources forming one pixel. A method of adjusting pixel density by pulse width modulation is described below. FIG. 9 is a graph showing data input to light sources and the amount of light emitted during light scanning in the case where pulse modulation is performed. The upper half of the graph of FIG. 9 shows light emission signals input to the light sources 12 and 13 of FIG. 3. In the graph of FIG. 9, the horizontal axis and the vertical axis represent light emission time and light intensity, respectively. FIG. 9 shows seven scanning patterns. In a pattern 1, light emission time of the light source during scanning of one pixel is zero. The light emission time increases in the order from a pattern 2, a pattern 3 . . . . In a pattern 7, the light source emits light during the entire period of scanning of one pixel as in a normal case. The lower half of the graph of FIG. 9 shows the amount of scanning light in each of the scanning patterns. As shown in FIG. 9, the scanning time and the amount of scanning light have a proportional relationship.

Figure 10:
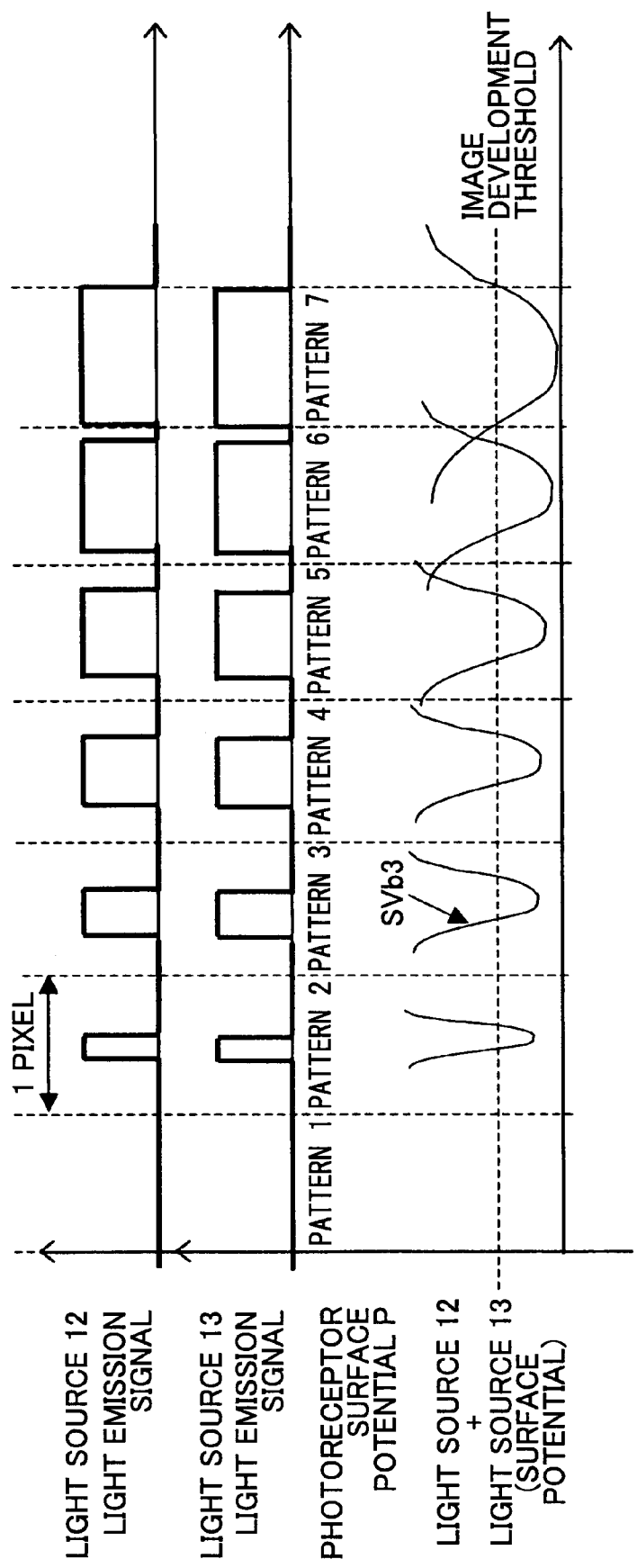
FIG. 10 is a graph showing an example of surface potential on a photoreceptor in each of the scanning patterns of FIG. 9.

FIG. 10 is a graph showing an example of surface potential on a photoreceptor in each of the scanning patterns of FIG. 9. The upper half of the graph of FIG. 10 shows the scanning patterns, and the lower half shows surface potential distributions. In the surface potential distributions, in the portions where the surface potential is equal to or less than the image development threshold, toner adheres to form a pixel. In the pattern 7, the width of the portion with surface potential equal to or less than the image development threshold matches the width of one pixel. The width of the portion with surface potential equal to or less than the image development threshold decreases relative to the width of one pixel in the order from the pattern 6, the pattern 5 . . . . In the patterns 1 through 6, density of one pixel is less than that of a typical pixel. That is, the area of the portion with surface potential equal to or less than the image development threshold corresponds to pixel density. Accordingly, pixel density can be adjusted by changing pulse width.

Figure 11:
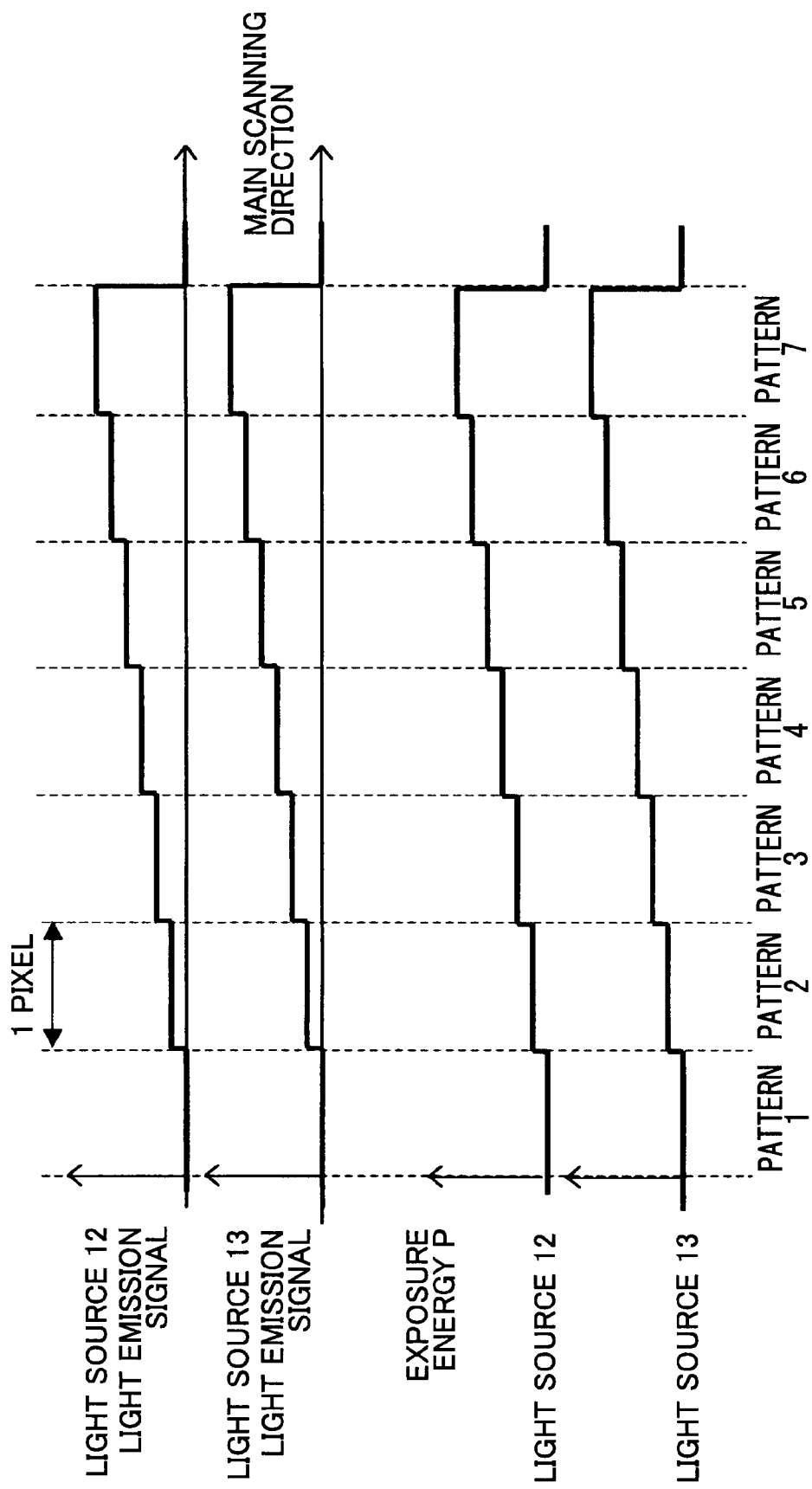
FIG. 11 is a graph showing data input to light sources and the amount of light emitted during light scanning in the case where power modulation is performed.

In one embodiment of the present invention, it is possible to adjust pixel density by modulating power of the M light sources forming one pixel. A method of adjusting pixel density by power modulation is described below. FIG. 11 is a graph showing data input to light sources and the amount of light emitted during light scanning in the case where power modulation is performed. The upper half of the graph of FIG. 11 shows light emission signals input to the light sources 12 and 13 of FIG. 3. In the graph of FIG. 11, the horizontal axis and the vertical axis represent light emission time and light intensity, respectively. FIG. 11 shows seven scanning patterns. In a pattern 1, light intensity of the light source during scanning of one pixel is zero. The light intensity increases in the order from a pattern 2, a pattern 3 . . . . In a pattern 7, the light source emits light with a normal light intensity during scanning of one pixel as in a normal case. The lower half of the graph of FIG. 11 shows the amount of light for scanning in each of the scanning patterns. As shown in FIG. 11, the scanning intensity and the amount of scanning light have a proportional relationship.

Figure 12:
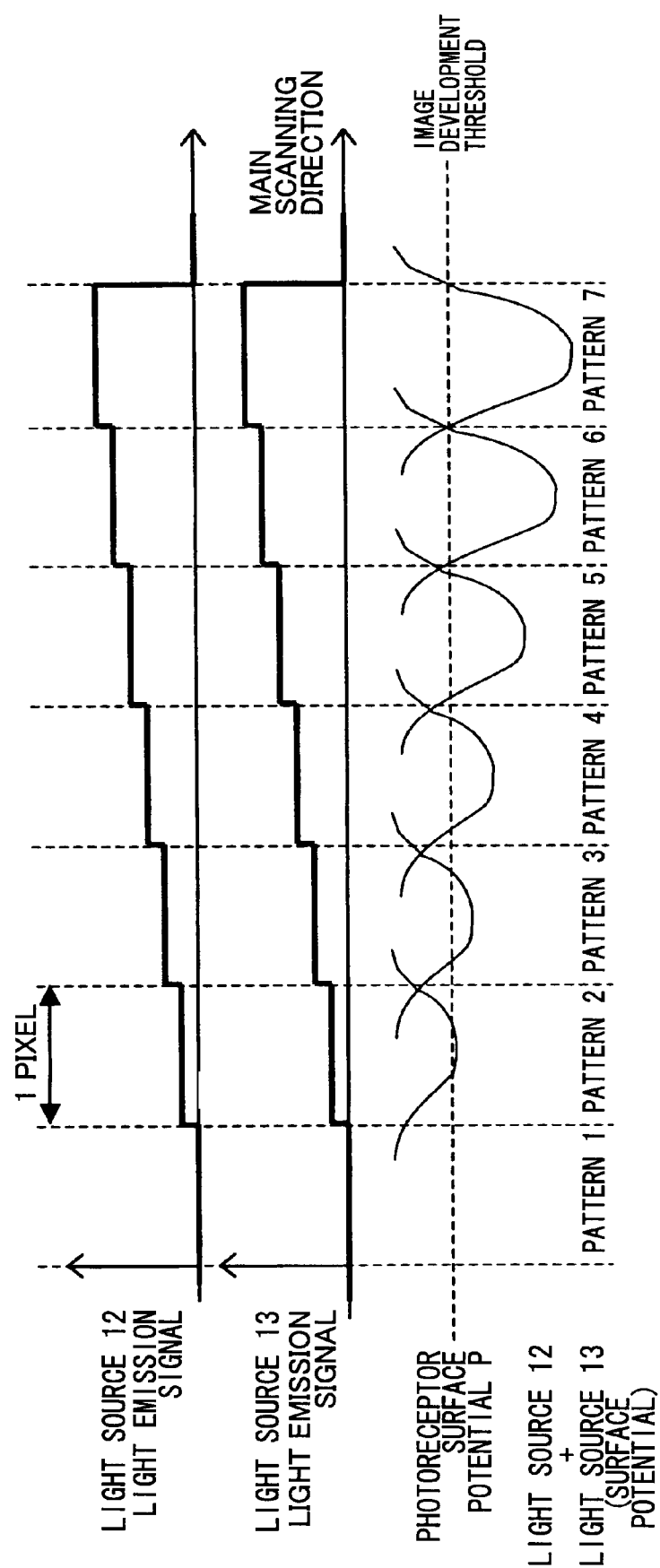
FIG. 12 is a graph showing an example of surface potential on a photoreceptor in each of the scanning patterns of FIG. 11.

FIG. 12 is a graph showing an example of surface potential on a photoreceptor in each of the scanning patterns of FIG. 11. The upper half of the graph of FIG. 12 shows the scanning patterns, and the lower half of the graph shows surface potential distributions. As in the case of pulse width modulation, in the surface potential distributions, in the portions where the surface potential is equal to or less than the image development threshold, toner adheres to form a pixel. Accordingly, pixel density can be adjusted by power modulation as well.

By performing pulse width modulation and power modulation at the same time, a light scanning apparatus can adjust pixel density more precisely.

Figure 13:
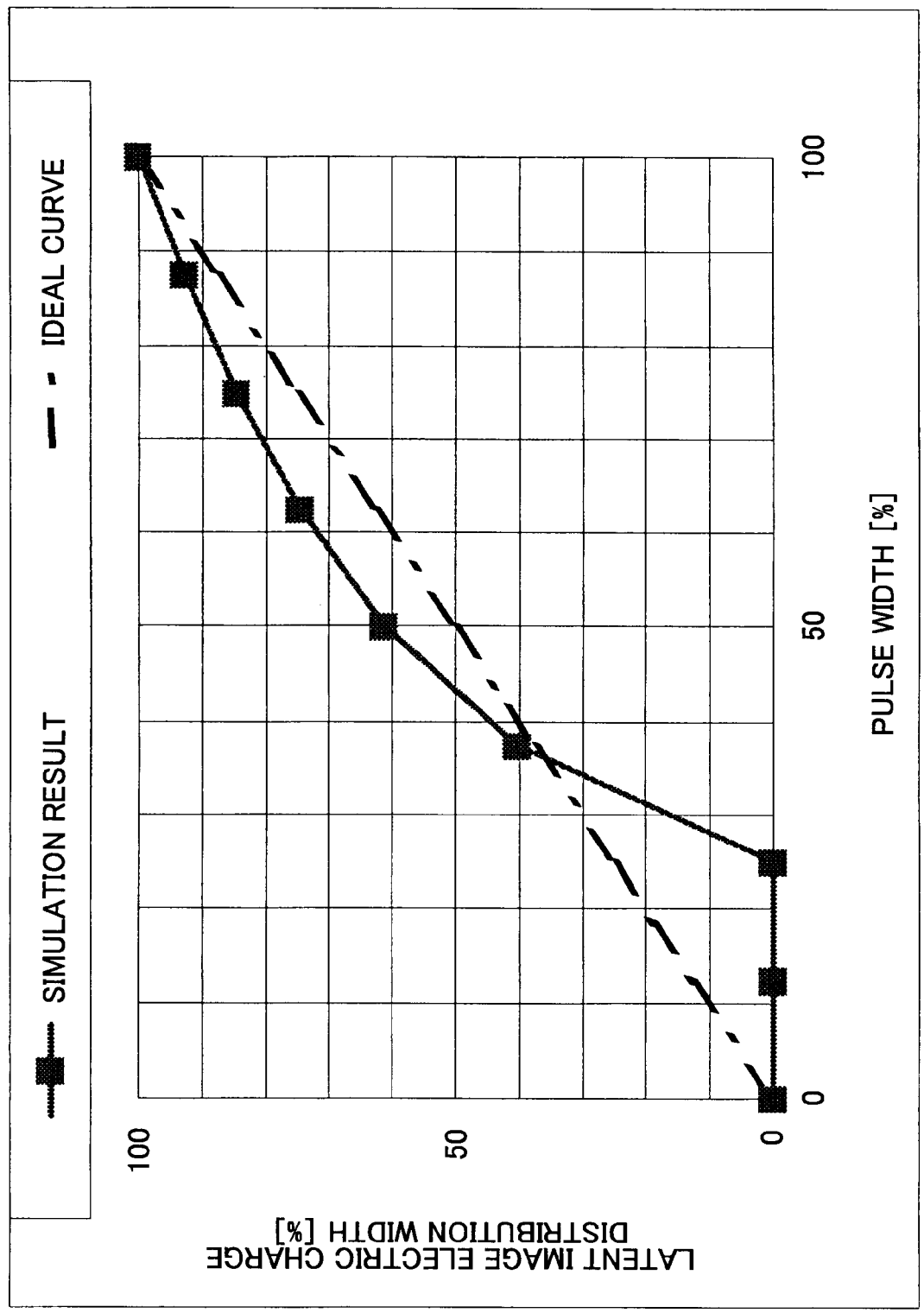
FIG. 13 is a graph showing latent image electric charge distribution width as a simulation result obtained by pulse width modulation.

FIG. 13 is a graph showing latent image electric charge distribution width obtained by a simulation of pulse width modulation. The latent image electric charge distribution width is equivalent to the photoreceptor surface potential of FIG. 10. Although the pulse width and the latent image electric charge distribution width ideally have a proportional relationship, the simulation result shows that pulse width and the latent image electric charge distribution width do not have a proportional relationship. When the pulse width is 25% or less, there is no region having voltage higher than the image development threshold, so that the latent image electric charge distribution width is zero. To ensure linearity of density adjustment, this property needs to be taken into consideration.

In one embodiment of the present invention, pixel density is adjusted by giving a consideration to the relationship between the area of a portion on the photoreceptor having surface potential equal to or less than the image development threshold in surface potential distribution and pulse width in each scanning pattern, so that linearity of density adjustment is improved.

Figure 14:
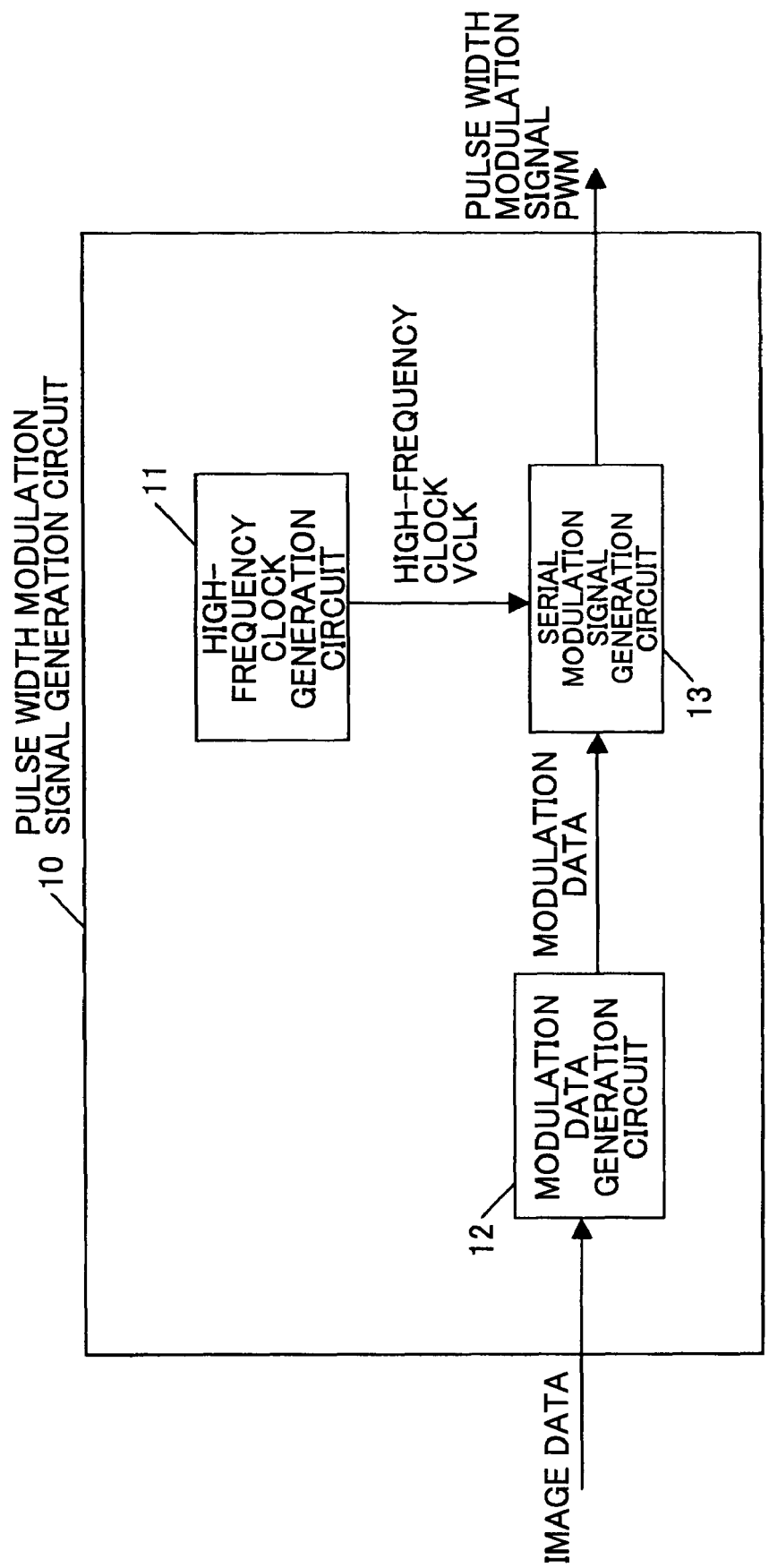
FIG. 14 is a diagram showing an exemplary pulse width modulation signal generation circuit that generates image data as a pulse width modulation signal.

FIG. 14 is a diagram showing an exemplary pulse width modulation signal generation circuit 10 that generates image data as a pulse width modulation signal. The pulse width modulation signal generation circuit 10 of FIG. 14 includes a high-frequency clock generation circuit 11, a modulation data generation circuit 12, and a serial modulation signal generation circuit 13. The high-frequency clock generation circuit 11 generates a high-frequency clock VCLK having a frequency far higher than that of a pixel clock which is a basic clock used to form a pixel in a conventional image forming apparatus. The modulation data generation circuit 12 generates modulation data representing a bit pattern based on image data input from an external device (not shown) such as an image processing unit. The serial modulation signal generation circuit 13 receives modulation data output from the modulation data generation circuit 12, converts the modulation data into a serial pulse pattern train (pulse train) based on the high-frequency clock VCLK, and outputs the pulse pattern train as a pulse width modulation signal PWM. When modulation data are directly input from an external device into the serial modulation signal generation circuit 13, the modulation data generation circuit 12 can be omitted.

The pulse width modulation signal generation circuit 10 inputs modulation data into the serial modulation signal generation circuit 13, serially outputs a pulse string corresponding to a bit pattern of the modulation data based on a high-frequency clock having a frequency far higher than that of a pixel clock, and thereby generates a pulse width modulation signal PWM. This mechanism is the main feature of the pulse width modulation signal generation circuit 10. A shift register may be used for the serial modulation signal generation circuit 13.

Figure 15:
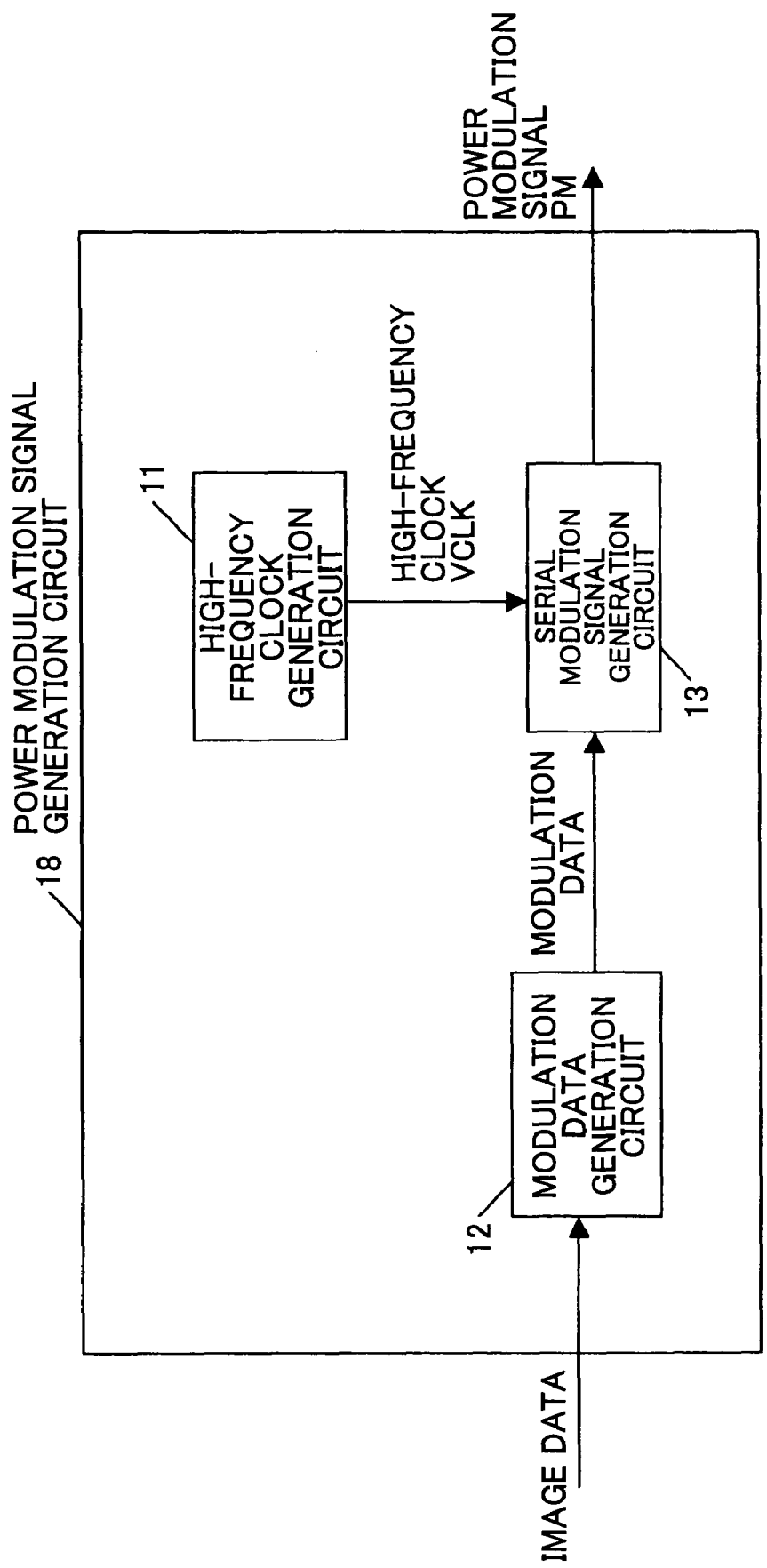
FIG. 15 is a diagram showing an exemplary power modulation signal generation circuit that generates a power modulation signal.

FIG. 15 is a diagram showing an exemplary power modulation signal generation circuit 18 that generates a power modulation signal. In the power modulation signal generation circuit 18 shown in FIG. 15, image data input to the modulation data generation circuit 12 represent the amount of light emitted from each light source. The modulation data generation circuit 12 modulates the intensity of the signal of the image data. The serial modulation signal generation circuit 13 serially outputs a power signal corresponding to the light intensity of the modulated signal based on a high-frequency clock generated by a high-frequency clock generation circuit 11 which high-frequency clock having a frequency far higher than that of a pixel clock, and thereby generates a power modulation signal PM.

Figure 16:
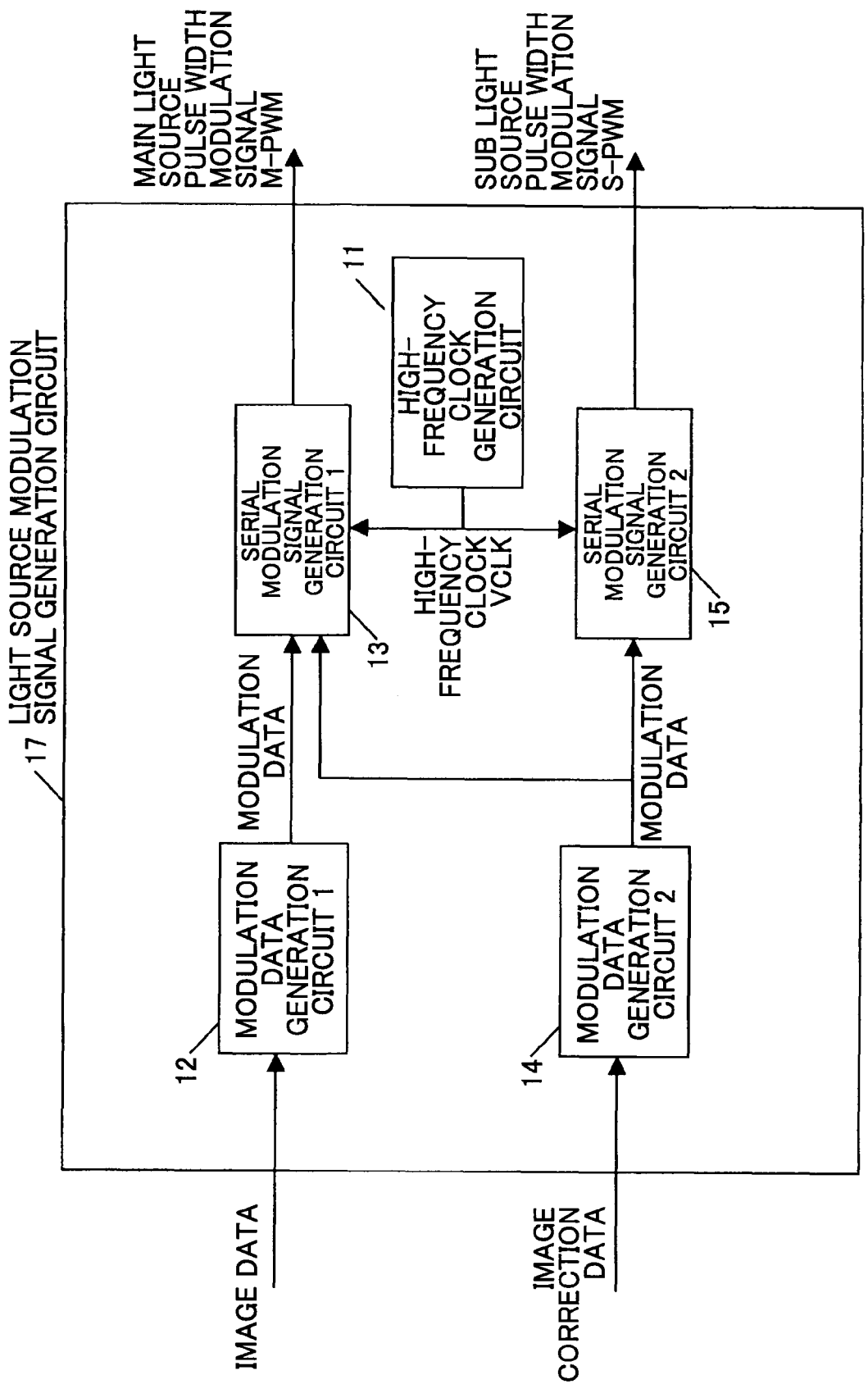
FIG. 16 is a diagram showing an exemplary circuit for controlling two light sources using, as control data, image data and image correction data.

FIG. 16 is a diagram showing an exemplary circuit for controlling two light sources using, as control data, image data and image correction data. Image data in this case may be a scanned image of a copier or print data of a printer. Image correction data in this case may include data for correcting the pixel position in the sub scanning direction, such as pixel position correction data generated by a pixel-position-in-sub-scanning-direction detecting unit (described below). The pixel-position-in-sub-scanning-direction detecting unit may be implemented by using a technology disclosed in Japanese Patent No. 3644923 that enables detection of misalignment and density of toner images with a simple configuration.

A color image forming apparatus disclosed in Japanese Patent No. 3644923 forms at least three or more position-detection toner marks at plural positions in a main scanning direction orthogonal to a transport direction, and detects misalignment of the position-detection toner marks by using three or more sensors. The color image forming apparatus also forms, in order to correct the density of toner images formed by image forming units, a density-detection toner patch on a transport belt, and detects the density of the density-detection toner patch by using at least one of the three or more sensors used for detecting misalignment of the position-detection toner marks. It is thus possible to detect misalignment and density of the toner images can be detected with a simple configuration. The misalignment distance of the toner images may be used as the above-mentioned pixel position correction data, i.e., as the image correction data so as to correct pixel position misalignment in the sub scanning direction.

As shown in FIG. 16, the image data are converted into modulation data by a first modulation data generation circuit 12, and the modulation data are input to a first serial modulation signal generation circuit 13. The first serial modulation signal generation circuit 13 and a second serial modulation signal circuit 14 output pulse width modulation signals based on modulation data and high frequency clock output from a high frequency clock generation circuit 11.

Figure 17:
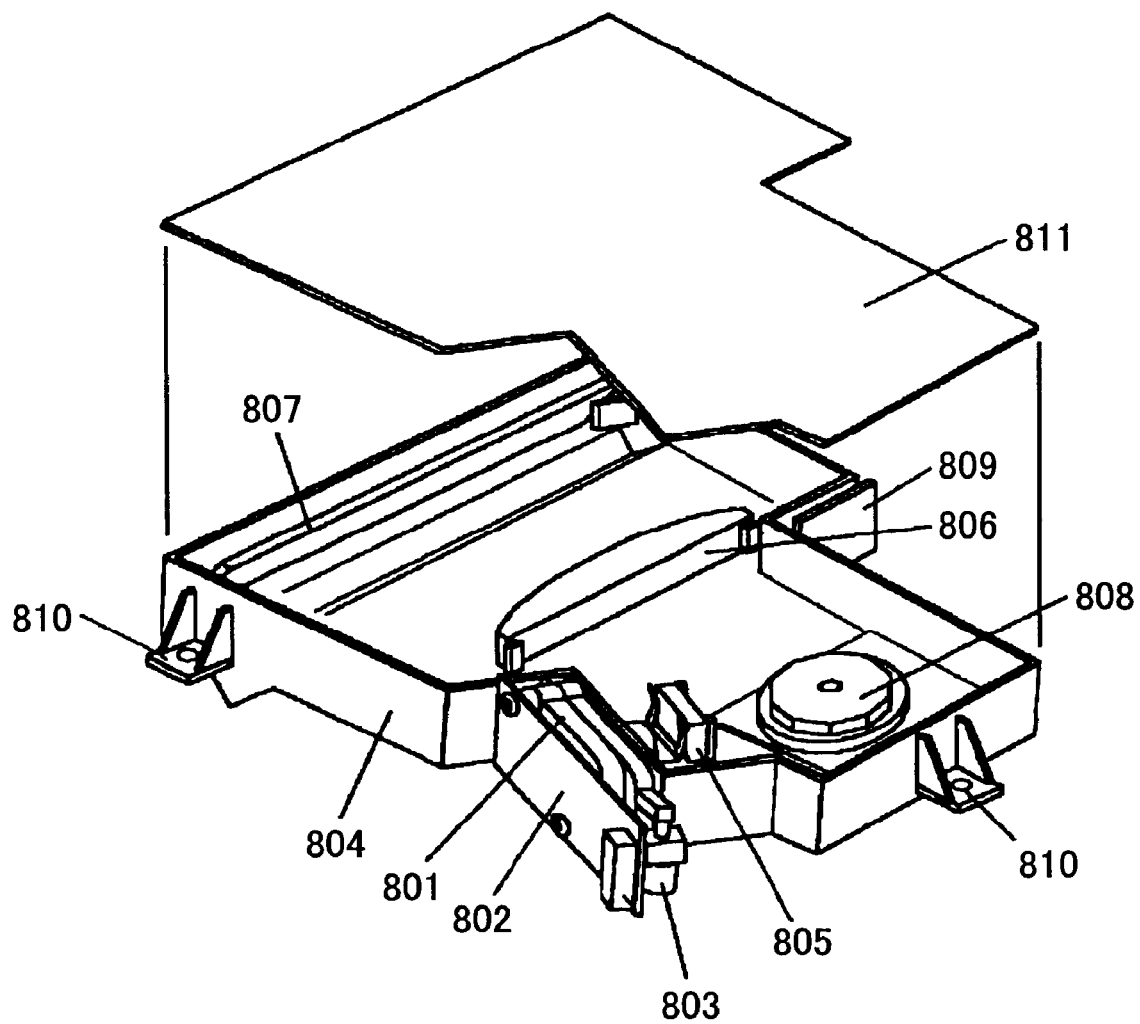
FIG. 17 is a diagram showing an exemplary image forming apparatus using a light scanning apparatus according to an embodiment of the present invention.

FIG. 17 is a diagram showing an exemplary image forming apparatus using a light scanning apparatus according to an embodiment of the present invention. As shown in FIG. 17, a printed circuit board 802 is attached to the back of a light source unit 801, on which printed circuit board 802 a control circuit for controlling a semiconductor laser and a pixel clock generation device are formed. The printed circuit board 802 is brought into contact by a spring with the surface of an optical housing which surface intersects orthogonally with a light axis and is fixed by an adjusting screw 803 in a position to form an appropriate angle. The adjusting screw 803 is screwed into a protrusion on the surface of the optical housing. In the optical housing, a cylinder lens 805, a polygon motor 808 for rotating a polygon mirror, a fθ lens 806, a toroidal lens, and a reflection mirror 807 are fixed in position. A printed circuit board 809 is attached to an external surface of the optical housing in a similar manner as the light source unit 801. The upper side of the optical housing is covered by a cover 811. The optical housing is fixed by screws at attaching sections 810, protruding from the surface of the optical housing, onto the frame of the image forming apparatus.

In the image forming apparatus, a semiconductor laser array or a surface emitting laser array having plural light sources as shown in FIG. 2 may be used as a semiconductor laser unit. Laser beams emitted from the semiconductor laser unit (surface emitting laser array) pass through the cylinder lens 805, are deflected by the polygon mirror through its rotation, and is scanned onto a photoreceptor drum (not shown) via the fθ lens 806, the toroidal lens, and the reflection mirror 807. Laser beams not scanned onto the photoreceptor drum or some of laser beams reflected by the mirrors are detected by sensors. For example, a synchronization detecting sensor detects the time interval between two points in the main scanning direction corresponding to the rotation direction of the polygon mirror; and a position detection sensor detects a misalignment distance in the sub scanning direction that is orthogonal to the main scanning direction. The detected values are fed back to an LD control unit, a modulation circuit, or a modulation data generation unit to correct the position of a pixel.

A multibeam scanning apparatus (multibeam optical system) using plural light sources is described below.

Figure 18:
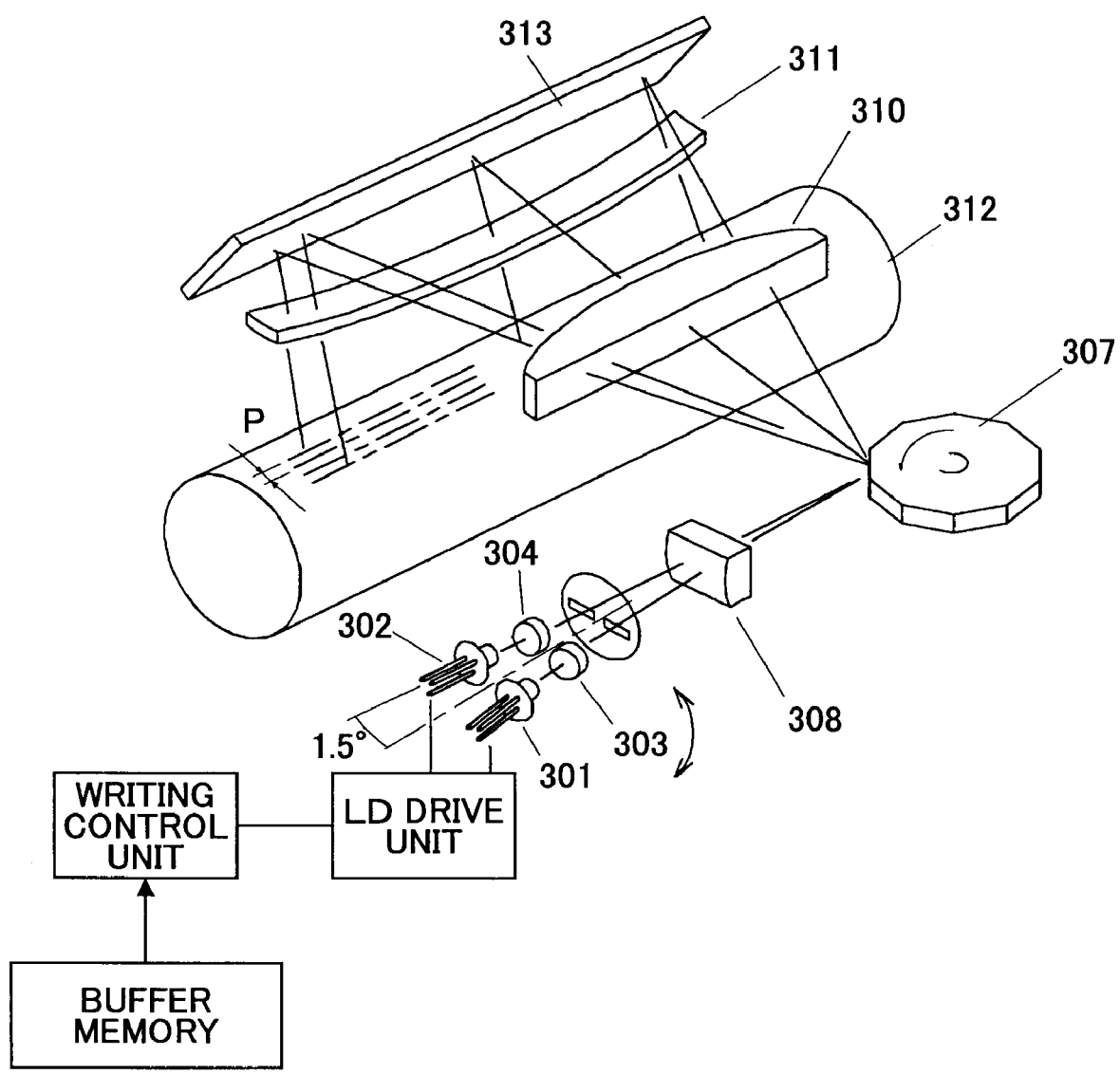
FIG. 18 is a diagram showing an exemplary multibeam scanning apparatus.

In the exemplary multibeam scanning apparatus shown in FIG. 18, two semiconductor laser arrays 301 and 302 each having two light-emitting elements (four channels) monolithically arranged at an interval of ds=25 μm are used (eight light sources in total).

As shown in FIG. 18, the semiconductor laser arrays 301 and 302 are positioned so as to have their light axes match the light axes of collimate lenses 303 and 304, respectively; their light-emission angles be symmetric to each other in the main scanning direction; and their light-emission axes intersect with each other at a reflecting point on a polygon mirror 307. Plural laser beams emitted from the semiconductor laser arrays 301 and 302 pass through the cylinder lens 308, are deflected and scanned by the polygon mirror 307, pass through a fθ lens 310 and a toroidal lens 311, and form an image on a photoreceptor 312. Print data of one line are held into a buffer memory for each light-emitting element. Print data of four lines are retrieved for each side of the polygon mirror 307 from the buffer memory and are recorded at a time onto the photoreceptor 312.

According to an embodiment of the present invention, the differences in optical scan length or magnification of laser beams due to wavelength differences of LDs providing the laser beams are corrected by shifting the phases of pixel clocks. This mechanism makes it possible to correct the differences in optical scan length with an accuracy of up to the phase shift level, thereby reducing the variations of scanned laser beams.

Figure 19:
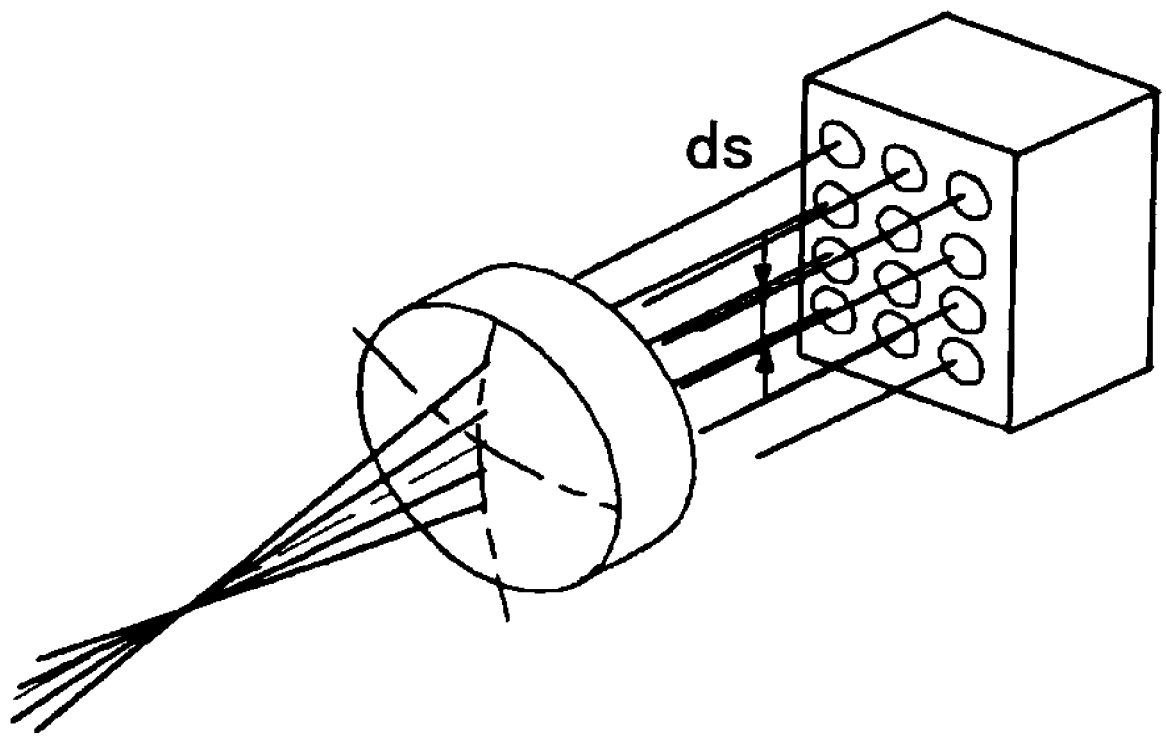
FIG. 19 is a diagram showing an exemplary light source unit.

FIG. 19 is a drawing illustrating an exemplary light source unit of a light scanning apparatus. This light source unit is implemented with a two-dimensional surface emitting laser array having a two-dimensional array of plural surface emitting lasers. The two-dimensional surface emitting laser array shown in FIG. 19, has three light-emitting elements (surface emitting lasers) in the horizontal direction, four in the longitudinal direction, for a total of twelve light-emitting elements.

Figure 20:
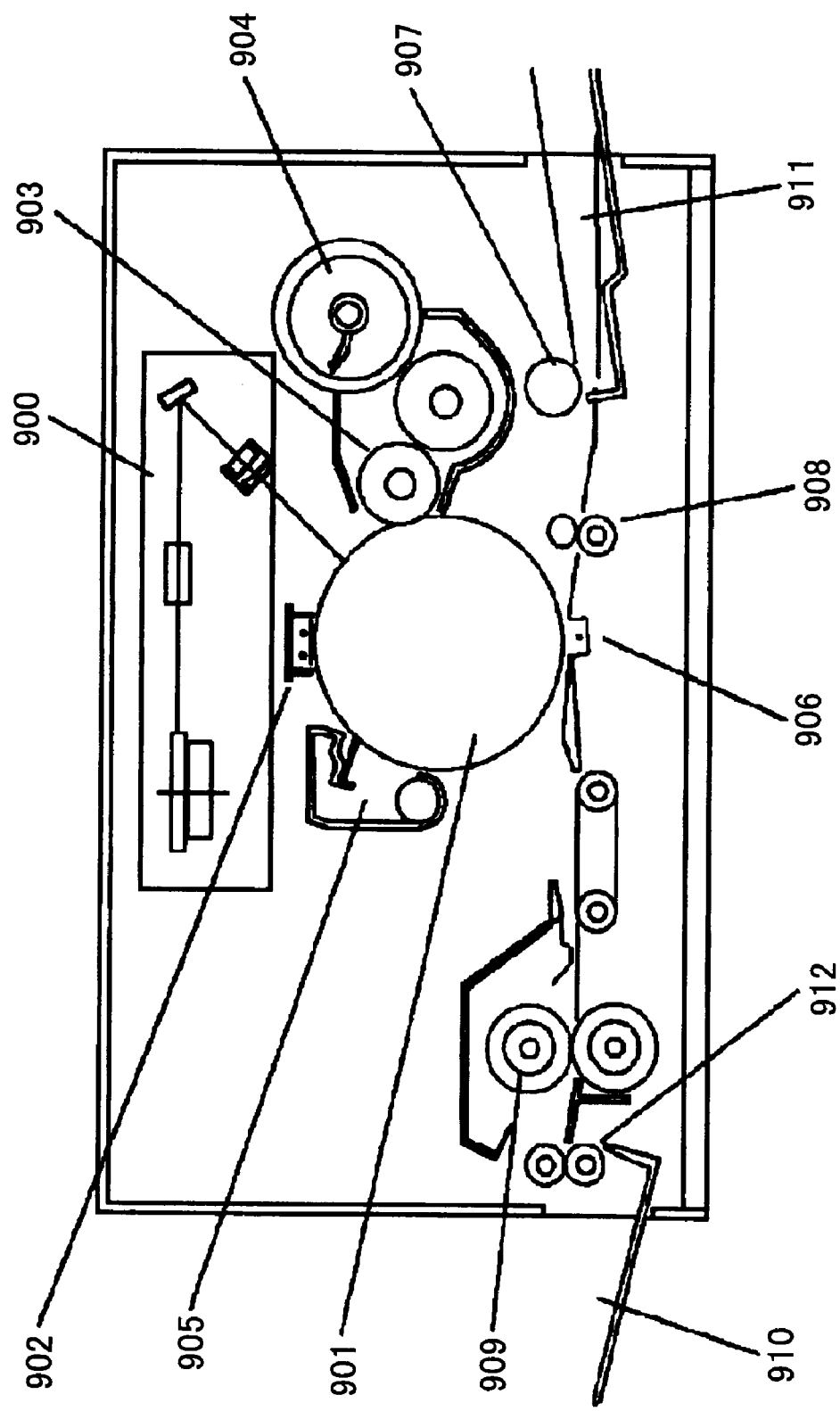
FIG. 20 is a diagram showing an exemplary configuration of an image forming apparatus according to an embodiment of the present invention.

FIG. 20 is a diagram showing an exemplary configuration of an image forming apparatus according to an embodiment of the present invention. As shown in FIG. 20, around a photoreceptor drum (to-be scanned surface) 901, there are disposed a charger 902 for charging the photoreceptor drum 901 with a high voltage, a development roller 903 for developing an image by transferring charged toner onto an electrostatic latent image recorded by a light scanning apparatus 900, a toner cartridge 904 for supplying toner to the development roller 903, and a cleaning case 905 for removing and holding toner remaining on the photoreceptor drum 901. As mentioned above, plural lines of an image are statically recorded at a time onto the photoreceptor drum 901. A paper feed roller 907A feeds paper from a paper feed tray 911. A pair of resist rollers 908 transports the paper in accordance with the timing of starting recording in the sub scanning direction. A transfer charger 906 transfers toner onto the paper when the paper passes between the photoreceptor drum 901 and the transfer charger 906. A fixing roller 909 fixes the transferred toner onto the paper. Then, a paper ejection roller 912 ejects the paper onto a catch tray 910. Using a light scanning apparatus according to an embodiment of the present invention as the light scanning apparatus 900 of the image forming apparatus described above enables precise correction of dot positions, thereby making it possible to provide a high-quality image.

Figure 21:
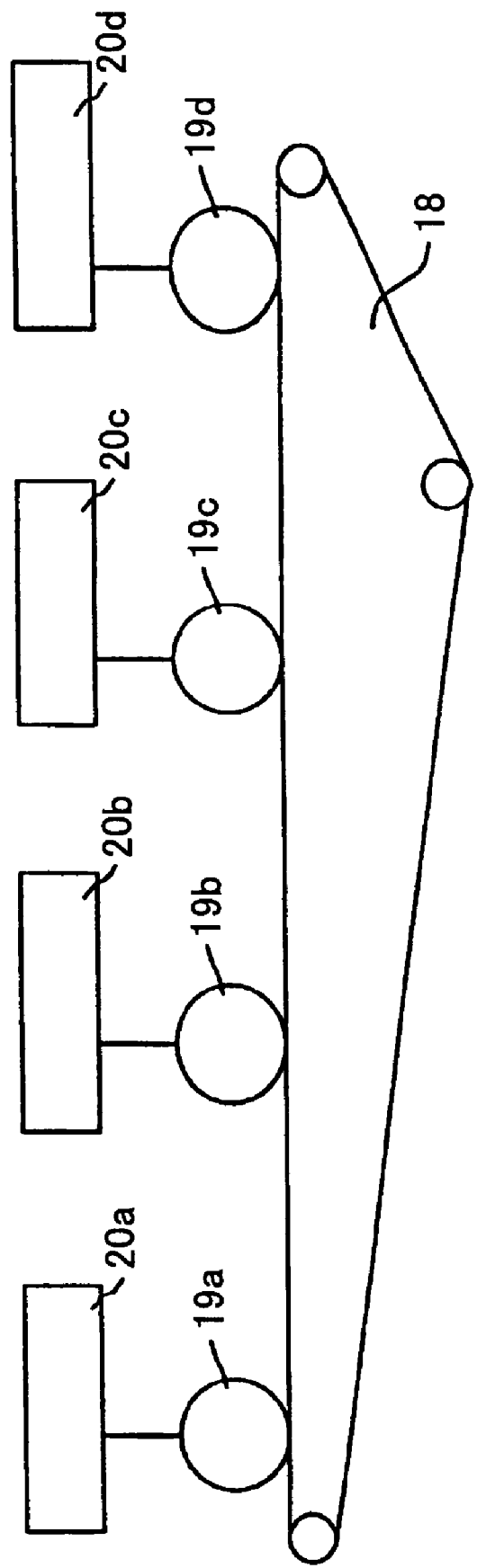
FIG. 21 is a diagram showing an exemplary color image forming apparatus.

The present invention can also be applied to a color image forming apparatus. FIG. 21 is a drawing illustrating an example of applying the present invention to a tandem color image forming apparatus having plural photoreceptors. A typical tandem color image forming apparatus includes photoreceptors one for each color: cyan, magenta, yellow, and black. The tandem color image forming apparatus also includes light scanning optical systems one for each of the photoreceptors, which light scanning systems form electrostatic latent images onto the corresponding photoreceptors through different light paths. Therefore, dot misalignment in the sub scanning direction on each photoreceptor may have different characteristics.

In FIG. 21, 18 indicates a transfer belt; 19a, 19b, 19c, and 19d indicate photoreceptors each corresponding to a different color; and 20a, 20b, 20c, and 20d indicate light scanning apparatuses each corresponding to a different color.

Using light scanning apparatuses according to an embodiment of the present invention as the light scanning apparatuses 20a, 20b, 20c, and 20d enables precisely correcting the positions of dots in the sub scanning direction, thereby making it possible to provide a high-quality image. Embodiments of the present invention are especially effective in correcting dot positions in the sub scanning direction. Embodiments of the present invention minimize a color shift between stations, thereby providing excellent color reproducibility.

Figure 22:
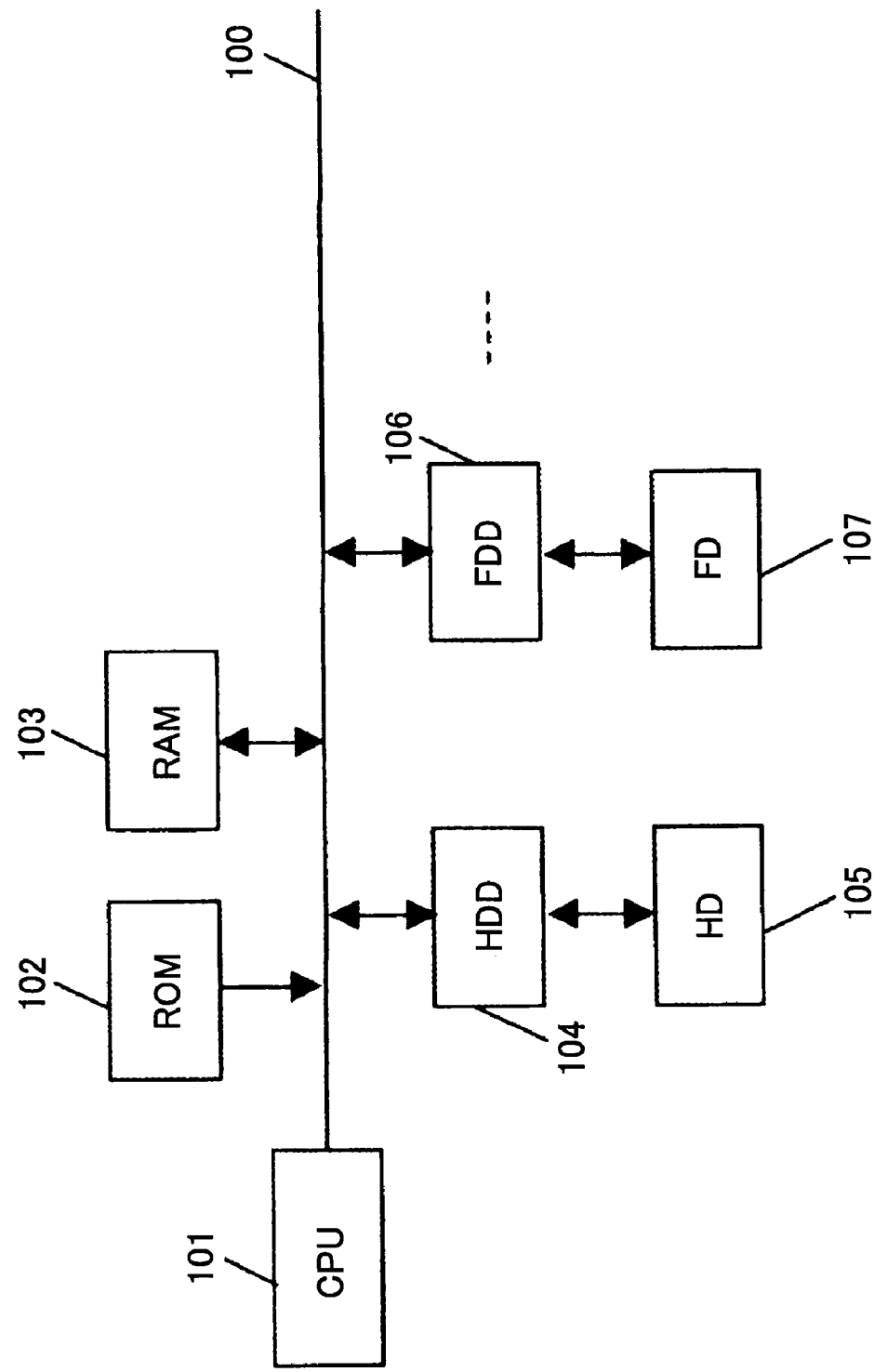
FIG. 22 is a block diagram showing an exemplary hardware configuration of a light source control unit of a light scanning apparatus according to an embodiment of the present invention.

FIG. 22 is a block diagram showing an exemplary hardware configuration of a light source control unit 50 of a light scanning apparatus according to an embodiment of the present invention. In this example, the light source control unit 50 includes a CPU 101, a ROM 102, a RAM 103, a hard disk drive (HDD) 104, a hard disk (HD) 105, a flexible disk drive (FDD) 106, a flexible disk (FD) 107, and a bus 100. The CPU 101, the ROM 102, the RAM 103, the HDD 104, and the FDD 106 are connected by the bus 100.

The CPU 101 controls the entire operation of the light scanning apparatus. The ROM 102 stores a control program. The RAM 103 is a work area for the CPU 101. The HDD 101 controls operations of reading data from and writing data into the HD 105 under the control of the CPU 101. The HD 105 stores data written by the HDD 104. The FDD 106 controls operations of reading data from and writing data into the FD 107 under the control of the CPU 101. The FD 107 is detachably inserted in the FDD 106 and stores data written by the FDD 106.

The functions of the light source control unit 50 according to embodiments of the present invention may be implemented by a program executable by a computer (for example, the CPU 101).

A program for causing a computer to perform the functions of the light source control unit 50 according to embodiments of the present invention may be stored in a computer-readable recording medium, such as a hard disk (105), floppy (registered trademark) disk, CD-ROM, MO, or DVD, and loaded and executed by a computer. Such a program may also be distributed via a network such as the Internet in the form of the recording medium described above.

The following describes other preferred embodiments of the present invention with reference to the accompanying drawings. It is to be noted that, in the present invention, a pixel indicates a simple pixel (e.g. a pixel in a 1,200 dpi image has a size of about 21 µm square), and does not indicate a compound pixel formed of plural pixels (e.g. 4×4 pixels) as in a dither matrix.

Figure 24:
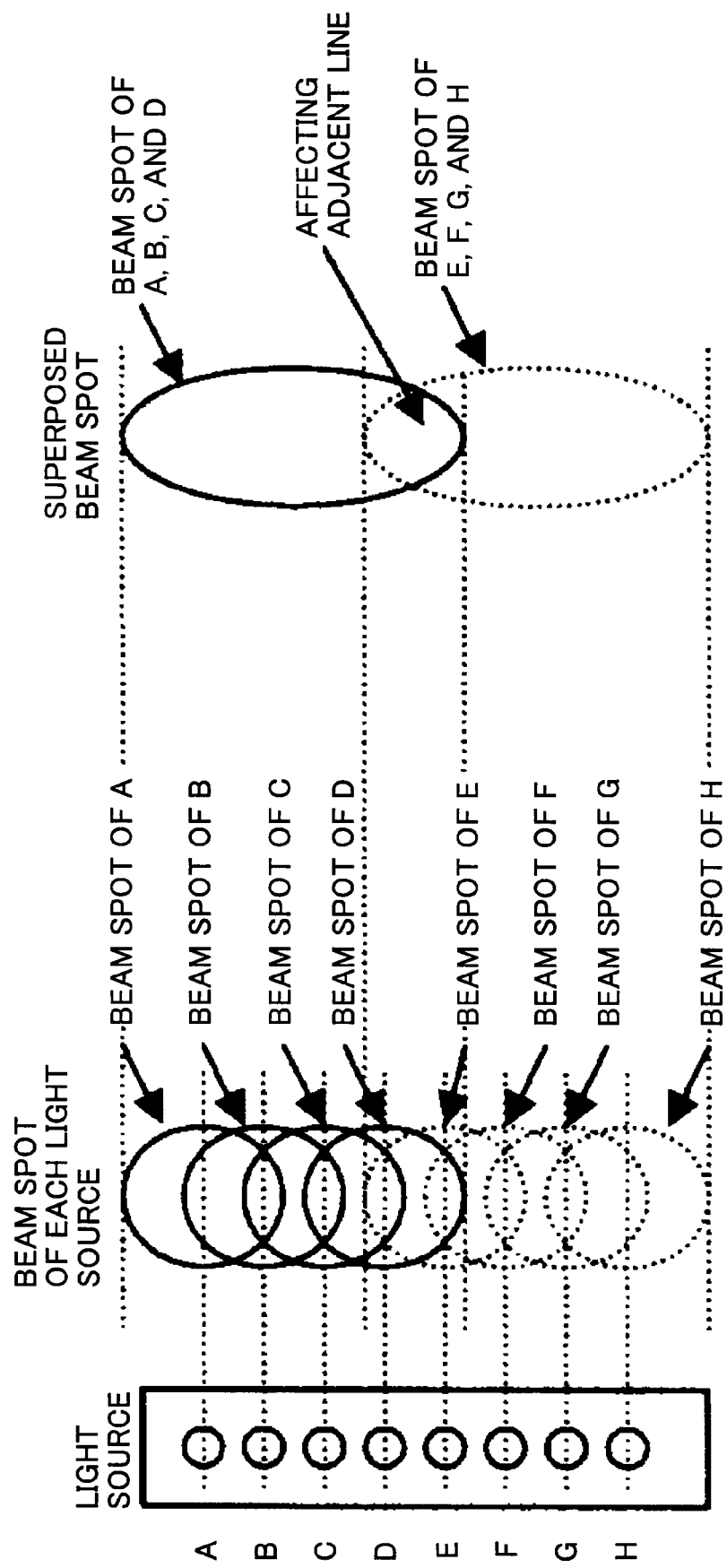
FIG. 24 is a diagram showing an example of forming one pixel by using plural light sources each of which requires less current and provides less light.
Figure 26:
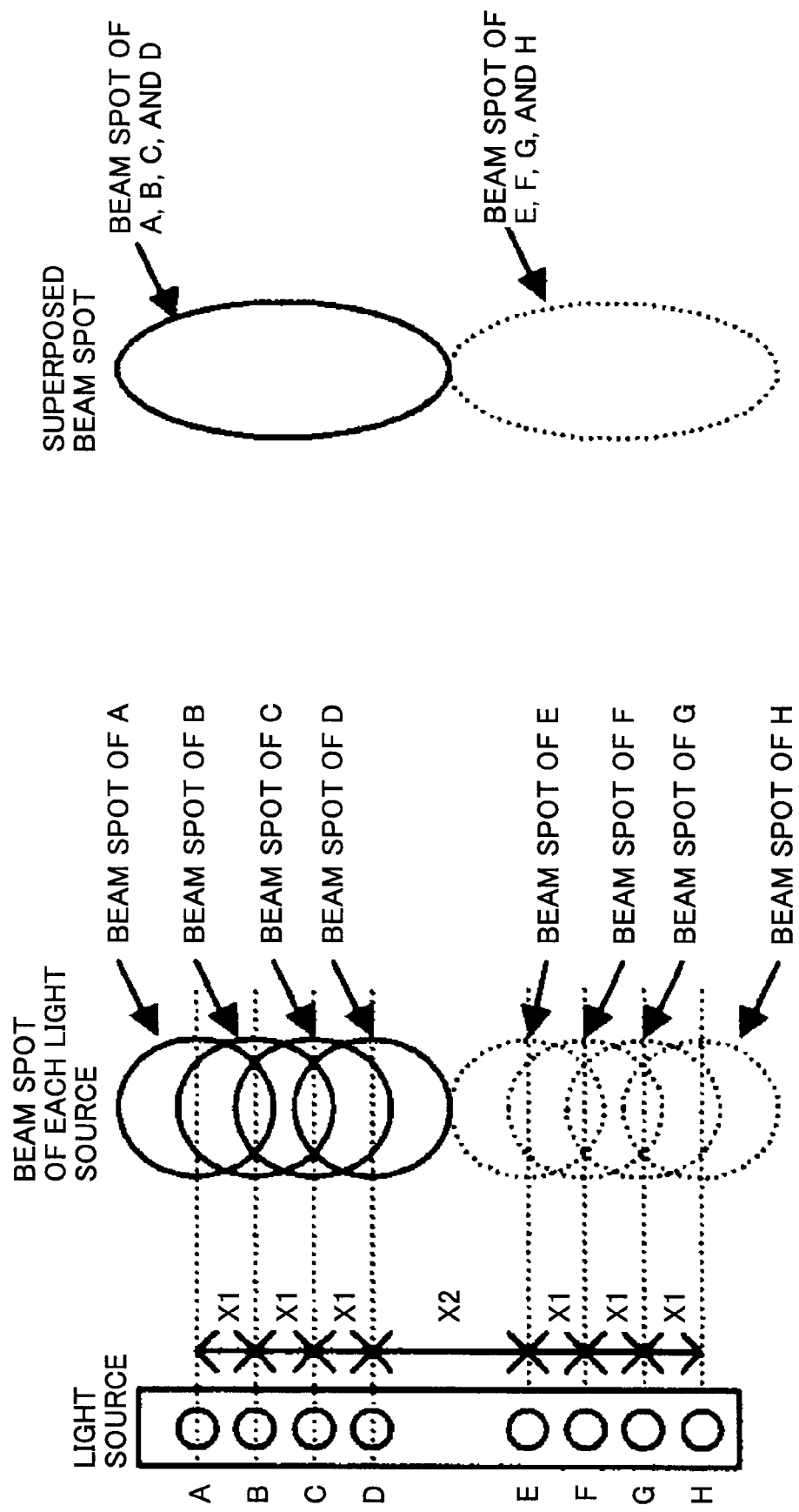
FIG. 26 is a diagram showing an embodiment of the present invention.
Figure 27:
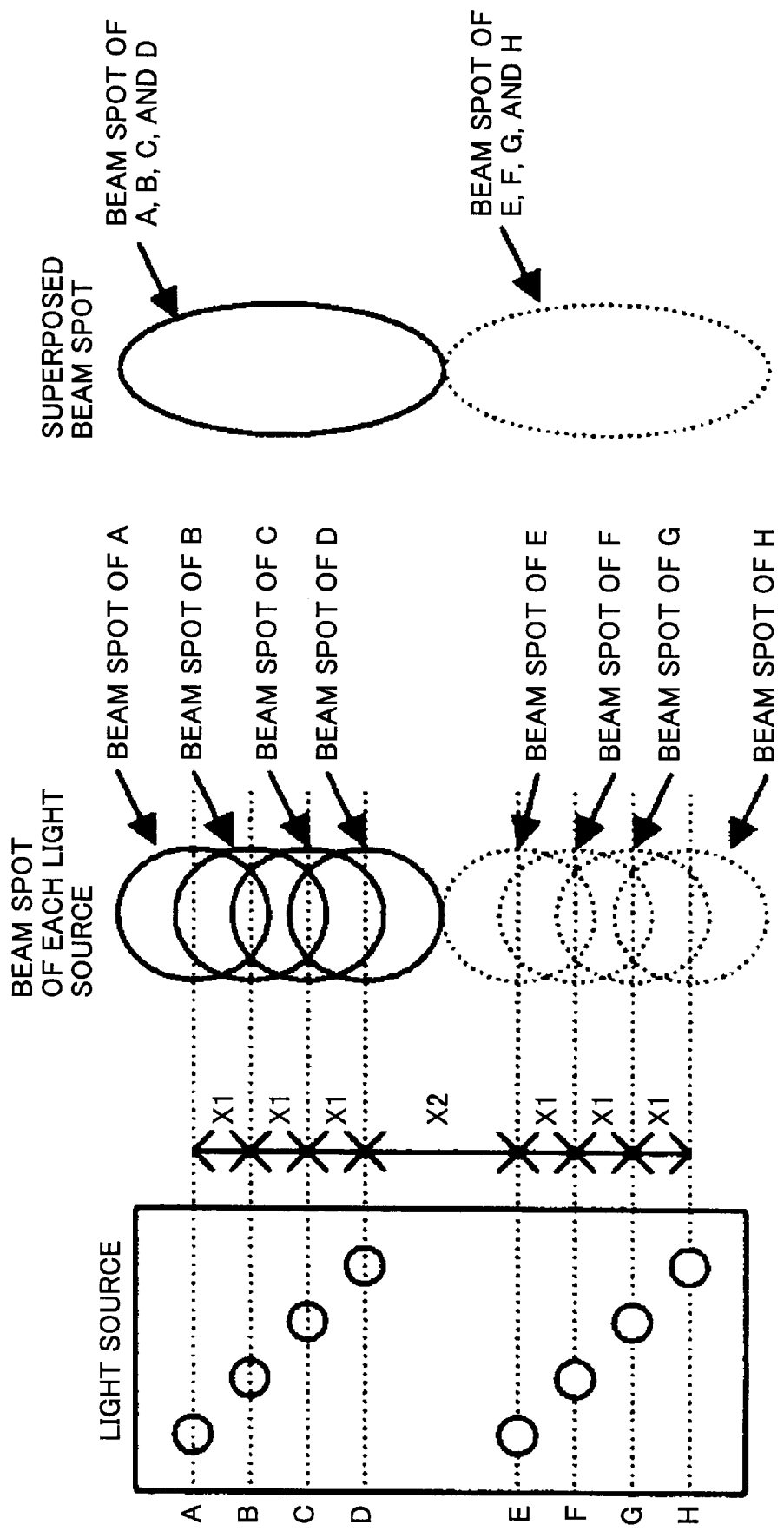
FIG. 27 is a diagram showing an embodiment of the present invention.

In the following description, by N light sources "disposed at different positions at least in a sub scanning direction" is meant not only that N light sources disposed in an array in a sub scanning direction as shown in FIGS. 24 and 26 and but also N light sources disposed as shown in FIG. 27, for example.

In one embodiment of the present invention, there is provided a light scanning apparatus comprising: N light sources in different positions at least in a sub scanning direction, wherein M (N≧2M≧4) light sources, of which scanning positions are adjacent to each other in the sub scanning direction, out of the N light sources form a light source group; an L th (L≧1) light source group is adjacent to an (L+1) th light source group in the sub scanning direction; the M light sources of each of the light source groups are spaced apart from each other by a first distance X1 in the sub scanning direction; and one of the light sources of the L th light source group, of which one of the light sources scanning position is adjacent to one of the light sources of the (L+1) th light source group, is spaced apart from said one of the light sources of the (L+1) th light source group by a second distance X2, the second distance X2 being greater than the first distance X1.

Each light source uses semiconductor lasers (e.g. surface emitting lasers).

More specifically, each light source is configured as, for example, a semiconductor laser array (e.g. surface emitting laser array).

Figure 25:
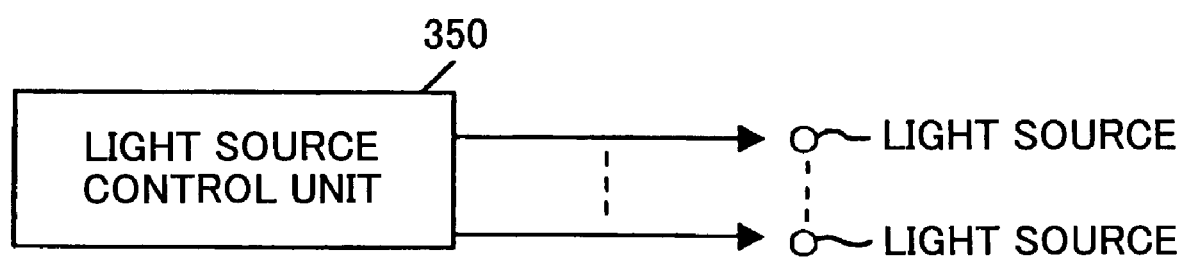
FIG. 25 is a diagram showing an exemplary configuration of a light scanning apparatus according to an embodiment of the present invention.

FIG. 25 is a diagram showing an exemplary configuration of a light scanning apparatus according to an embodiment of the present invention. As shown in FIG. 25, a light scanning apparatus according to an embodiment of the present invention includes a light source control unit 350 that controls plural light sources. The light source control unit 350 controls the light sources such that laser beams of M (N≧2M≧4) light sources forming a light source group to form a pixel.

FIGS. 26 and 27 are diagrams each showing an embodiment of the present invention.

FIG. 26 shows an example of forming one pixel by using plural light sources each of which requires less current and provides less amount of light. In FIG. 26, N light sources (eight light sources) are aligned in a sub scanning direction. More specifically, the N light sources (in FIG. 26, eight light sources) A through H are aligned in the sub scanning direction, and each light source group (in FIG. 26, each group of four light sources) forms one pixel. The term "light source group" as used herein indicates M light sources (in FIG. 26, four light sources) out of the N light sources, scanning positions of which M light sources are adjacent to each other in the sub scanning direction. That is, in the example shown in FIG. 26, among the eight light sources, a first light source group (the light sources A, B, C, and D) is used to form one pixel; and a second light source group (the light sources E, F, G, and H) is used to form one pixel.

In FIG. 26, where each of the intervals between the light sources A and B, between the light source B and the light source C, between the light source C and the light source D, between the light source E and the light source F, between the light source F and the light source G, and between the light source G and the light source H is a distance X1 and the interval between the light source D and the light source E is a distance X2, X2>X1 is satisfied by adjusting the distances X1 and X2 based on spread of beams and pixel density as described below. This arrangement prevents a beam spot formed by superposition of beam spots of the light sources A, B, C, and D and a beam spot formed by superposition of beam spots of the light sources E, F, G, and H from overlapping each other, thereby reducing (e.g. eliminating) adverse effects on a line (pixel) adjacent in the sub scanning direction due to the spread of beams.

FIG. 27 shows another example of forming one pixel by using plural light sources each of which requires less current and provides less amount of light. In FIG. 27, N light sources (eight light sources) are arranged in two dimensions. More specifically, the N light sources (eight light sources) A through H are arranged in two dimensions. Among the eight light sources, a first light source group (the light sources A, B, C, and D) is used to form one pixel; and a second light source group (the light sources E, F, G, and H) is used to form one pixel.

In FIG. 27, where each of the intervals in the sub scanning direction between the light sources A and B, between the light source B and the light source C, between the light source C and the light source D, between the light source E and the light source F, between the light source F and the light source G, and between the light source G and the light source H is a distance X1 and the interval between the light source D and the light source E in the sub scanning direction is a distance X2, X2>X1 is satisfied by adjusting the distances X1 and X2 based on spread of beams and pixel density as described below. This arrangement prevents a beam spot formed by superposition of beam spots of the light sources A, B, C, and D and a beam spot formed by superposition of beam spots of the light sources E, F, G, and H from overlapping each other, thereby reducing (e.g. eliminating) adverse effects on a line (pixel) adjacent in the sub scanning direction due to the spread of beams.

Figure 28:
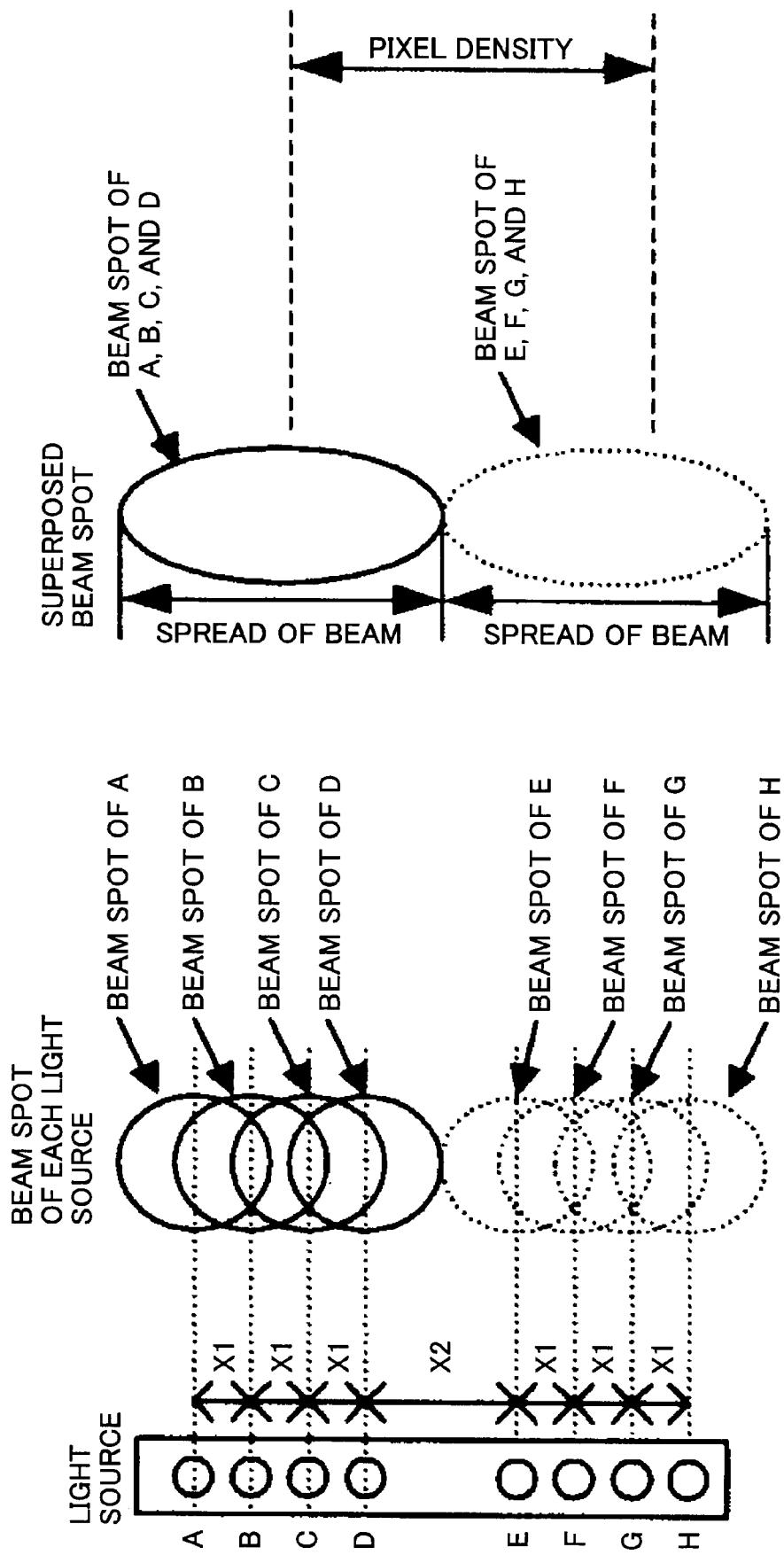
FIG. 28 is a diagram used to describe a method of adjusting distances X1 and X2 based on spreading of light beams and pixel density.

FIG. 28 is a diagram used to describe a method of adjusting distances X1 and X2 based on spreading of light beams and pixel density (in FIG. 28, the arrangement of light source arrays of FIG. 26 is employed). With reference to FIG. 28, based on spreading of light beams and pixel density (pitch between the light beams on the to-be-scanned surface), the distance X2 is first decided, and then the distance X1 is decided.

As described above, in one embodiment of the present invention, there is provided a light scanning apparatus comprising: N light sources in different positions at least in a sub scanning direction, wherein M (N≧2M≧4) light sources, of which scanning positions are adjacent to each other in the sub scanning direction, out of the N light sources form a light source group; an L th (L≧1) light source group is adjacent to an (L+1) th light source group in the sub scanning direction; the M light sources of each of the light source groups are spaced apart from each other by a first distance X1 in the sub scanning direction; and one of the light sources of the L th light source group, of which one of the light sources scanning position is adjacent to one of the light sources of the (L+1) th light source group, is spaced apart from said one of the light sources of the (L+1) th light source group by a second distance X2, the second distance X2 being greater than the first distance X1. This embodiment makes it possible to form a pixel using a light source array (plural light sources). That is, it is possible to reduce a current to be applied to each of the light sources, and thereby reduce power consumption. In addition, when forming a pixel using a light source array (plural light sources), it is possible to reduce adverse effects on an adjacent line (adjacent pixel) due to spreading of light beams of a light source array (plural light sources).

Although the amounts of lights of the light sources are equal to each other in the examples of FIGS. 26 and 27, the proportions of the amount of lights of the light sources may be changed so as to shift the centroid of the beam spot formed by superposition of the light beams, thereby accurately correcting the position of a pixel in the sub scanning direction.

That is, in the light scanning apparatus having the above described configuration, the light source control unit 350 may be configured to control the M light sources to shift the centroid of a pixel in the sub scanning direction.

Figure 29:
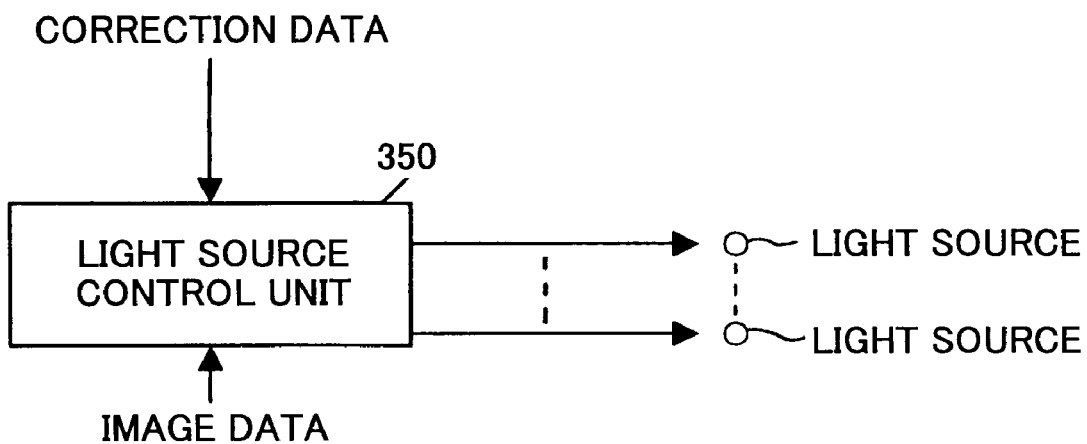
FIG. 29 is a diagram showing an exemplary configuration of a light scanning apparatus according to an embodiment of the present invention.

More specifically, as shown in FIG. 29, the light source control unit 350 may be configured to control the M light sources to shift the centroid of a pixel by a distance in the sub scanning direction according to correction data containing information to correct the position of the centroid of the pixel in the sub scanning direction.

Figure 30:
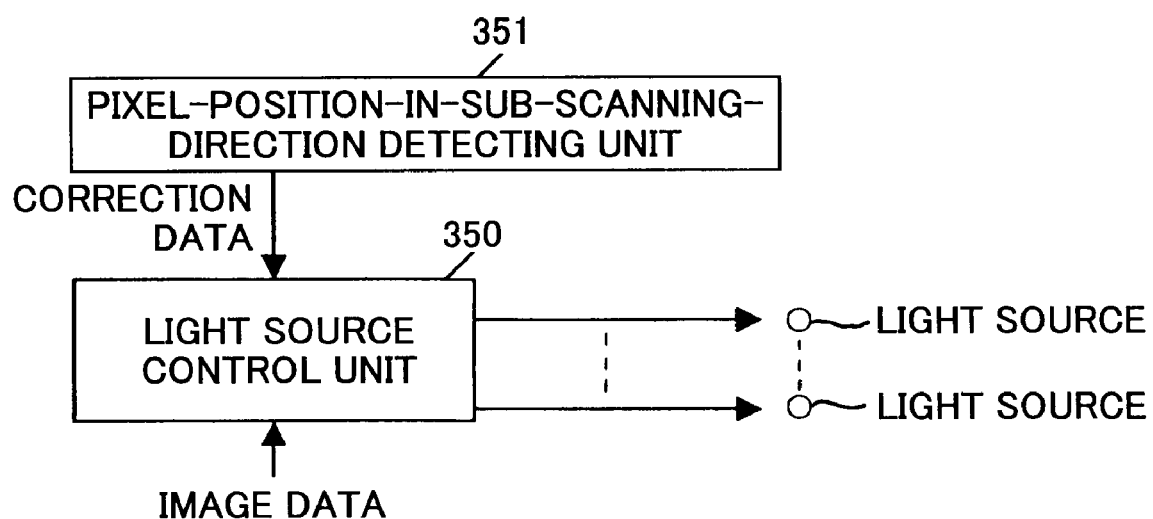
FIG. 30 is a diagram showing an exemplary configuration of a light scanning apparatus according to an embodiment of the present invention.

As shown in FIG. 30, a light scanning apparatus according to an embodiment of the present invention may include a pixel-position-in-sub-scanning-direction detecting unit 351 that detects the position of a pixel in the sub scanning direction and generates correction data containing information to correct the position of the centroid of the pixel in the sub scanning direction. In this case, the light source control unit 350 may be configured to control M light sources to shift the centroid of a pixel by a distance in the sub scanning direction according to the correction data generated by the pixel-position-in-sub-scanning-direction detecting unit 351.

The pixel-position-in-sub-scanning-direction detecting unit 351 may be implemented by using a technology disclosed in Japanese Patent No. 3644923.

A color image forming apparatus disclosed in Japanese Patent No. 3644923 includes two or more image forming units arranged along a transport direction of a transport belt each of which image forming units is configured to form an image of a different color using an electrophotographic system; three or more sensors aligned in the main scanning direction orthogonal to the transport direction of the transport belt so as to cover the center and both sides of the main scanning direction; a toner mark forming unit configured to cause the image forming unit to form position detection toner marks of different colors in positions on the transport belt which positions corresponding to the positions of the sensors, and a misalignment distance detection unit configured to detect the misalignment distance of a color from a base color at each sensor position based on the output from a corresponding sensor that reads the corresponding position detection toner mark. This misalignment distance detection unit may be used as the pixel-position-in-sub-scanning-direction detecting unit 351 of an embodiment of the present invention.

More accurately, the pixel-position-in-sub-scanning-direction detecting unit 351 according to an embodiment of the present invention is configured to generate correction data containing information to correct the position of the centroid of a pixel in the sub scanning direction based on the misalignment distance detected by the misalignment distance detection unit disclosed in Japanese Patent No. 3644923.

FIGS. 31 through 35 are drawings used to describe exemplary methods of controlling M light sources by the light source control unit 350.

Figure 31:
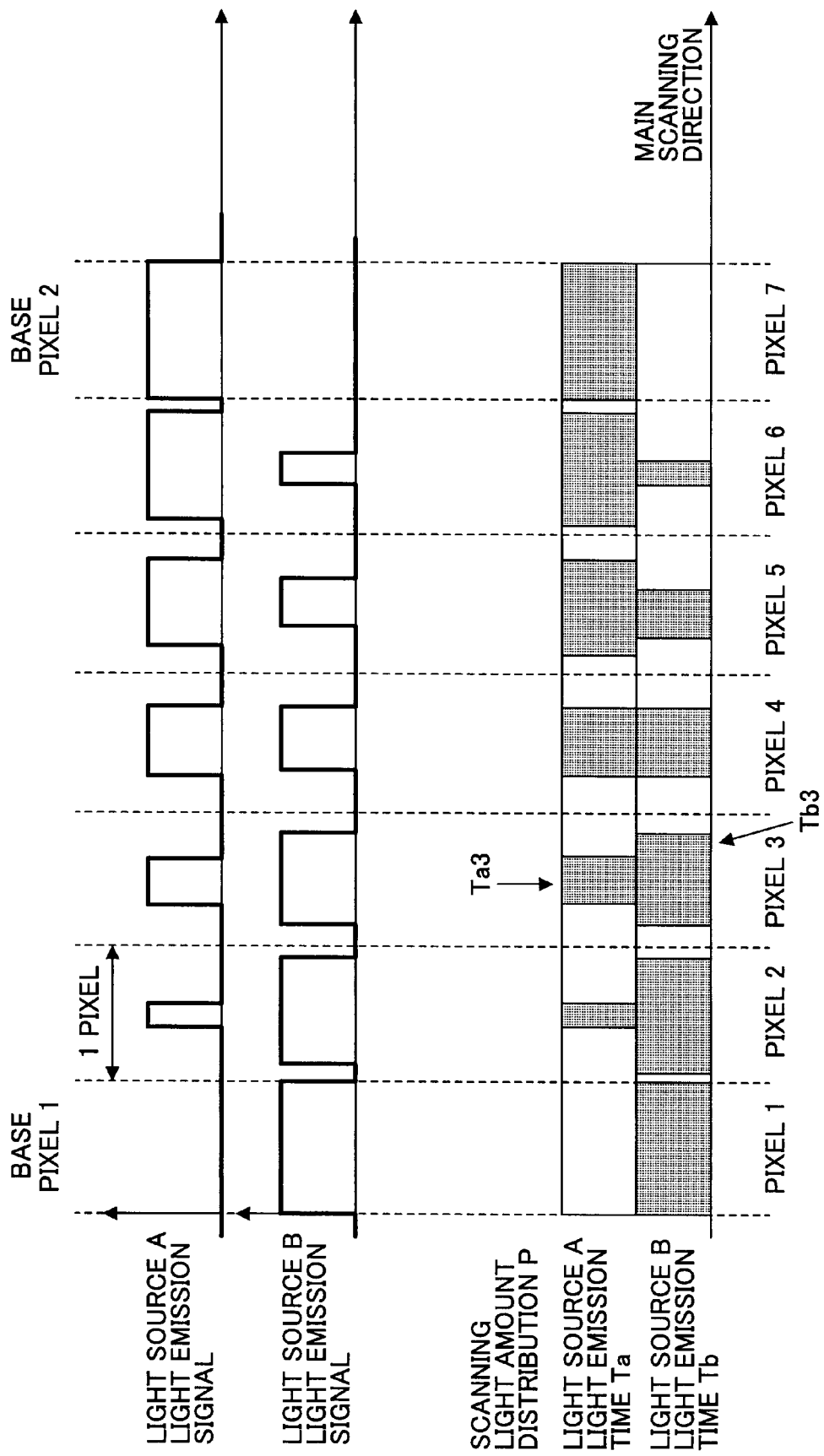
FIG. 31 is a drawing used to describe an exemplary method of controlling M light sources to shift the centroid of a pixel in the sub scanning direction.

FIG. 31 is a drawing used to describe an exemplary method of controlling M light sources to shift the centroid of a pixel in the sub scanning direction, where the proportions of the light emission time of the M light sources are changed while not changing the total light emission time of the M light sources. In FIG. 31, M light sources are composed of light sources A and B. Light emission signals of the light sources A and B are shown in the upper part of the drawing and the light amount distribution formed by light beams scanned by the light sources A and B onto a photoreceptor is shown in the lower part of the drawing with the rightward direction being the main scanning direction.

With reference to FIG. 31, for a pixel 1, only the light source B emits light. In the order from a pixel 1, 2, 3, . . . the light emission time of the light source B becomes shorter and the light emission time of the light source A becomes longer. For a pixel 4, the light emission time of the light sources A and B is the same. When the pixel 4 is assumed as a base pixel, the centroids of the pixels 5, 6, and 7 are misaligned in the upward sub scanning direction or upward direction in FIG. 31. On the other hand, misalignment of the pixel centroid of increases in the downward sub scanning direction or downward direction in FIG. 31 in the order from the pixel 3, 2, 1 . . . . The pixel centroid can be shifted in the sub scanning direction by changing the proportions of the light emission time of the light sources A and B while not changing the total light emission time. Take the pixel 3 for example. When the light emission time of the light source A is Ta3 and the light emission time of the light source B is Tb3, the proportions of the light emission time of the light sources A and B are changed so that Tall (total light emission time)=Ta3+Tb3=Tan+Tbn (n is a natural number) is true. For example, the misalignment distance detection unit disclosed in Japanese Patent No. 3644923 can be used to measure, by patch measurement, the distance of misalignment of a toner image in the sub scanning direction. The pixel-position-in-sub-scanning-direction detecting unit 351 generates correction data based on the measured misalignment distance. Misalignment of a pixel can be corrected by changing the proportions of the light emission time of light sources as described above based on the correction data.

Figure 32:
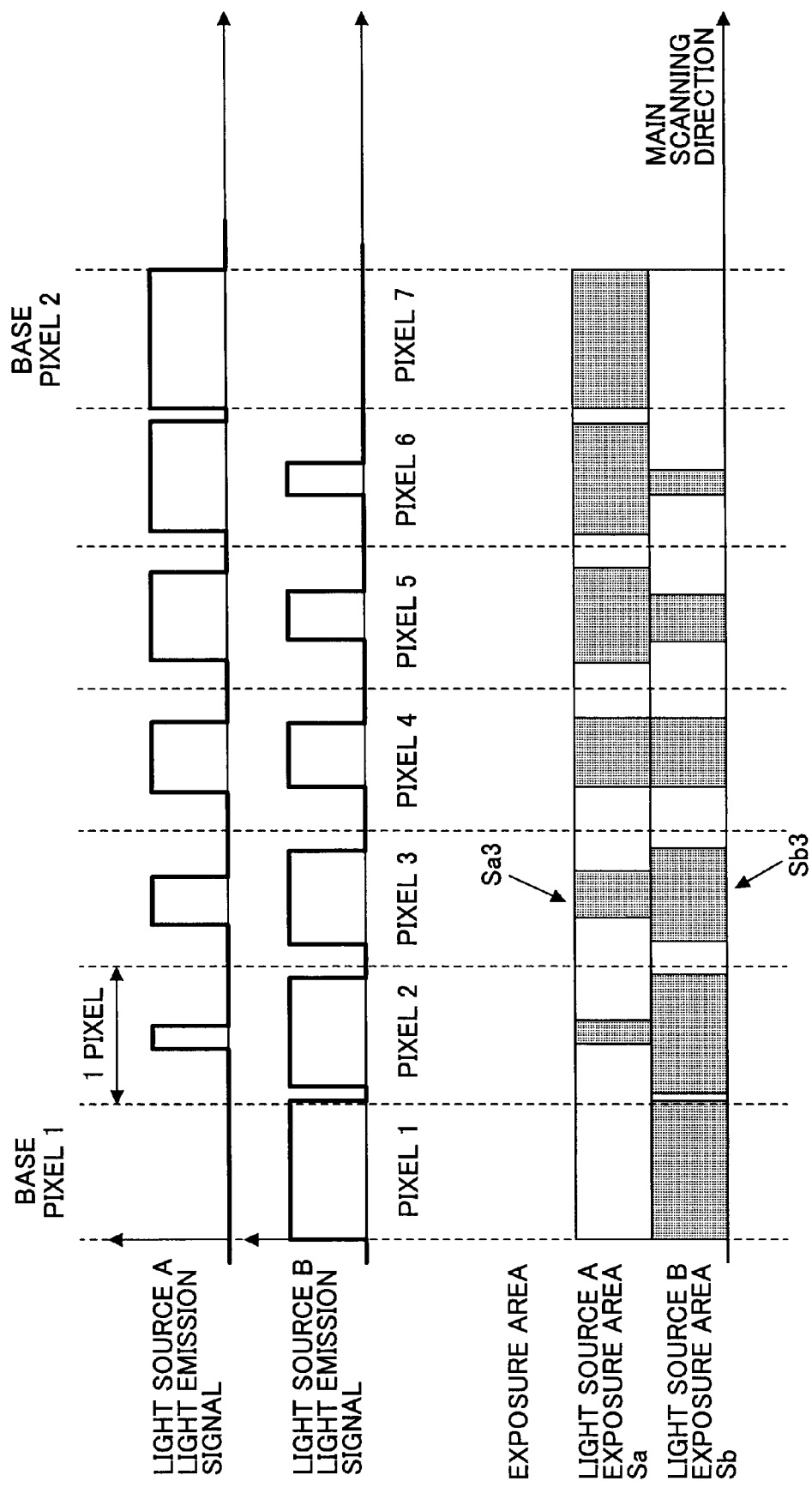
FIG. 32 is a drawing used to describe an exemplary method of controlling M light sources to shift the centroid of a pixel in the sub scanning direction.

FIG. 32 is a drawing used to describe an exemplary method of controlling M light sources to shift the centroid of a pixel in the sub scanning direction, where the proportions of the light emission time of the M light sources are changed while not changing the total exposure area exposed by the M light sources. In FIG. 32, M light sources are composed of light sources A and B. Light emission signals of the light sources A and B are shown in the upper part of the drawing. Exposure areas Sa and Sb on a photoreceptor exposed by changing the proportions of the light emission signals of the light sources A and B are shown in the lower part of the drawing with the rightward direction being the main scanning direction.

In FIG. 32, a photoreceptor in a light scanning apparatus is exposed according to the light emission signals from the light sources A and B and the proportions of light emission time of the light emission signals of the light sources A and B are changed. The exposure areas exposed by the light source A are called exposure areas Sa and the exposure areas exposed by the light source B are called exposure areas Sb. Take a pixel 3 for example. When the exposure area exposed by the light source A is Sa3 and the exposure area exposed by the light source B is Sb3, the light emission signals of the light sources A and B are controlled so that Sall (total exposure area)=Sa3+Sb3=Sai+Sbi (i is a natural number) is true. In other words, the proportions of light emission time of light emission signals of the light sources A and B are changed while not changing the total exposure area. In this way, the centroid of an exposure area of a pixel can be shifted in the sub scanning direction by changing the proportions of light emission time of the light emission signals of the light sources A and B while not changing the total exposure area per pixel. Accordingly, misalignment of a pixel in the sub scanning direction can be corrected by changing the proportions of light emission time of light emission signals of light sources based on correction data in a similar manner as described with reference to FIG. 31.

Figure 33:
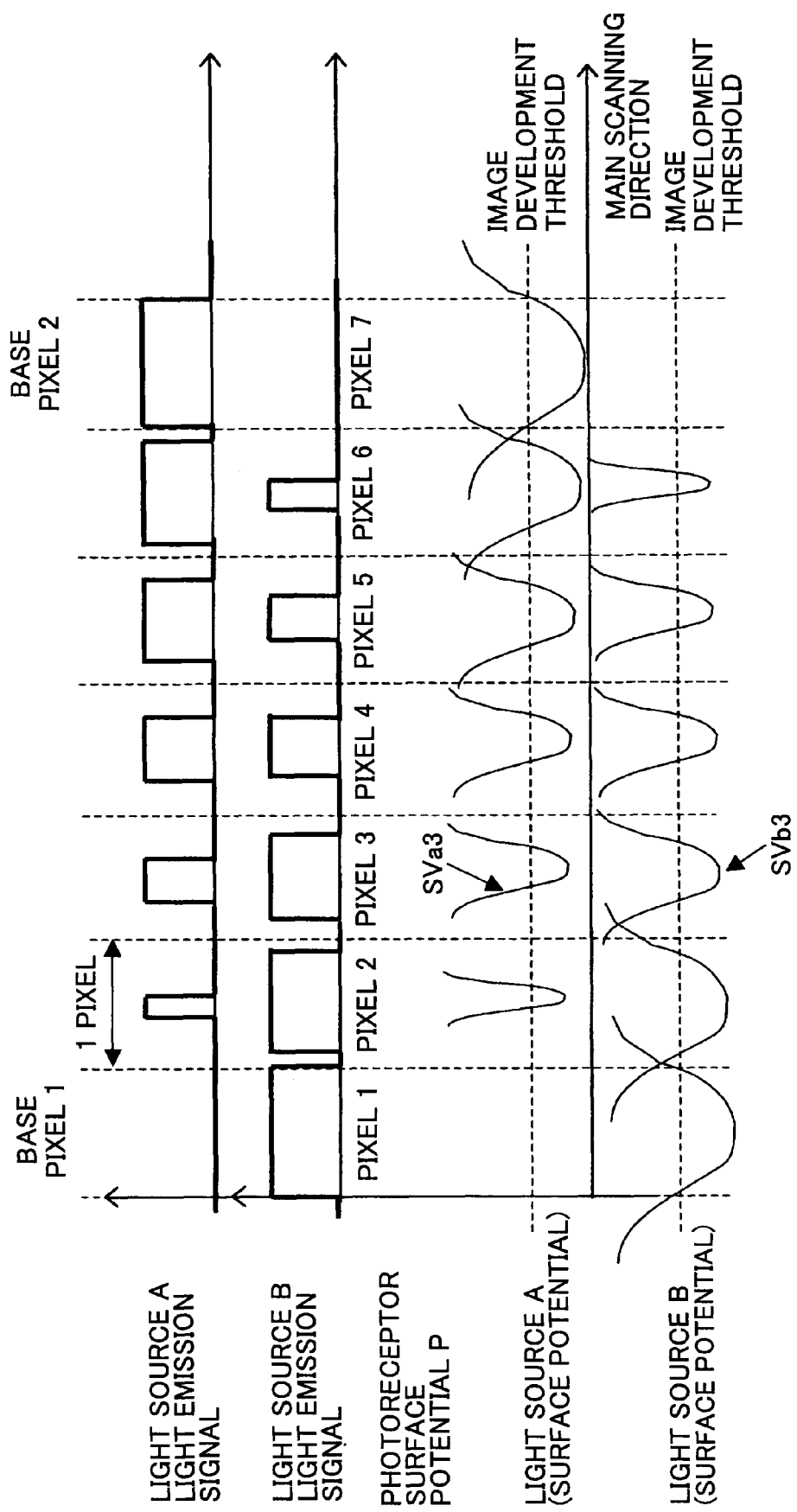
FIG. 33 is a drawing used to describe an exemplary method of controlling M light sources to shift the centroid of a pixel in the sub scanning direction.

FIG. 33 is a drawing showing surface potentials formed on a photoreceptor by changing light emission signals of two light sources. In FIG. 33, M light sources are composed of light sources A and B, a photoreceptor is exposed according to the light emission signals from the light sources A and B, and the proportions of light emission time of the light emission signals of the light sources A and B are changed. When the amount of light exceeds an image development threshold, a surface potential sufficient to form a pixel on the photoreceptor is obtained. The amount of light is determined by light emission time and a light emission level. Image development areas where the amount of light is equal to or less than the image development threshold are called SVa and SVb. SVa corresponds to the light source A and SVb corresponds to the light source B. Take a pixel 3 for example. When the exposure area exposed by the light source A is Sa3 and the exposure area exposed by the light source B is Sb3, the light emission signals of the light sources A and B are controlled so that Sall (total exposure area)=Sa3+Sb3=Sai+Sbi (i is a natural number) is true. In other words, the proportions of light emission time of light emission signals of the light sources A and B are changed while not changing the total exposure area. In this way, the centroid of an image development area of a pixel can be shifted in the sub scanning direction by changing the light emission signals of the light sources A and B (in this example, the proportions of light emission time are changed; substantially the same result may be obtained by changing the proportions of light emission levels) while not changing the total image development area per pixel. Accordingly, misalignment of a pixel in the sub scanning direction can be corrected by changing the proportions of light emission time of light emission signals of light sources based on correction data in a similar manner as described with reference to FIG. 31.

Figure 34:
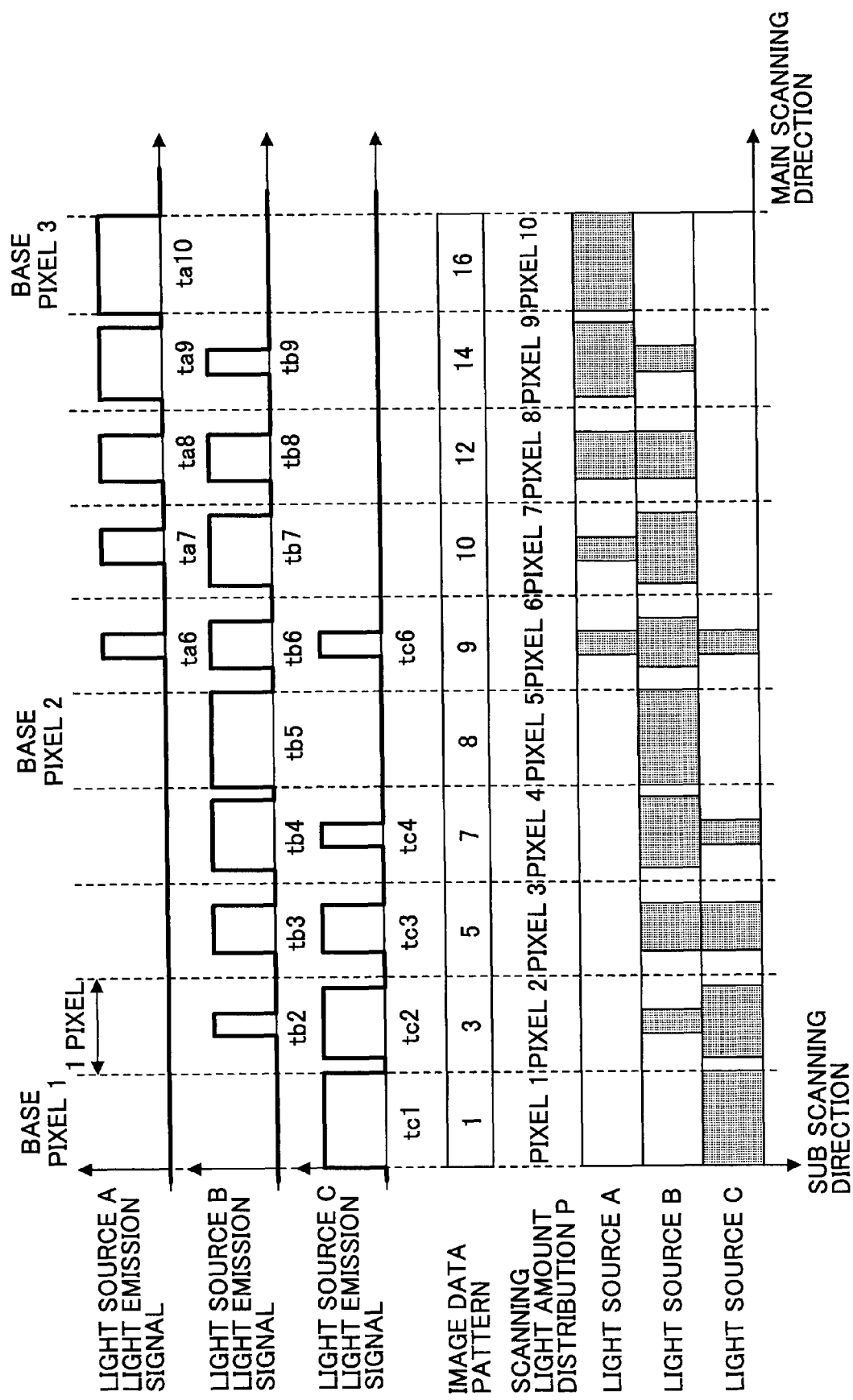
FIG. 34 is a drawing used to describe an exemplary method of controlling M light sources to shift the centroid of a pixel in the sub scanning direction.

FIG. 34 is a drawing used to describe an exemplary method of controlling M light sources to shift the centroid of a pixel in the sub scanning direction, where three light sources are used. In FIGS. 31 and 32, the proportions of light emission time of the light emission signals of two light sources are changed while not changing the total light emission time or the total exposure area to correct misalignment of a pixel in the sub scanning direction. However, in FIG. 34, M light sources are composed of three light sources, i.e., the light sources A, B, and C, by adding the light source C to the light sources A and B. When a pixel 6 shown in FIG. 34 is misaligned in the sub scanning direction, the centroid of the pixel 6 can be shifted in the sub scanning direction by controlling the light emission signals of the light sources A, B, and C as exemplified by the other pixels shown in FIG. 34. Accordingly, misalignment of a pixel in the sub scanning direction can be corrected by changing the proportions of light emission time of light emission signals of light sources based on correction data in a similar manner as described with reference to FIG. 11.

Figure 35:
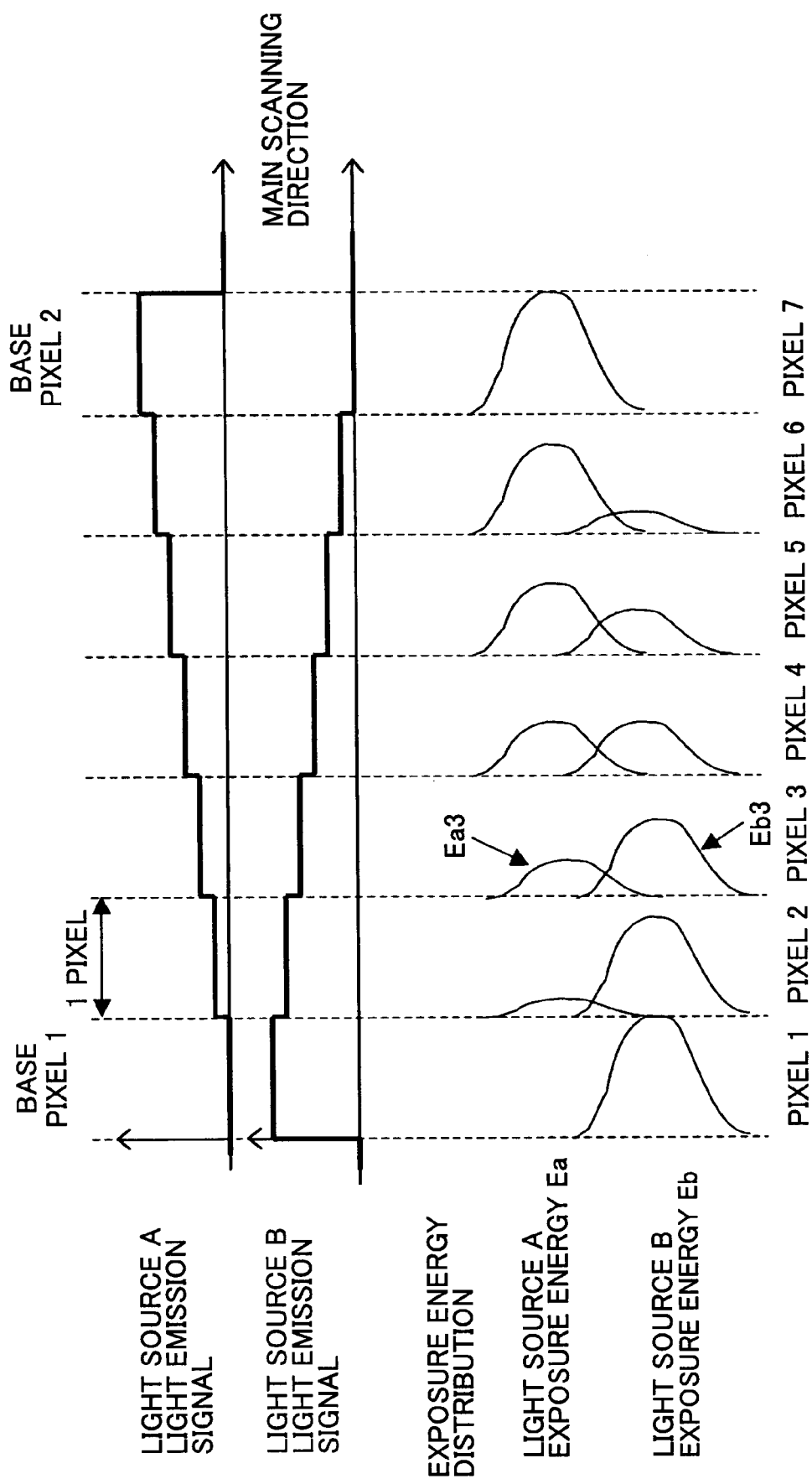
FIG. 35 is a drawing used to describe an exemplary method of controlling M light sources to shift the centroid of a pixel in the sub scanning direction.

FIG. 35 is a drawing showing distribution of exposure energy of light beams scanned onto a photoreceptor obtained by changing light emission levels of light emission signals of plural light sources. In other words, FIG. 35 is a drawing used to describe an exemplary method of controlling M light sources to shift the centroid of a pixel in the sub scanning direction, where the proportions of light emission levels of the M light sources are changed to change the proportions of exposure energy of the M light sources while not changing the total exposure energy of the M light sources.

In the exemplary method shown in FIG. 15, the proportions of exposure energy are changed by changing the proportions of light emission levels. Take a pixel 3 for example. When the exposure energy of the light source A is Ea3 and the exposure energy of the light source B is Eb3, the proportions of the light emission levels of the light sources A and B are changed so that Eall (total exposure energy)=Ea3+Eb3=Eai+Ebi (i is a natural number) is true. In other words, the proportions of the light emission levels of the light sources A and B are changed while not changing the total exposure energy. In this way, the centroid of exposure energy of a pixel can be shifted in the sub scanning direction by changing the proportions of light emission levels of the light sources A and B while not changing the total exposure energy per pixel. Accordingly, misalignment of pixels in the sub scanning direction can be corrected by changing the proportions of light emission levels of light sources based on correction data in a similar manner as described with reference to FIG. 31.

As can be seen, FIGS. 31 through 34 shows examples of light emission by light sources in response to light emission signals with different pulse widths (pulse width modulation), while FIG. 35 shows an example of light emission by light sources in response to light emission signals with different levels (power modulation)

Figure 36:
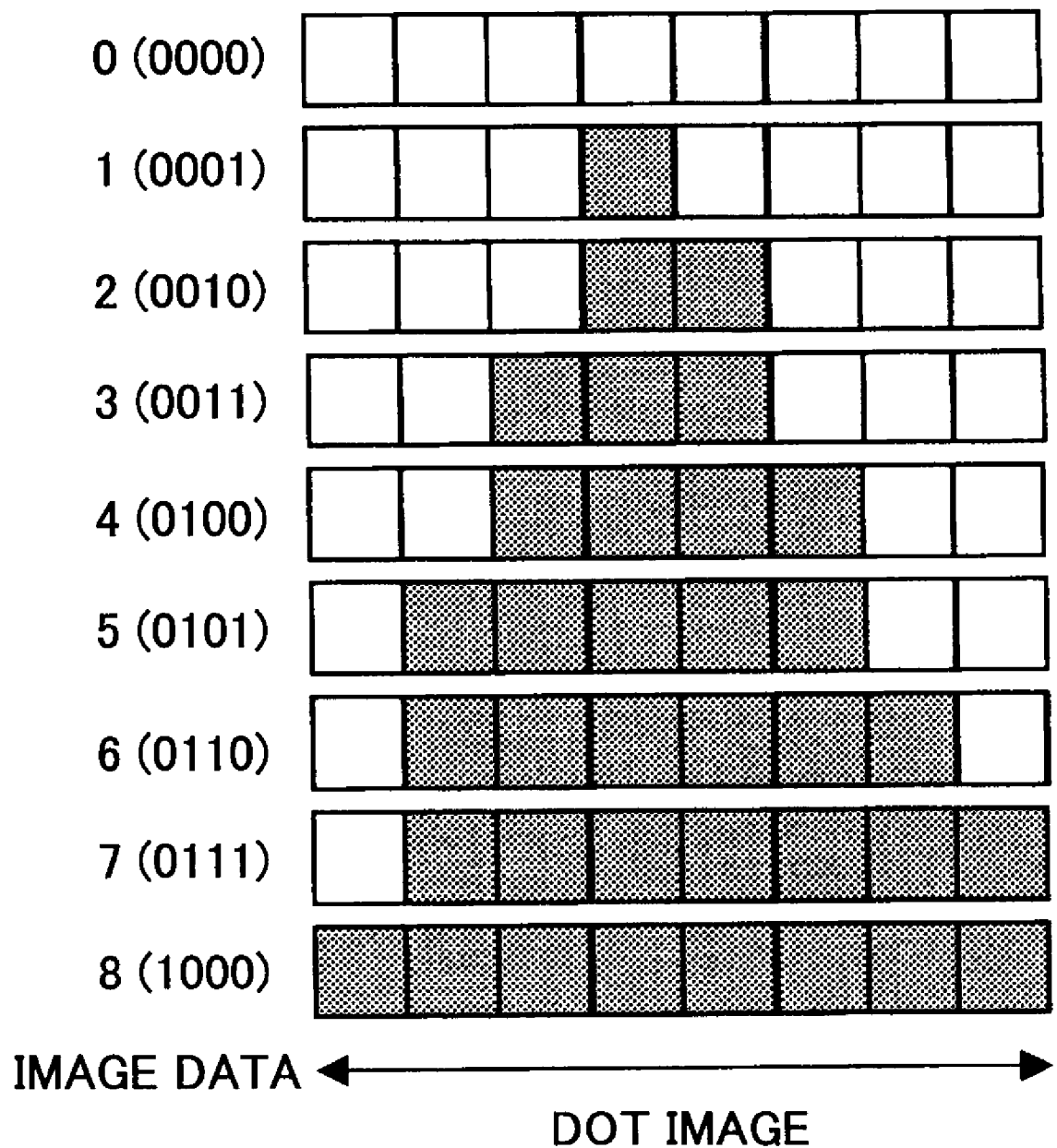
FIG. 36 is a diagram for illustrating an exemplary control action of a light source control unit.

FIG. 36 is a drawing and FIG. 37 is a table that are used to describe an exemplary process (by the light source control unit 350) of changing light emission time of light sources A and B as shown, for example, in FIG. 31. FIG. 36 shows image data and pixel images representing exemplary pulses generated by the light source control unit 350. In this example, eight pulses constitute one pixel (for example, any one of pixels 1 through 7 shown in FIG. 31). In FIG. 31, pulses are formed from the center of each pixel. Each pixel image shows the width of a pixel. Image data 1 shows a pixel with an ⅛ width, image data 2 shows a pixel with a ⅖ width, image data 3 shows a pixel with a ⅜ width, and so on. FIG. 37 shows patterns of controlling light emission time of light sources A and B as shown in FIG. 31 based on the relationship between image data and pixel images as shown in FIG. 36. Rows in the table in FIG. 17 show seven patterns 1 through 7 of controlling light emission time of the light sources A and B. Figures in the columns of the light sources A and B correspond to the numbers assigned to image data shown in FIG. 36.

The light source control unit 350 selects one of the seven patterns shown in FIG. 37 according to correction data. The light source control unit 350 selects the pattern 1 when correction data (000) is given; the pattern 2 when correction data (001) are given; the pattern 3 when correction data (010) are given; the pattern 4 when correction data (011) are given; the pattern 5 when correction data (100) are given; the pattern 6 when correction data (101) are given; and the pattern 7 when correction data (111) are given. For example, the light source control unit 350 controls the light sources A and B as shown in FIG. 11 when correction data (000), (001), (010), (011), (100), (101), and (111) are given sequentially.

Accordingly, the centroid of a pixel can be shifted in the sub scanning direction in a similar manner as described with reference to FIG. 31 by changing the patterns shown in FIG. 37 according to the sub scanning dot misalignment distance of the pixel, and sub scanning dot misalignment can be corrected by selecting one of the seven patterns based on correction data.

Figure 38:
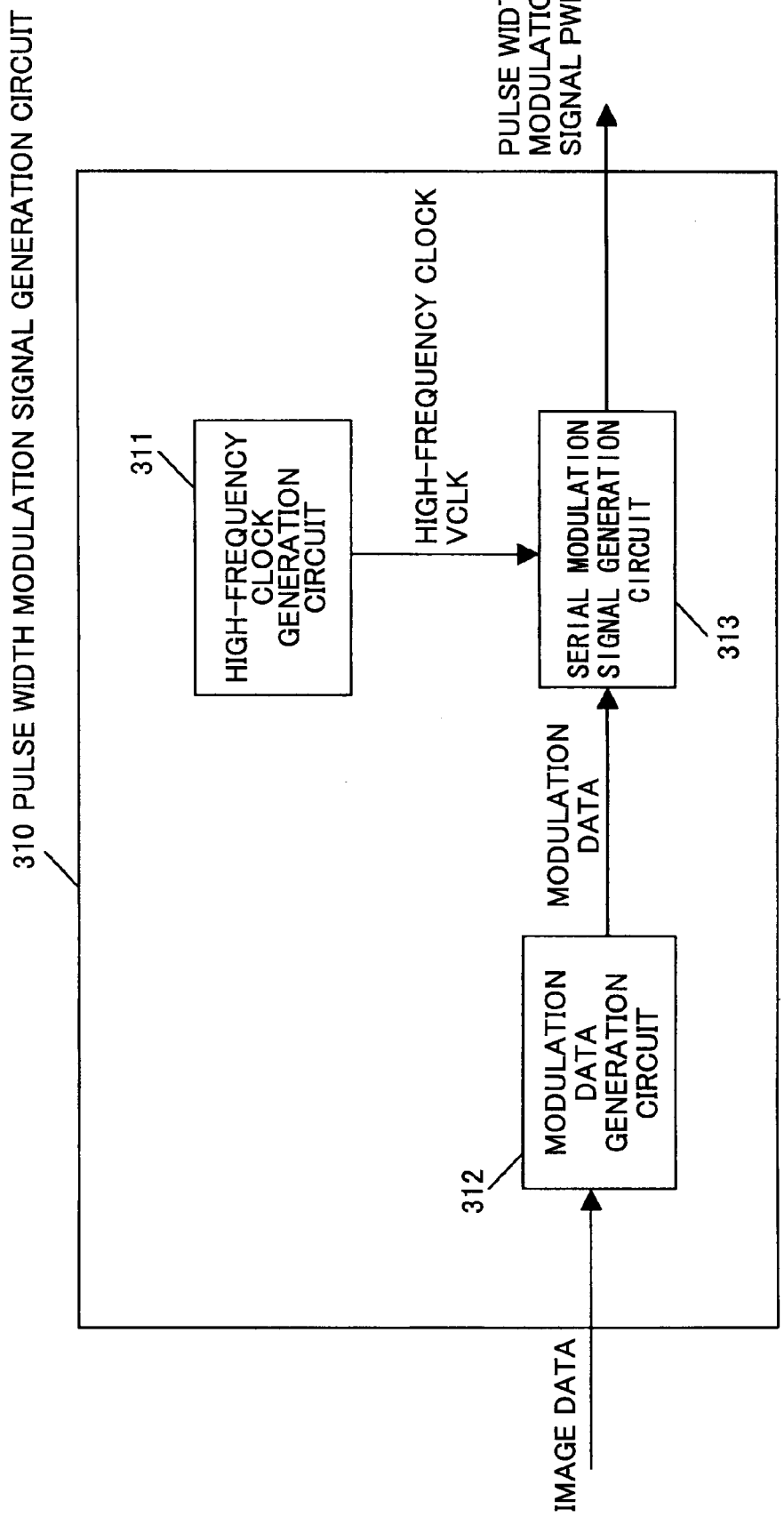
FIG. 38 is a block diagram illustrating an exemplary configuration of a pulse width modulation signal generation circuit.

Image data as shown in FIG. 36 can be generated by pulse width modulation signal generation circuit 310 shown in FIG. 38 as a pulse width modulation signal PWM. The pulse width modulation signal generation circuit 310 of FIG. 38 includes a high-frequency clock generation circuit 311, a modulation data generation circuit 312, and a serial modulation signal generation circuit 313. The high-frequency clock generation circuit 311 generates a high-frequency clock VCLK having a frequency far higher than that of a pixel clock which is a basic clock used to form a pixel in a conventional image forming apparatus. The modulation data generation circuit 312 generates modulation data representing a bit pattern based on image data input from an external device (not shown) such as an image processing unit. The serial modulation signal generation circuit 313 receives modulation data output from the modulation data generation circuit 312, converts the modulation data into a serial pulse pattern train (pulse train) based on the high-frequency clock VCLK, and outputs the pulse pattern train as a pulse width modulation signal PWM. When modulation data are directly input from an external device into the serial modulation signal generation circuit 313, the modulation data generation circuit 312 can be omitted.

The pulse width modulation signal generation circuit 310 inputs modulation data into the serial modulation signal generation circuit 313, serially outputs a pulse string corresponding to a bit pattern of the modulation data based on a high-frequency clock having a frequency far higher than that of a pixel clock, and thereby generates a pulse width modulation signal PWM. This mechanism is the main feature of the pulse width modulation signal generation circuit 310. A shift register may be used for the serial modulation signal generation circuit 313.

A light source modulation signal generation circuit 317 based on the pulse width modulation signal generation circuit 310 shown in FIG. 38 may be used for generating image data as shown in FIG. 36 as a pulse width modulation signal PWM and for controlling light sources using the patterns as shown in FIG. 37.

The light source modulation signal generation circuit 317 shown in FIG. 19 is configured to use image data and correction data to control light sources A and B. Image data in this case may be a scanned image of a copier or print data of a printer. Correction data in this case may include data for correcting the pixel position in the sub scanning direction, such as pixel position correction data generated by the pixel-position-in-sub-scanning-direction detecting unit 351.

Figure 39:
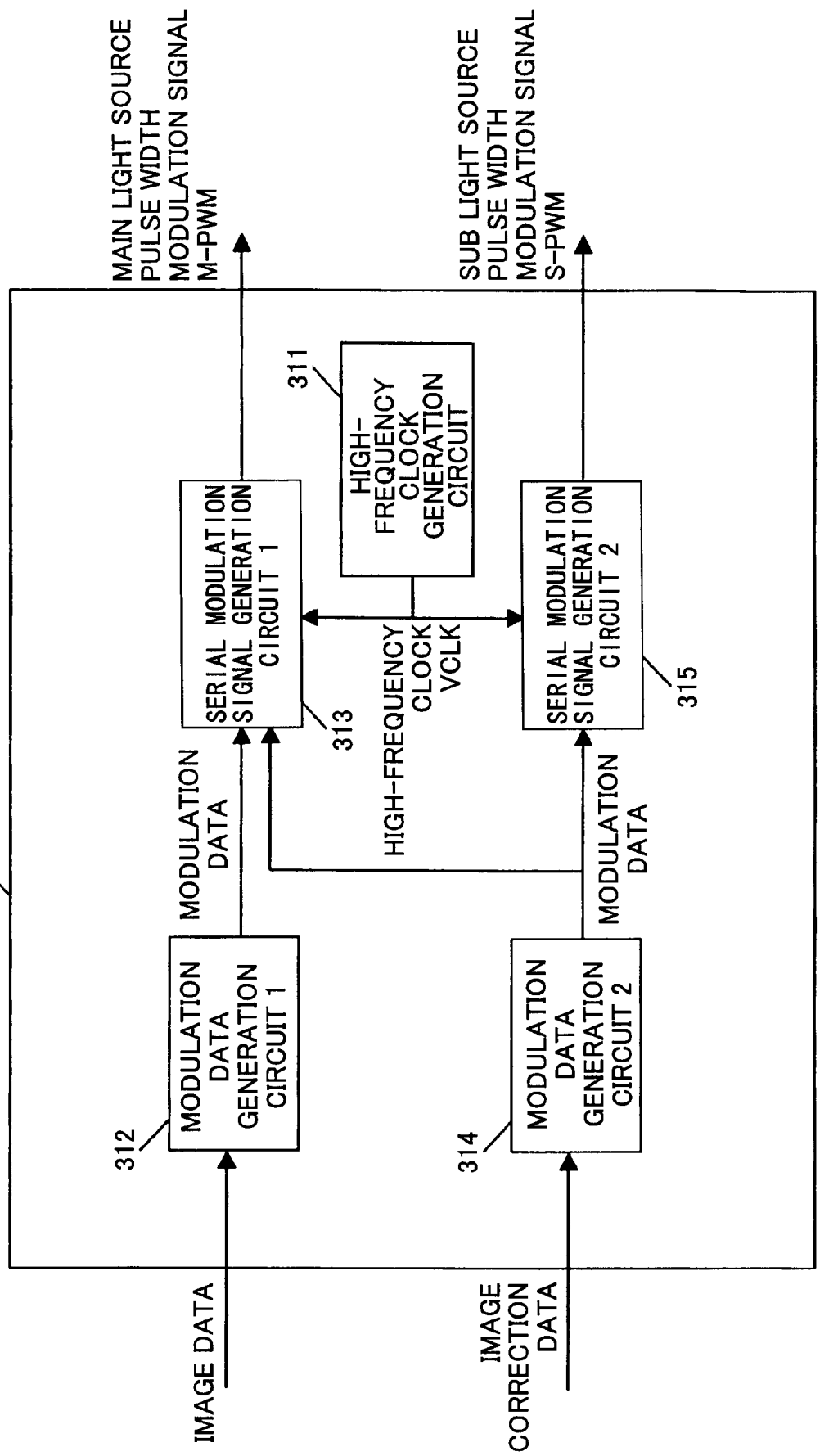
FIG. 39 block diagram illustrating an exemplary configuration of a light source modulation signal generation circuit based on the pulse width modulation signal generation circuit shown in FIG. 38.

In the light source modulation signal generation circuit 317 shown in FIG. 39, the image data are converted into modulation data by a first modulation data generation circuit 312, and the modulation data are input to a first serial modulation signal generation circuit 313. Similarly, correction data are converted into modulation data by a second modulation data generation circuit 314, and the modulation data are input to the first serial modulation signal generation circuit 313 and a second serial modulation signal generation circuit 315. The first and second serial modulation signal generation circuits 313 and 315 output pulse width modulation signals (a main light source pulse width modulation signal M-PWM and a sub light source pulse width modulation signal S-PWM) based on the modulation data from the first and second modulation data generation circuits 312 and 314 and the high-frequency clock output from the high-frequency clock generation circuit 311. When 4-bit image data as shown in FIG. 36 are input, the light source modulation signal generation circuit 317 outputs, based on the input 4-bit image data, pulse width modulation signals for a corresponding pixel image as shown in FIG. 36. For example, the main light source pulse width modulation signal M-PWM can be used as a control signal to control the light source B shown in FIG. 31 and the sub light source pulse width modulation signal S-PWM can be used as a control signal to control the light source A shown in FIG. 31.

In the above case, one of the seven patterns shown in FIG. 37 is selected according to the correction data. When the pulse width of image data 8 (1000) represents the standard light emission time, the total pulse width (duration) of the light sources A and B in each pattern shown in FIG. 37 is always eight. As described above, misalignment in the sub scanning direction of a pixel formed with two light sources can be corrected by selecting one of the seven patterns in a lookup table (LUT) as shown in FIG. 37 according to correction data. For example, when correction data is (000), the light source modulation signal generation circuit 317 selects the pattern 1 of FIG. 37 and controls the light sources A and B based on the image data 0 and 8 of FIG. 36. When correction data is (010), the light source modulation signal generation circuit 317 selects the pattern 3 of FIG. 37 and controls the light sources A and B based on the image data 3 and 5 of FIG. 36.

As described above, the pulse width modulation signal generation circuit 310 shown in FIG. 38 (or more precisely the light source modulation signal generation circuit 317 shown in FIG. 39) can be used as the light source control unit 350 to control the light sources A and B as shown in FIG. 31.

Figure 40:
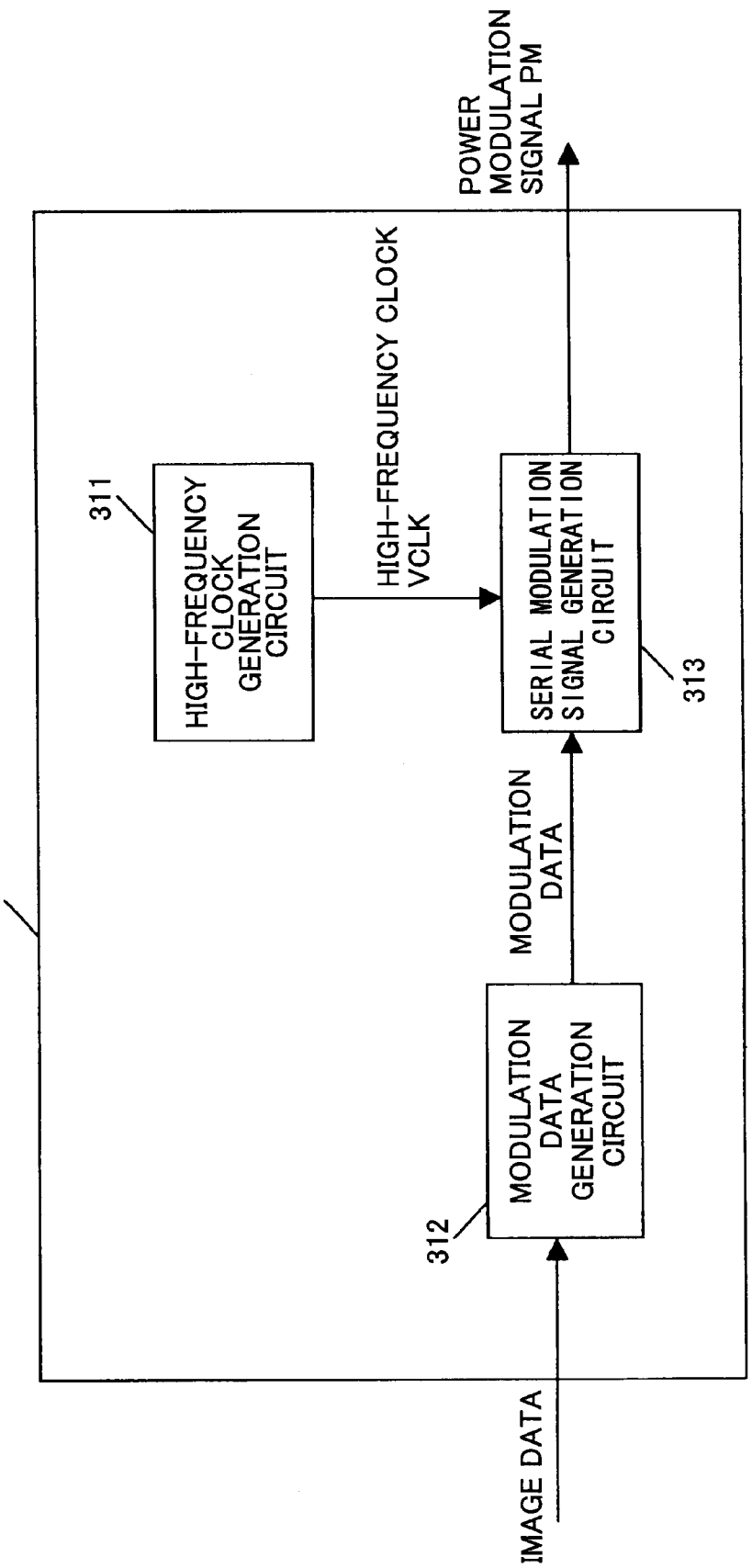
FIG. 40 is a block diagram illustrating an exemplary configuration of a power modulation signal generation circuit.

An exemplary configuration of a circuit used to control light sources as shown in FIG. 31 is described above. When controlling light sources as shown in FIG. 35, power modulation signal generation circuit 318 as shown in FIG. 40 can be used instead of the pulse width modulation signal generation circuit 310 shown in FIG. 38. In the power modulation signal generation circuit 318 shown in FIG. 40, image data input to the modulation data generation circuit 312 represent the amount of light emitted from each light source. The modulation data generation circuit 312 modulates the intensity of the signal of the image data. The serial modulation signal generation circuit 313 serially outputs a power signal corresponding to the light intensity of the modulated signal based on a high-frequency clock generated by a high-frequency clock generation circuit 311 which high-frequency clock having a frequency far higher than that of a pixel clock, and thereby generates a power modulation signal PM.

Light source control as shown in FIG. 35 can be performed with a circuit similar to that shown in FIG. 39 and composed of two sets of circuit as shown in FIG. 40.

Also, the light source control unit 350 in a light scanning apparatus according to an embodiment of the present invention may be configured to perform pulse width modulation and power modulation at the same time and thereby to change stepwise the proportions of light emission time and light emission levels of M light sources to shift the centroid of a pixel in the sub scanning direction.

A light source control unit 350 for controlling three or more light sources (for example, as shown in FIG. 34) can also be easily implemented by expanding the configuration of the circuit shown in FIG. 39.

According to the present invention, methods of controlling light sources are not limited to the above disclosed methods, but various other methods may also be used.

In the above described light scanning apparatus, the first distance X1 is preferably less than 5 μm.

Figure 51:
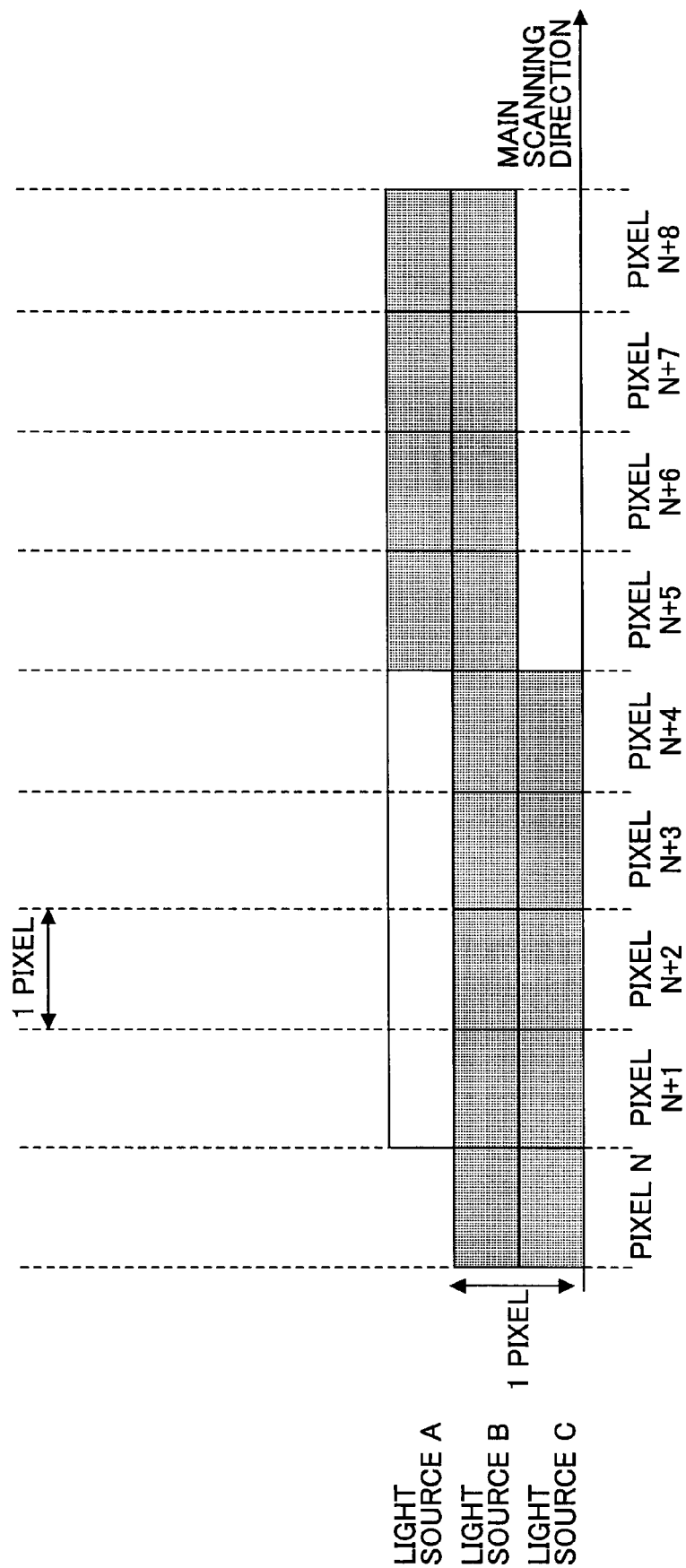
FIG. 51 is a diagram used to describe curvature correction.

When the first distance X1 is less than 5 μm (e.g. 4.8 μm or 2.4 μm), if 2-power optical magnification (more accurately, lateral magnification of the scanning optical system in the sub scanning direction) or higher (e.g. 2.12) is used, resolution of a pixel is equal to or less than about 10 μm (for example, when the pitch between the light sources in the sub scanning direction is 4.8 μm or 2.4 μm, resolution of a pixel is 10 μm (2,400 dpi) or 5 μm (4,800 dpi)), which is low enough to prevent jaggies as shown in FIG. 51 from being recognized with human eyes if judging based on visual properties of human eyes. Referring to FIG. 52 showing the comparison of quality between images of 1,200 dpi and 2,400 dpi, the image of 2,400 dpi excels especially in sharpness and jaggy property (the property of making jaggies unrecognizable). This result suggests that the first distance X1 is preferably less than 5 μm (pixel resolution is preferably equal to or less than 10 μm (equal to or higher than 2,400 dpi)).

In this embodiment, 2-power optical magnification or higher is used. This is because, as described below, when 2-power optical magnification or higher is used, the amounts of the lights of the light sources do not need to be very high, and therefore surface emitting lasers of small light amounts may be used as the light sources. This is also because light transmission rate of the lens that focuses lights onto a to-be-scanned surface can be improved without increasing the size of the lens.

Figure 41:
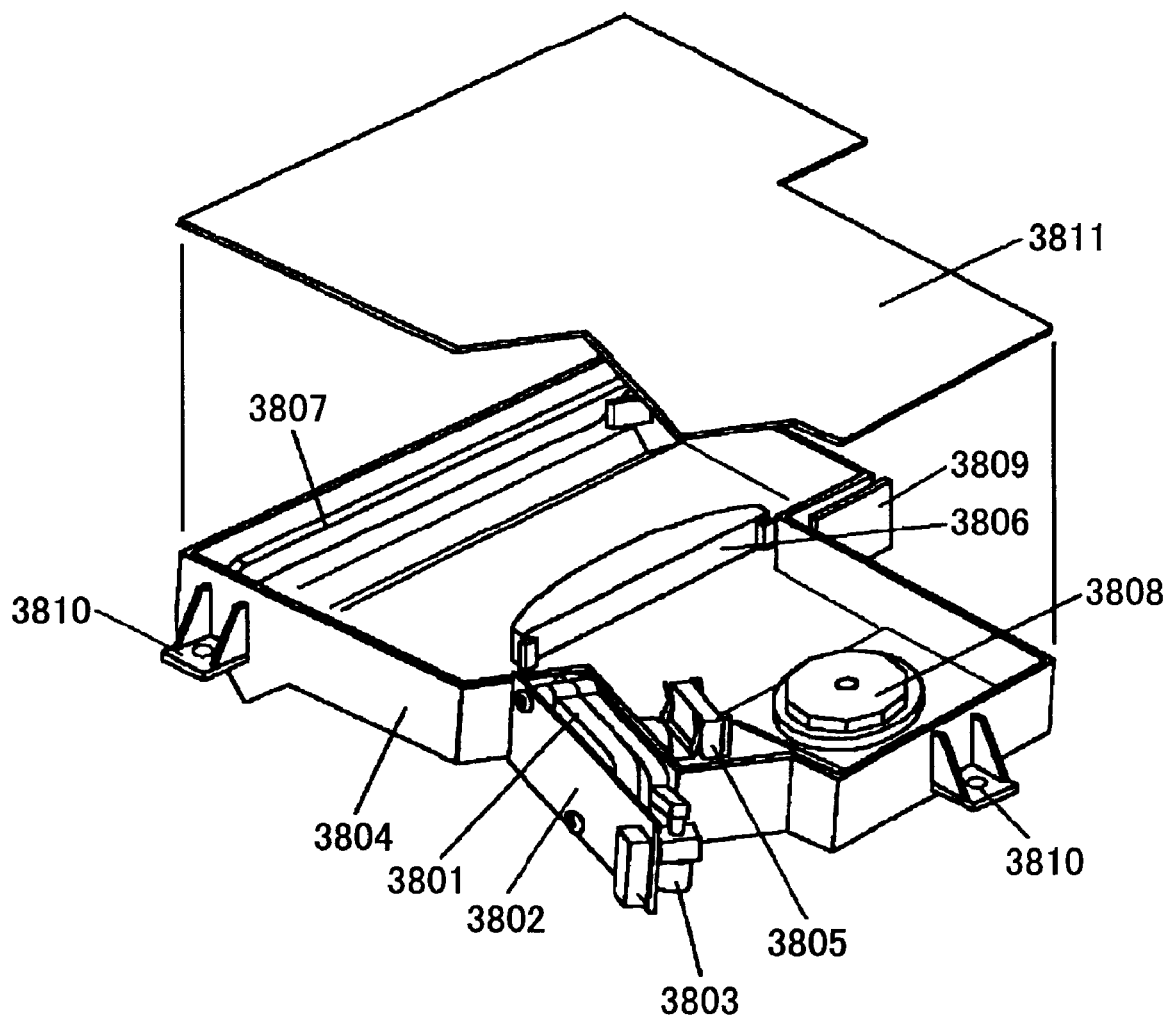
FIG. 41 is a diagram showing an exemplary image forming apparatus using a light scanning apparatus according to an embodiment of the present invention.

FIG. 41 is a diagram showing an exemplary image forming apparatus using a light scanning apparatus according to an embodiment of the present invention. As shown in FIG. 41, a printed circuit board 3802 is attached to the back of a light source unit 3801, on which printed circuit board 3802 a control circuit for controlling a semiconductor laser and a pixel clock generation device are formed. The printed circuit board 3802 is brought into contact by a spring with the surface of an optical housing which surface intersects orthogonally with a light axis and is fixed by an adjusting screw 3803 in a position to form an appropriate angle. The adjusting screw

3803 is screwed into a protrusion on the surface of the optical housing. In the optical housing, a cylinder lens 3805, a polygon motor 3808 for rotating a polygon mirror, a fθ lens 3806, a toroidal lens, and a reflection mirror 3807 are fixed in position. A printed circuit board 3809 is attached to an external surface of the optical housing in a similar manner as the light source unit 3801. The upper side of the optical housing is covered by a cover 3811. The optical housing is fixed by screws at attaching sections 3810, protruding from the surface of the optical housing, onto the frame of the image forming apparatus.

In the image forming apparatus, a semiconductor laser array or a surface emitting laser array may be used as a semiconductor laser unit. Laser beams emitted from the semiconductor laser unit (surface emitting laser array) pass through the cylinder lens 3805, are deflected by the polygon mirror through its rotation, and is scanned onto a photoreceptor drum (not shown) via the fθ lens 3806, the toroidal lens, and the reflection mirror 3807. Laser beams not scanned onto the photoreceptor drum or some of laser beams reflected by the mirrors are detected by sensors. For example, a synchronization detecting sensor detects the time interval between two points in the main scanning direction corresponding to the rotation direction of the polygon mirror; and a position detection sensor detects a misalignment distance in the sub scanning direction that is orthogonal to the main scanning direction. The detected values are fed back to an LD control unit, a modulation circuit, or a modulation data generation unit to correct the position of a pixel.

A multibeam scanning apparatus (multibeam optical system) using plural light sources is described below.

Figure 42:
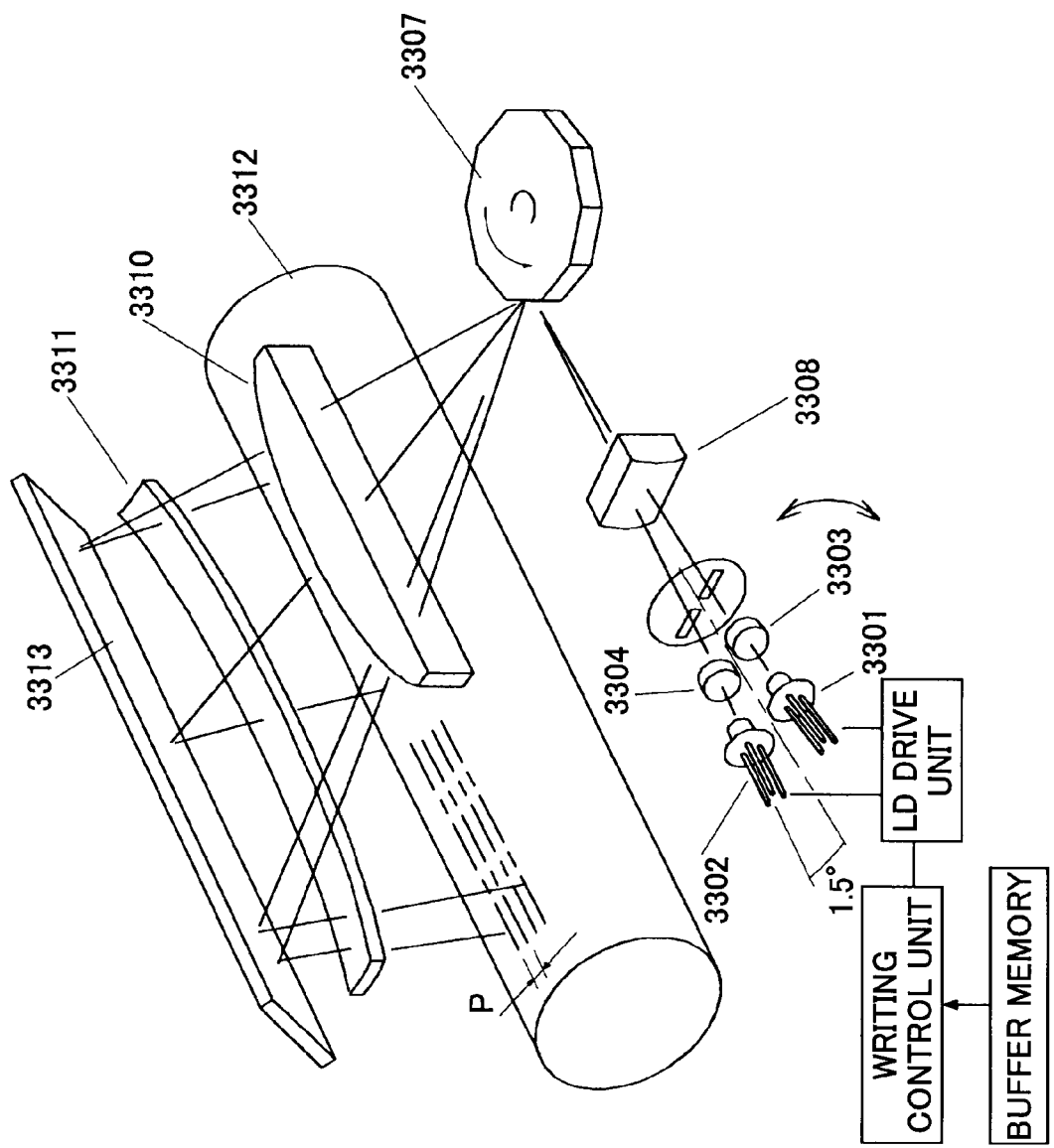
FIG. 42 is a diagram showing an exemplary multibeam scanning apparatus.

In the exemplary multibeam scanning apparatus shown in FIG. 42, two semiconductor laser arrays 3301 and 3302 each having two light-emitting elements (four channels) monolithically arranged at an interval of ds=25 μm are used (eight light sources in total).

As shown in FIG. 42, the semiconductor laser arrays 3301 and 3302 are positioned so as to have their light axes match the light axes of collimation lenses 3303 and 3304, respectively; their light-emission angles be symmetric to each other in the main scanning direction; and their light-emission axes intersect each other at a reflecting point on a polygon mirror 3307. Plural laser beams emitted from the semiconductor laser arrays 3301 and 3302 pass through a cylinder lens 3308, are deflected and scanned by the polygon mirror 3307, pass through a fθ lens 3310 and a toroidal lens 3311, and form an image on a photoreceptor 3312. Print data of one line are held in a buffer memory for each light-emitting element. Print data of four lines are retrieved for each side of the polygon mirror 3307 from the buffer memory and are recorded at a time onto the photoreceptor 3312.

According to an embodiment of the present invention, the differences in optical scan length or magnification of laser beams due to wavelength differences of LDs providing the laser beams are corrected by shifting the phases of pixel clocks. This mechanism makes it possible to correct the differences in optical scan length with an accuracy of up to the phase shift level, thereby reducing the variations of scanned laser beams.

Figure 43:
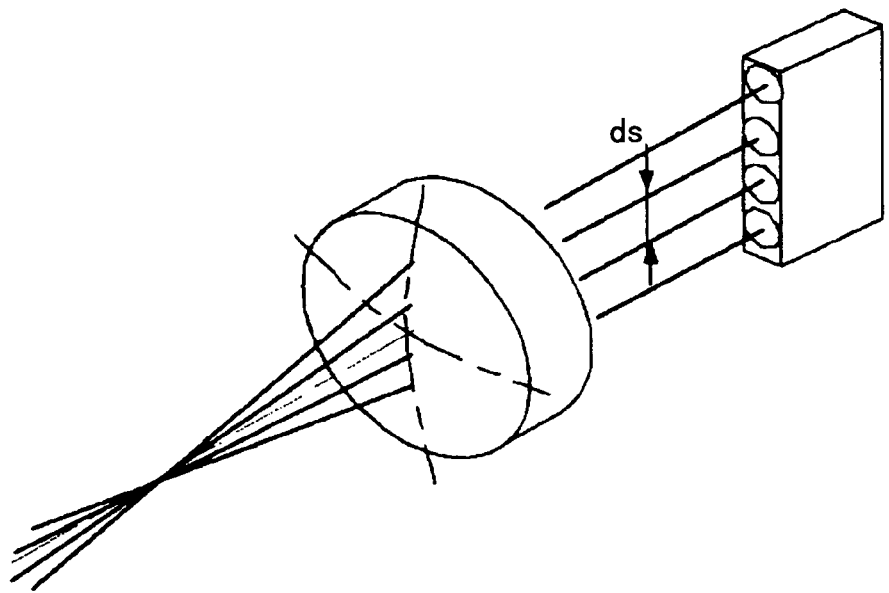
FIG. 43 is a diagram showing an exemplary light source unit.

FIG. 43 is a drawing illustrating an exemplary light source unit of a light scanning apparatus. This light source unit is implemented with a laser array aligned in the sub scanning direction (the vertical direction in the drawing). More specifically, this light source unit is implemented with a one-dimensional laser array (e.g. one-dimensional surface emitting laser array) having four light sources (e.g. surface emitting lasers) in the vertical direction.

Figure 44:
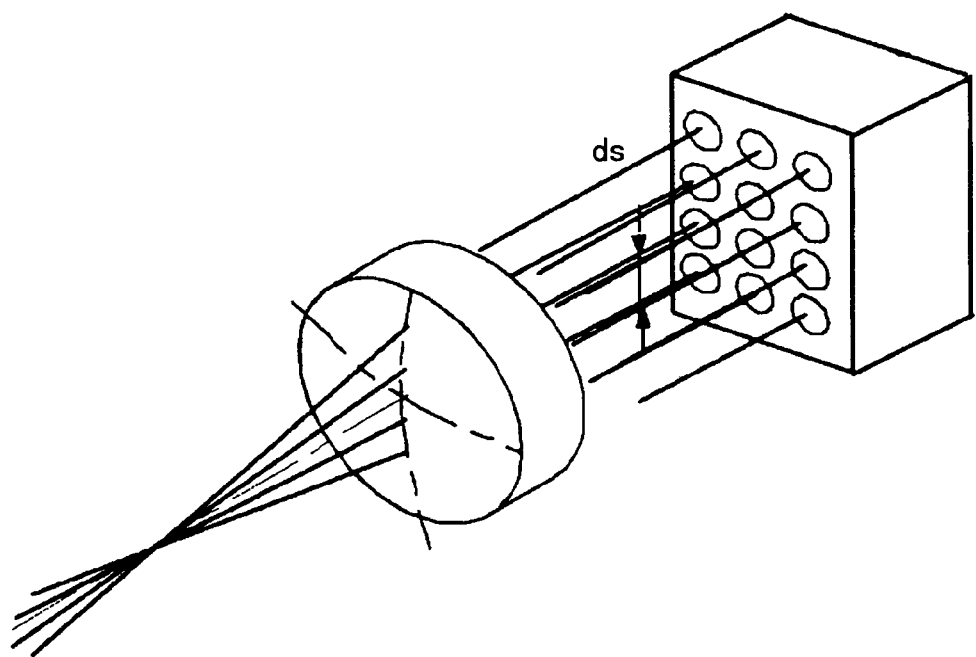
FIG. 44 is a diagram showing an exemplary light source unit.

FIG. 44 is a drawing illustrating an exemplary light source unit of a light scanning apparatus. This light source unit is implemented with a two-dimensional surface emitting laser array having plural surface emitting lasers disposed in two dimensions. The two-dimensional surface emitting laser array shown in FIG. 44, has three light-emitting elements (surface emitting lasers) in the horizontal direction, four in the longitudinal direction, for a total of twelve light-emitting elements.

Figure 45:
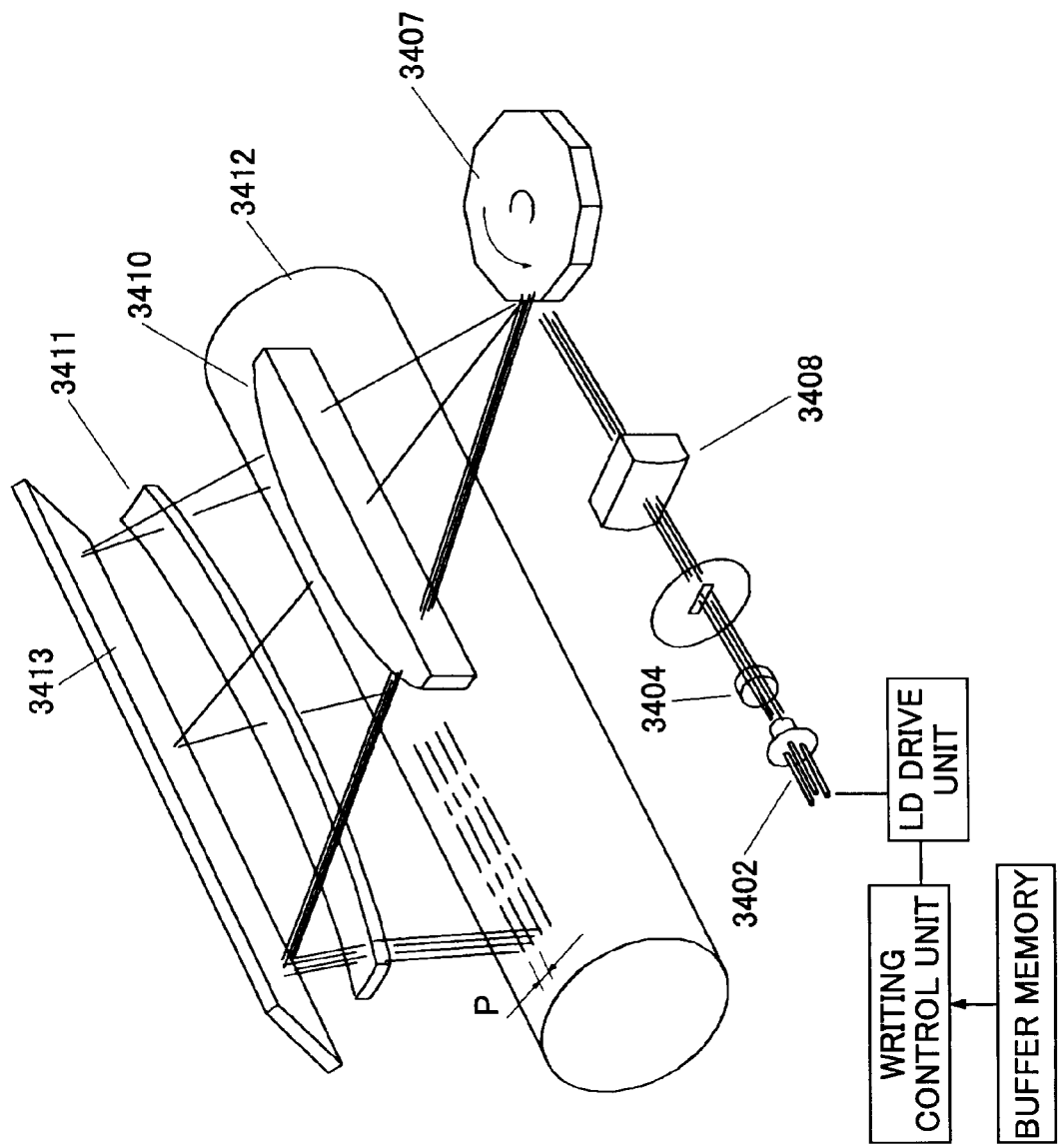
FIG. 45 is a diagram showing an exemplary multibeam scanning apparatus using a VCSEL array.

A multibeam scanning apparatus (multibeam optical system) that includes a light source unit implemented with a surface emitting laser array (VCSEL array) is described below. FIG. 45 is a diagram showing an exemplary multibeam scanning apparatus that includes a light source unit implemented with a VCSEL array. In the multibeam scanning apparatus shown in FIG. 45, in one VCSEL array 3402 is provided in place of the two semiconductor laser arrays 3301 and 3302 of FIG. 42.

With reference to FIG. 45, plural laser beams emitted from the VCSEL array 3402 pass through a collimation lens 3404, and a cylinder lens 3408, are deflected and scanned by a polygon mirror 3407, pass through a fθ lens 3410 and a toroidal lens 3411, and form an image on a photoreceptor (to-be-scanned surface) 3412. Print data of one line are held into a buffer memory for each light-emitting element. Print data of plural lines are retrieved for each side of the polygon mirror 3407 from the buffer memory and are recorded at a time onto the photoreceptor 3412. According to an embodiment of the present invention, the differences in optical scan length or magnification of laser beams due to wavelength differences of surface emitting lasers providing the laser beams are corrected by shifting the phases of pixel clocks. This mechanism makes it possible to correct the differences in optical scan length with an accuracy of up to the phase shift level, thereby reducing the variations of scanned laser beams.

Figure 46:
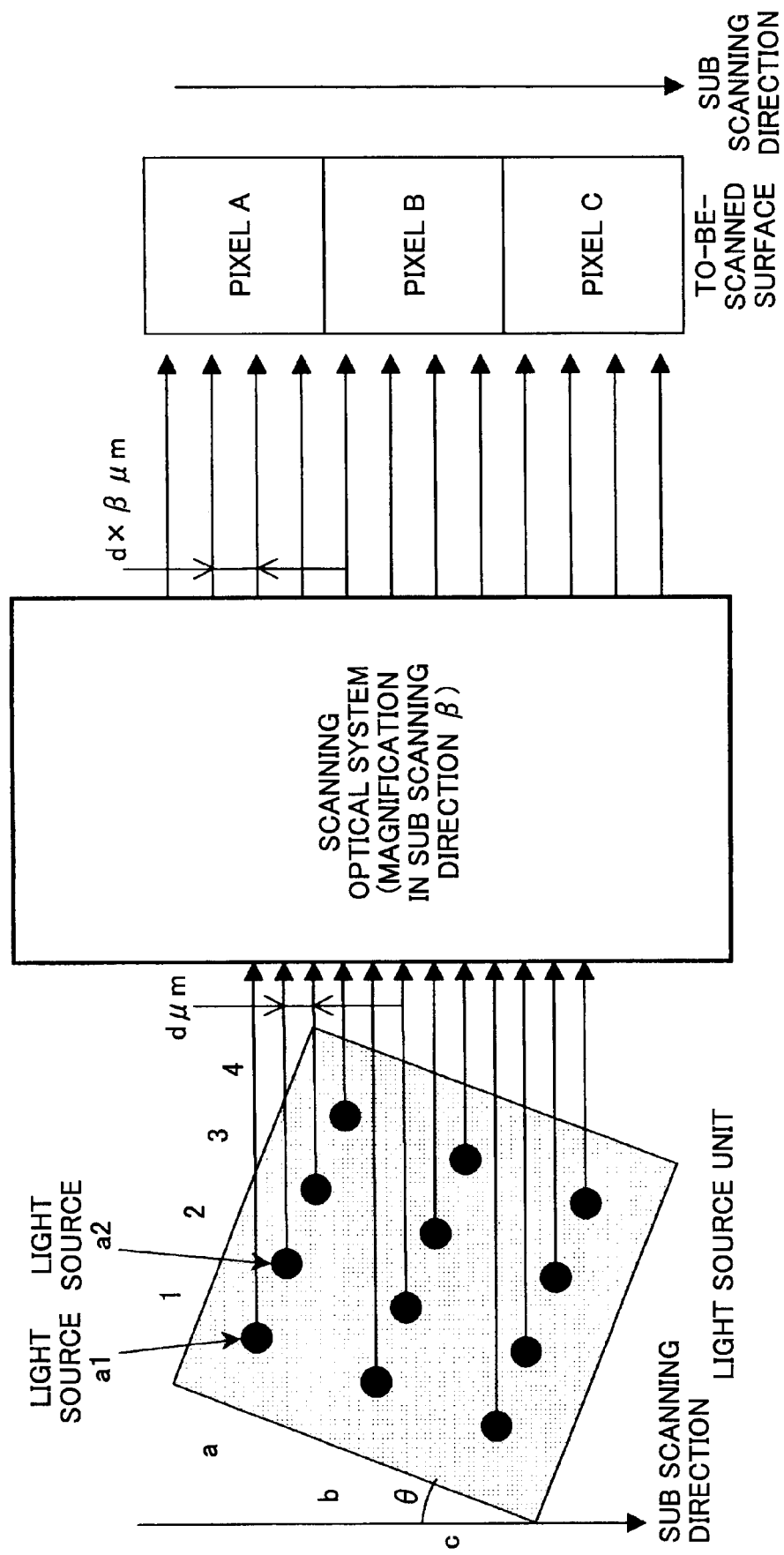
FIG. 46 is a diagram showing plural light beams emitted from surface emitting laser arrays and scanned on a to-be-scanned surface through a scanning optical system.

FIG. 46 is a diagram showing plural light beams emitted from surface emitting laser arrays and scanned on a to-be-scanned surface through a scanning optical system. Similar to the multibeam scanning apparatus shown in FIG. 45, the scanning optical system includes a collimate lens 3403, a cylinder lens 3408, a polygon mirror 3407, a fθ lens 3410, and a toroidal lens 3411.

In the example shown in FIG. 46, plural light beams are emitted from plural light sources disposed at regular intervals in the sub scanning direction surface emitting laser arrays and are guided through plural lenses onto a to-be-scanned surface for optical scanning, and a lateral magnification β in the sub scanning direction on the to-be-scanned surface by the lenses disposed in an optical path extending from the light sources to the to-be-scanned surface canned on a to-be-scanned surface through a scanning optical system is greater than 2. In this example, a pixel is formed by four light sources, and a total of three pixels are formed by twelve light sources at the same time. More specifically, light beams from four light sources a1, a2, a3, and a4 form a pixel, i.e., a pixel A. Similarly, light beams from four light sources b1, b2, b3, and b4 form a pixel B, and light beams from four light sources c1, c2, c3, and c4 form a pixel C. That is, these twelve light sources form three pixels on a photoreceptor.

Take, for example, a surface emitting laser array having surface emitting lasers as light sources disposed in two dimensions wherein a first distance X1 is 4.8 μm and a lateral magnification in the sub scanning direction is |β|=2.12. In this case, a pitch between beams in the sub scanning direction on a to-be-scanned surface is 4.8 μm×2.12=10.1 μm. This results in a resolution of 2,400 dpi in the sub scanning direction. Similarly, when a lateral magnification in the sub scanning direction is $|\beta|=2.12$ and a first distance X1 is 2.4 μm, a pitch between beams in the sub scanning direction on a to-be-scanned surface is 2.4 μm×2.12=5.0 μm, resulting in a resolution of 4,800 dpi in the sub scanning direction.

On the other hand, when a lateral magnification in the sub scanning direction is $|\beta|\leq 2$, the diameter of an aperture is made smaller to achieve a desired beam sport diameter (e.g. sub-main 50×60) in the sub scanning direction on the to-be-scanned surface. The light passing through the aperture is therefore reduced, so that the amount of light becomes insufficient. Especially in the case where a VCSEL is used as a light source, since the VCSEL is disadvantageous in terms of the amount of light, this may be a serious problem. If the lateral magnification of the scanning optical system in the sub scanning direction is $|\beta|\leq 2$, the lens (in FIG. 45, the toroidal lens 3411) that focuses lights onto the to-be-scanned surfaces is disposed in a position closer to the photoreceptor 3412. In this case, the size of the toroidal lens 3411 is increased, so that layout of the lens in the apparatus becomes difficult, which increases the production cost. In addition, if the lateral magnification in the sub scanning direction is |β|2, the cylinder lens 3408 needs to be disposed closer to the polygon motor. In this case, the temperature of the cylinder lens 3408 is increased due to heat generated by the polygon motor, so that the beam spot diameter and beam pitch vary due to an optical property, i.e., due to temperature fluctuation, which prevents formation of stable images. These problems may be solved by having the lateral magnification in the sub scanning direction $|\beta|>2$.

Figure 47:
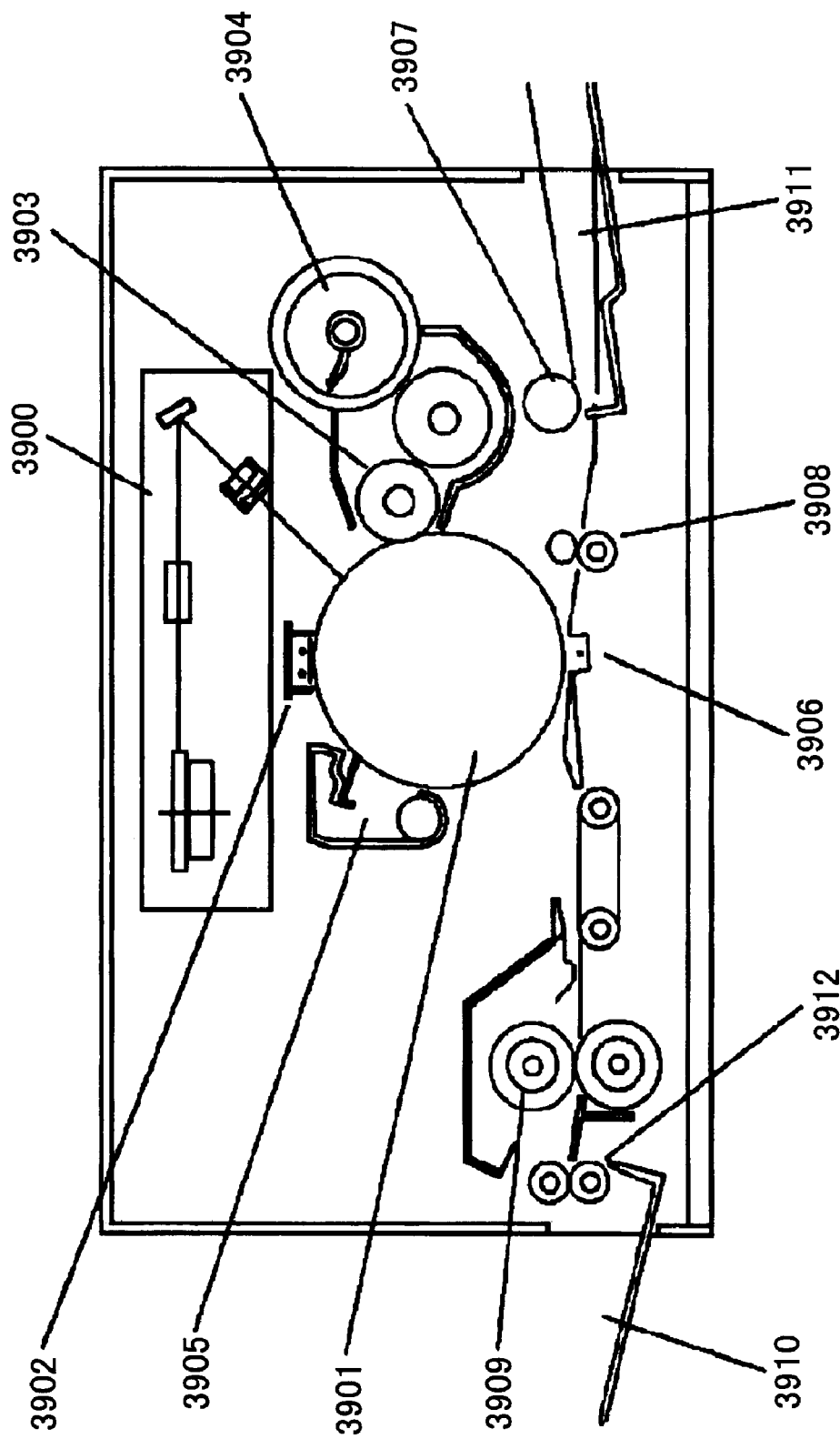
FIG. 47 is a diagram showing an exemplary configuration of an image forming apparatus according to an embodiment of the present invention.

FIG. 47 is a diagram showing an exemplary configuration of an image forming apparatus according to an embodiment of the present invention. As shown in FIG. 47, around a photoreceptor drum (to-be scanned surface) 3901, there are disposed a charger 3902 for charging the photoreceptor drum 3901 with a high voltage, a development roller 3903 for developing an image by transferring charged toner onto an electrostatic latent image recorded by a light scanning apparatus 3900, a toner cartridge 3904 for supplying toner to the development roller 3903, and a cleaning case 3905 for removing and holding toner remaining on the photoreceptor drum 3901. As mentioned above, plural lines of an image are statically recorded at a time onto the photoreceptor drum 3901. A paper feed roller 3907A feeds paper from a paper feed tray 3911. A pair of resist rollers 3908 transports the paper in accordance with the timing of starting recording in the sub scanning direction. A transfer charger 3906 transfers toner onto the paper when the paper passes between the photoreceptor drum 3901 and the transfer charger 3906. A fixing roller 3909 fixes the transferred toner onto the paper. Then, a paper ejection roller 3912 ejects the paper onto a catch tray 3910. Using a light scanning apparatus according to an embodiment of the present invention as the light scanning apparatus 3900 of the image forming apparatus described above makes it possible to form a pixel using a light source array (plural light sources). That is, it is made possible to reduce a current to be applied to each of the light sources, and thereby reduce power consumption. In addition, when forming a pixel using a light source array (plural light sources), it is possible to reduce adverse effects on an adjacent line (adjacent pixel) due to spreading of light beams of a light source array (plural light sources). Moreover, it is made possible to precisely correct the positions of dots, thereby making it possible to provide a high-quality image.

Figure 48:
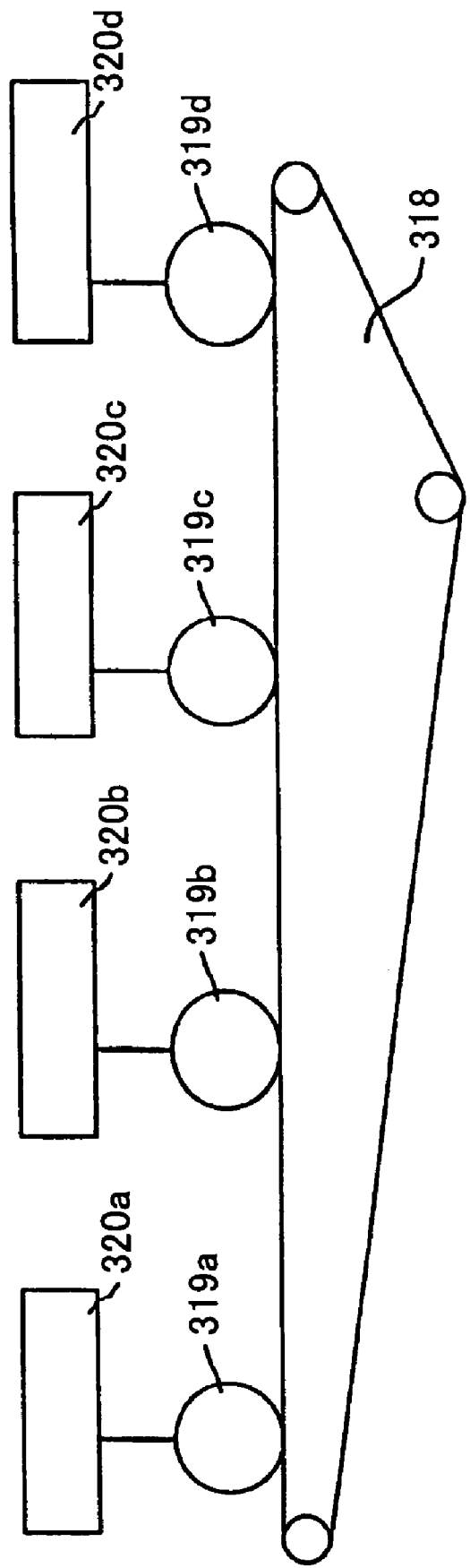
FIG. 48 is a diagram showing an exemplary color image forming apparatus.

The present invention can also be applied to a color image forming apparatus. FIG. 48 is a drawing illustrating an example of applying the present invention to a tandem color image forming apparatus having plural photoreceptors. A typical tandem color image forming apparatus includes photoreceptors one for each color: cyan, magenta, yellow, and black. The tandem color image forming apparatus also includes light scanning optical systems one for each of the photoreceptors, which light scanning systems form electrostatic latent images onto the corresponding photoreceptors through different light paths. Therefore, dot misalignment in the sub scanning direction on each photoreceptor may have different characteristics.

In FIG. 48, 318 indicates a transfer belt; 319a, 319b, 319c, and 319d indicate photoreceptors each corresponding to a different color; and 320a, 320b, 320c, and 320d indicate light scanning apparatuses each corresponding to a different color.

Using a light scanning apparatus according to an embodiment of the present invention as each of the light scanning apparatuses 320a, 320b, 320c, and 320d makes it possible to form a pixel using a light source array (plural light sources). That is, it is made possible to reduce a current to be applied to each of the light sources, and thereby reduce power consumption. In addition, when forming a pixel using a light source array (plural light sources), it is possible to reduce adverse effects on an adjacent light (adjacent pixel) due to spreading of light beams of a light source array (plural light sources). Moreover, it is made possible to precisely correct the positions of dots, thereby making it possible to provide a high-quality image. Embodiments of the present invention are especially effective in correcting dot positions in the sub scanning direction. Embodiments of the present invention minimize a color shift between stations, thereby providing excellent color reproducibility.

Figure 49:
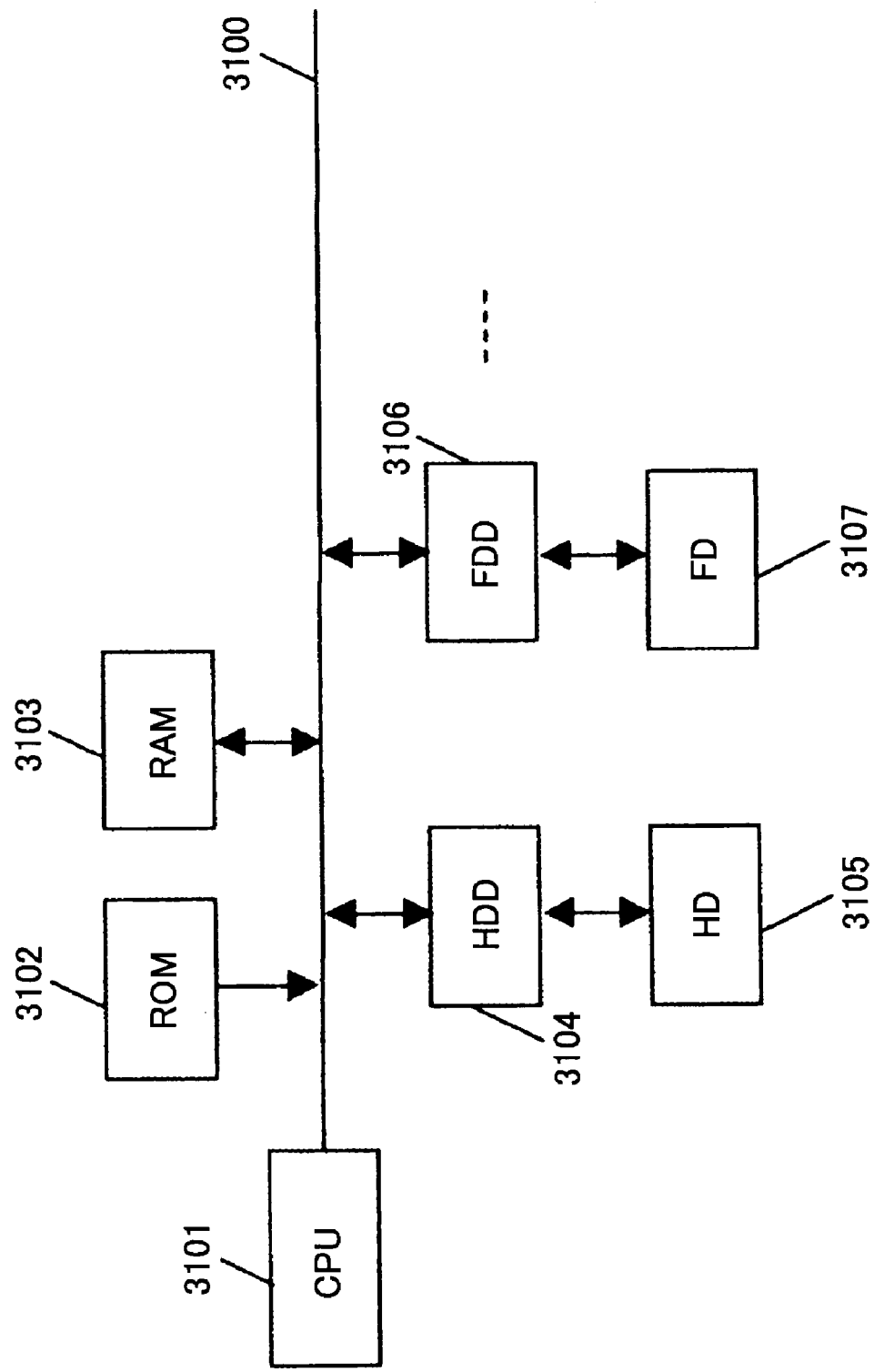
FIG. 49 is a block diagram showing an exemplary hardware configuration of a light source control unit of a light scanning apparatus according to an embodiment of the present invention.
Figure 50:
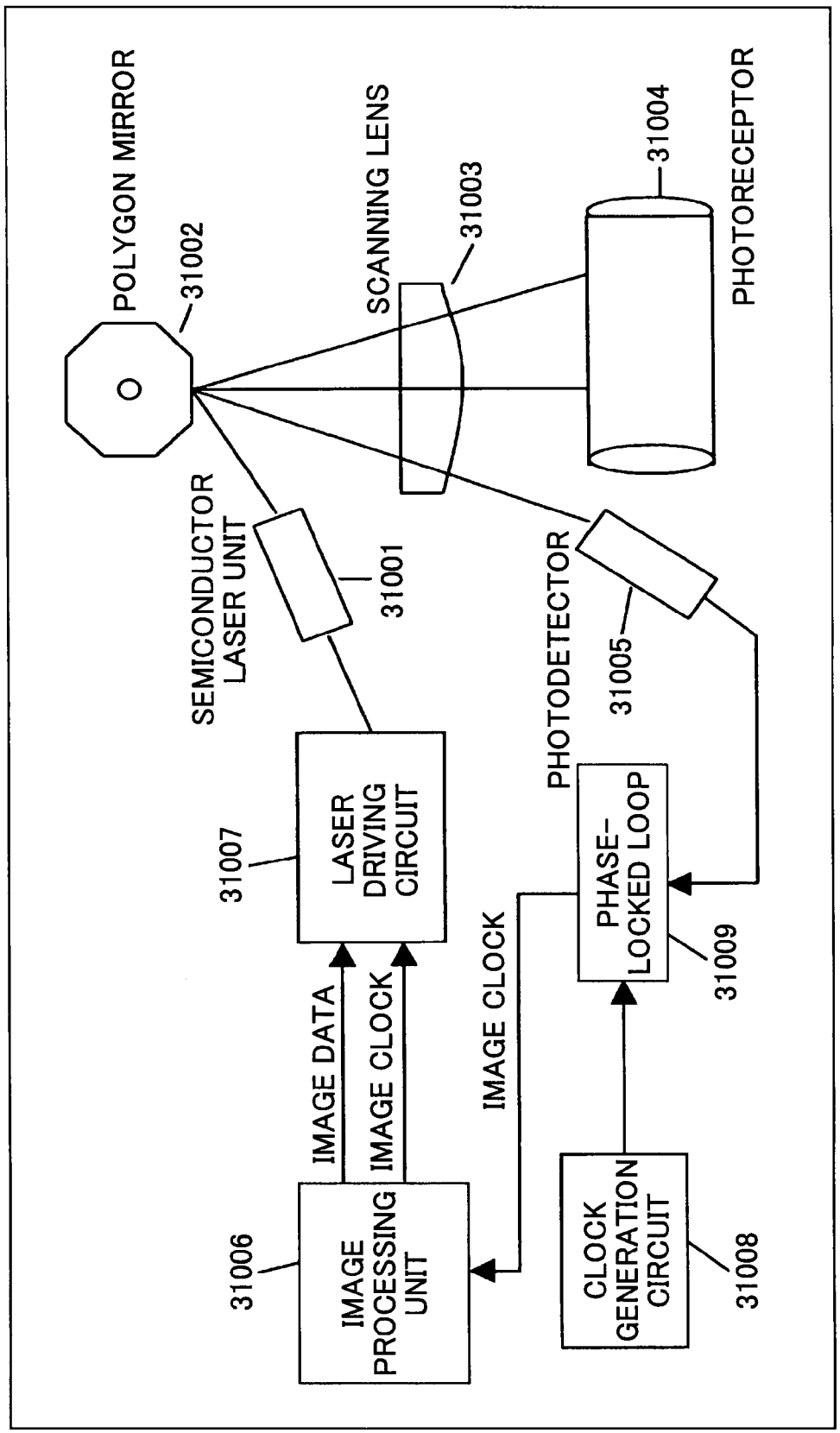
FIG. 50 is a diagram showing an exemplary configuration of a conventional image forming apparatus.

FIG. 49 is a block diagram showing an exemplary hardware configuration of a light source control unit 350 of a light scanning apparatus according to an embodiment of the present invention. In this example, the light source control unit 350 includes a CPU 3101, a ROM 3102, a RAM 3103, a hard disk drive (HDD) 3104, a hard disk (HD) 3105, a flexible disk drive (FDD) 3106, a flexible disk (FD) 3107, and a bus 3100. The CPU 3101, the ROM 3102, the RAM 3103, the HDD 3104, and the FDD 3106 are connected by the bus 3100.

The CPU 3101 controls the entire operation of the light scanning apparatus. The ROM 3102 stores a control program. The RAM 3103 is a work area for the CPU 3101. The HDD 3101 controls operations of reading data from and writing data into the HD 3105 under the control of the CPU 3101. The HD 3105 stores data written by the HDD 3104. The FDD 3106 controls operations of reading data from and writing data into the FD 3107 under the control of the CPU 3101. The FD 3107 is detachably inserted in the FDD 3106 and stores data written by the FDD 3106.

The functions of the light source control unit 350 according to embodiments of the present invention may be implemented by a program executable by a computer (for example, the CPU 3101).

A program for causing a computer to perform the functions of the light source control unit 350 according to embodiments of the present invention may be stored in a computer-readable recording medium, such as a hard disk (3105), floppy (registered trademark) disk, CD-ROM, MO, or DVD, and loaded and executed by a computer. Such a program may also be distributed via a network such as the Internet in the form of the recording medium described above.

Embodiments of the present invention may be applied to image forming apparatuses such as a laser printer and a digital copier.

The present invention may include the following embodiments:

(1) A light scanning apparatus having plural light sources that scan plural light beams in a main scanning direction, comprising:

a light source control unit that controls the plural light sources, wherein, where an array of N (N≧-2) light sources aligned in a sub scanning direction and capable of scanning different positions in the sub scanning direction is called a virtual light source array, and where L (L≧2) virtual light source arrays aligned in the sub scanning direction are formed, the light source control unit causes M ((N-1)≧M≧1) light sources out of the N light sources of each of the L virtual light source arrays to emit light to form a pixel and thereby to form a total of L pixels aligned in the sub scanning direction by giving the same data to the M light sources of each of the L virtual light source arrays.

(2) The light scanning apparatus as described above, wherein the light source control unit performs, at the same time, pulse width modulation and power modulation on the M light sources forming one pixel to adjust density of the pixel.

(3) A color image forming apparatus comprising the light scanning apparatus as described above.

(4) A computer-readable medium having a program embodied therein for causing a computer to execute light source control processing comprising the step of, where an array of N (N≧2) light sources aligned in a sub scanning direction and capable of scanning different positions in the sub scanning direction is called a virtual light source array, and where L (L≧2) virtual light source arrays aligned in the sub scanning direction are formed, causing M ((N-1)≧M≧1) light sources out of the N light sources of each of the L virtual light source arrays to emit light to form a pixel and thereby to form a total of L pixels aligned in the sub scanning direction by giving the same data to the M light sources of each of the L virtual light source arrays.

(5) A light scanning apparatus, comprising:

N light sources in different positions at least in a sub scanning direction, wherein M (N≧2M≧4) light sources, of which scanning positions are adjacent to each other in the sub scanning direction, out of the N light sources form a light source group; an L th (L≧1) light source group is adjacent to an (L+1) th light source group in the sub scanning direction; the M light sources of each of the light source groups are spaced apart from each other by a first distance X1 in the sub scanning direction; and one of the light sources of the L th light source group, of which one of the light sources scanning position is adjacent to one of the light sources of the (L+1) th light source group, is spaced apart from said one of the light sources of the (L+1) th light source group by a second distance X2, the second distance X2 being greater than the first distance X1.

(6) The light scanning apparatus as described above, wherein each of the light sources uses a surface emitting laser.

(7) An image forming apparatus comprising the light scanning apparatus as described above.

(8) A color image forming apparatus comprising the light scanning apparatus as described above.

The present application is based on Japanese Priority Applications No. 2006-169012 filed on Jun. 19, 2006, No. 2006-196440 filed on Jul. 19, 2006, and No. 2006-293751 filed on Oct. 30, 2006, with the Japanese Patent Office, the entire contents of which are hereby incorporated by reference.

What is claimed is:

1. A light scanning apparatus having plural light sources that scan plural light beams in a main scanning direction, comprising:

a light source control unit that controls the plural light sources, wherein, where an array of N (N≧2) light sources aligned in a sub scanning direction and capable of scanning different positions in the sub scanning direction is called a virtual light source array, and where L (L≧2) virtual light source arrays aligned in the sub scanning direction are formed, the light source control unit causes M ((N-1)≧M≧1) light sources out of the N light sources of each of the L virtual light source arrays to emit light to form a pixel and thereby to form a total of L pixels aligned in the sub scanning direction by giving the same data to the M light sources of each of the L virtual light source arrays.

2. The light scanning apparatus as claimed in clam 1, wherein the light source control unit has a function of selecting the M light sources out of the N light sources on a per pixel basis.

3. The light scanning apparatus as claimed in claim 1, wherein the light source control unit performs pulse width modulation on the M light sources forming one pixel to adjust density of the pixel.

4. The light scanning apparatus as claimed in claim 1, wherein the light source control unit performs power modulation on the M light sources forming one pixel to adjust density of the pixel.

5. The light scanning apparatus as claimed in claim 3, wherein the light source control unit adjusts density of the pixel based on a relationship between an area of a photoreceptor with surface potential equal to or less than an image development threshold in a surface potential distribution and a pulse width in a scanning pattern.

6. The light scanning apparatus as claimed in claim 1, wherein each of the light sources uses a surface emitting laser.

7. A light source control unit that controls plural light sources, wherein, where an array of N (N≧2) light sources aligned in a sub scanning direction and capable of scanning different positions in the sub scanning direction is called a virtual light source array, and where L (L≧2) virtual light source arrays aligned in the sub scanning direction are formed, the light source control unit causes M ((N-1)≧M≧1) light sources out of the N light sources of each of the L virtual light source arrays to emit light to form a pixel and thereby to form a total of L pixels aligned in the sub scanning direction by giving the same data to the M light sources of each of the L virtual light source arrays.

8. A light scanning apparatus, comprising:

N light sources in different positions at least in a sub scanning direction, wherein M (N≧2M≧4) light sources, of which scanning positions are adjacent to each other in the sub scanning direction, out of the N light sources form a light source group; an L th (L≧1) light source group is adjacent to an (L+1) th light source group in the sub scanning direction; the M light sources of each of the light source groups are spaced apart from each other by a first distance X1 in the sub scanning direction; and one of the light sources of the L th light source group, of which one of the light sources scanning position is adjacent to one of the light sources of the (L+1) th light source group, is spaced apart from said one of the light sources of the (L+1) th light source group by a second distance X2, the second distance X2 being greater than the first distance X1.

9. The light scanning apparatus as claimed in claim 8, wherein each of the light sources uses a semiconductor laser.

10. The light scanning apparatus as claimed in claim 8, wherein each of the light sources is configured as a semiconductor laser array or surface emitting laser array.

11. The light scanning apparatus as claimed in claim 8, wherein the first distance X1 is less than 5 μm.

12. The light scanning apparatus as claimed in claim 8, further comprising:
   a light source control unit that controls the light sources such that laser beams of the M (N≧2M≧4) light sources form a pixel.

13. The light scanning apparatus as claimed in claim 12, wherein the first distance X1 and the second distance X2 are adjusted based on spreading of light beams of the M light sources and pixel density.

14. The light scanning apparatus as claimed in claim 12, wherein the light source control unit controls the M (M≧2) light sources to shift a centroid of the pixel in the sub scanning direction.

15. The light scanning apparatus as claimed in claim 12, wherein the light source control unit controls the M (M≧2) light sources to shift the centroid of the pixel in the sub scanning direction according to correction data containing information for shifting the centroid of the pixel in the sub scanning direction.

16. The light scanning apparatus as claimed in claim 15, further comprising:
   a pixel-position-in-sub-scanning-direction detecting unit configured to detect a position of the pixel in the sub scanning direction and to generate the correction data containing information for shifting the centroid of the pixel in the sub scanning direction;
   wherein the light source control unit controls the M light sources to shift the centroid of the pixel in the sub scanning direction according to the correction data generated by the pixel-position-in-sub-scanning-direction detecting unit.

17. The light scanning apparatus as claimed in claim 14, wherein the light source control unit changes stepwise proportions of light emission time of the M light sources by pulse width modulation while not changing total light emission time or a total exposure area of the M light emitting sources and thereby to shift the centroid of the pixel in the sub scanning direction.

18. The light scanning apparatus as claimed in claim 14, wherein the light source control unit changes stepwise proportions of light emission levels of the M light sources by power modulation so as to change proportions of exposure energies of the M light sources while not changing total exposure energy of the M light sources and thereby to shift the centroid of the pixel in the sub scanning direction.

19. The light scanning apparatus as claimed in claim 14, wherein the light source control unit changes stepwise proportions of light emission time and proportions of light emission levels of the M light sources by performing pulse width modulation and power modulation at the same time and thereby to shift the centroid of the pixel in the sub scanning direction.

20. An image forming apparatus comprising the light scanning apparatus of claim 1.

* * * * *